United States Patent
Moriya et al.

(10) Patent No.: US 6,771,900 B2
(45) Date of Patent: Aug. 3, 2004

(54) PHOTOGRAPHIC MODE SELECTABLE CAMERA

(75) Inventors: Mitsuhiro Moriya, Kanagawa (JP); Takeshi Masuda, Kanagawa (JP); Nobuyuki Kameyama, Kanagawa (JP); Yuji Mikami, Kanagawa (JP); Fuminori Kawamura, Kanagawa (JP); Fumio Noji, Kanagawa (JP); Yutaka Senda, Tokyo (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/636,749

(22) Filed: Aug. 8, 2003

(65) Prior Publication Data

US 2004/0028399 A1 Feb. 12, 2004

Related U.S. Application Data

(62) Division of application No. 10/439,191, filed on May 16, 2003, now Pat. No. 6,714,728.

(30) Foreign Application Priority Data

| May 16, 2002 | (JP) | 2002-141192 |
| Aug. 22, 2002 | (JP) | 2002-241482 |
| Aug. 22, 2002 | (JP) | 2002-242573 |
| Nov. 1, 2002 | (JP) | 2002-319375 |

(51) Int. Cl.[7] ............................................. G03B 15/03
(52) U.S. Cl. ........................ 396/176; 396/179; 362/18
(58) Field of Search ................................ 396/164, 176, 396/179; 362/16, 18

(56) References Cited

U.S. PATENT DOCUMENTS

| RE27,468 E | * | 9/1972 | Land ........................... 362/18 |
| 5,950,025 A | | 9/1999 | Uchiyama et al. |
| 6,154,609 A | | 11/2000 | Muramatsu et al. |
| 6,233,404 B1 | * | 5/2001 | Tobise et al. ................. 396/61 |
| 6,549,727 B1 | | 4/2003 | Kamata |
| 2002/0181949 A1 | | 12/2002 | Hata et al. |

FOREIGN PATENT DOCUMENTS

| JP | 8-184944 | 7/1996 |
| JP | 9-015693 | 1/1997 |
| JP | 2000-162738 | 6/2000 |
| JP | 2000-305221 | 11/2000 |
| JP | 2001-215599 | 8/2001 |

* cited by examiner

*Primary Examiner*—David M. Gray
(74) *Attorney, Agent, or Firm*—Young & Thompson

(57) ABSTRACT

A lens-fitted photo film unit includes a flash unit for applying flash light to a photographic object. An exposure amount changer, such as an aperture stop changing mechanism, changes over object light incident on photo film from the object between low and high exposure amounts. For the lens-fitted photo film unit, a photographic mode selection device includes a movable selector, such as a button, for selectively designating a daylight mode, a daylight flash mode and a night flash mode. The movable selector, when the daylight mode is designated, determines the low exposure amount and turns off the flash unit, and when the daylight flash mode is designated, determines the low exposure amount and turns on the flash unit, and when the night flash mode is designated, determines the high exposure amount and turns on the flash unit.

17 Claims, 41 Drawing Sheets

FIG. 35A  FIG. 35B  FIG. 35C
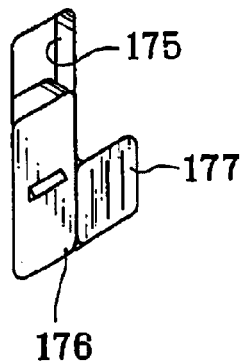 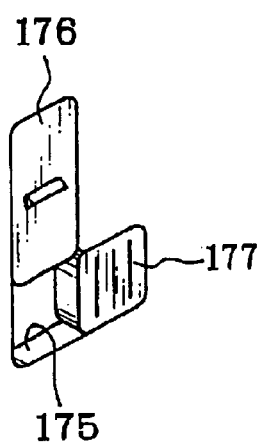 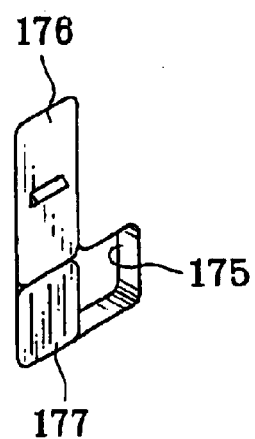
FIG. 36A  FIG. 36B  FIG. 36C
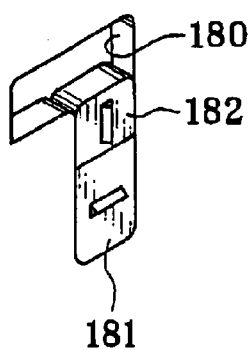 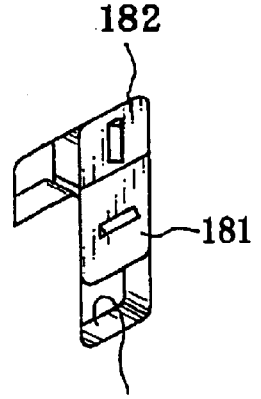 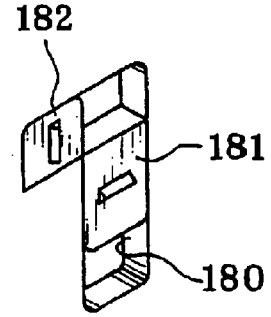

FIG. 39
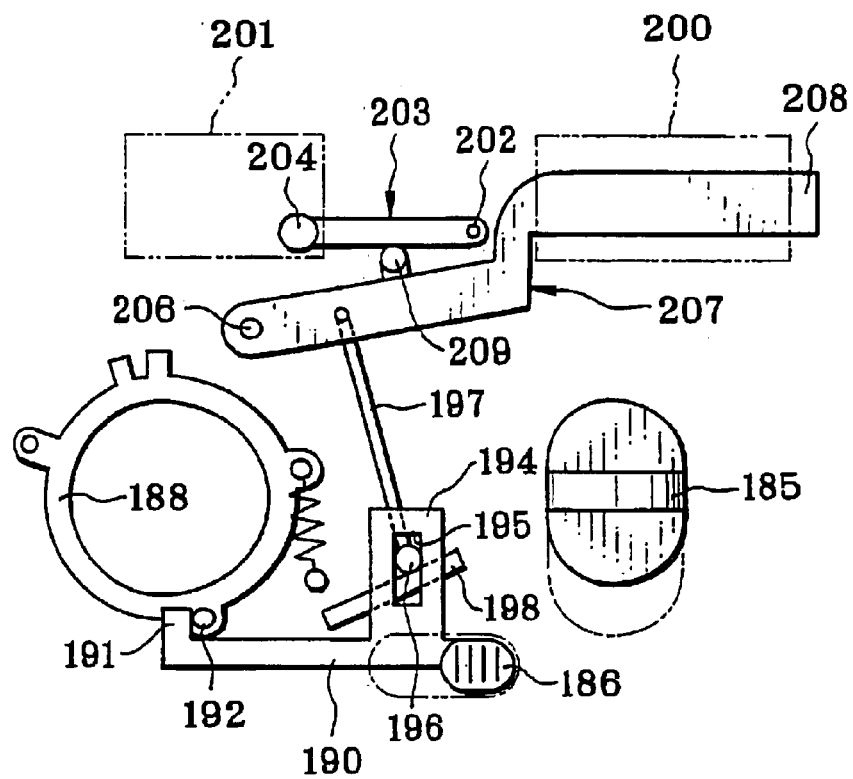
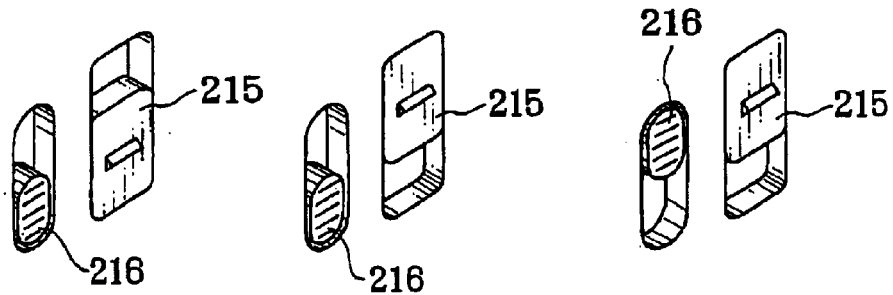
FIG. 40A    FIG. 40B    FIG. 40C

PHOTOGRAPHIC MODE SELECTABLE CAMERA

This application is a division of application Ser. No. 10/439,191, filed on May 16, 2003, now U.S. Pat. No. 6,714,728, the entire contents of which are hereby incorporated by reference.

BACKGROUND OF THE INVENTION

1. Field of the Invention

The present invention relates to a photographic mode selectable camera. More particularly, the present invention relates to a photographic mode selectable camera in which selection of a desired one of plural photographic modes in the camera can be effected correctly without error.

2. Description Related to the Prior Art

A lens-fitted photo film unit is known, and pre-loaded with photo film in the course of manufacture. In a very early type of the lens-fitted photo film unit, an amount of flash light of a flash device is fixed. Also, an aperture stop and shutter speed are fixed. It has been possible to use the lens-fitted photo film unit in only a very limited condition in consideration of optimizing an exposure to be taken.

There are needs of users to take photographs in various conditions with high image quality. To this end, JP-A 9-015693 and JP-A 8-184944 disclose suggested improvements of the lens-fitted photo film unit.

According to JP-A 9-015693, an aperture stop in the lens-fitted photo film unit is changed over to a large aperture stop opening in using the flash device. According to JP-A 8-184944, a shutter speed of the lens-fitted photo film unit is set slower in using the flash device. In each of those, an exposure amount can be sufficiently high even in use of the flash device of a small amount of flash light. An exposure can be taken typically by utilizing ambient light as illumination.

When the lens-fitted photo film unit according to each one of the above two documents is used to take an exposure in the daylight sync photography, an overexposure occurs. To solve this problem, JP-A 2001-215599 discloses an alternative structure of the lens-fitted photo film unit changeable between a daylight mode, a night flash mode and a daylight flash mode. In the daylight mode, the flash device is turned off, and a small aperture stop opening is set. In the night flash mode, the flash device is turned on, and a large aperture stop opening is set. In the daylight flash mode, the flash device is turned on, and the small aperture stop opening is set.

The lens-fitted photo film unit of this document has a slidable type and a depressible type of operable members. The slidable type is operated to select one of the daylight mode and the night flash mode. The depressible type is operated to set or not to set the daylight flash mode. For safety in the mode selection of a user without an error, the lens-fitted photo film unit is provided with a structure to restrict the changeover between the night flash mode and the daylight flash mode.

Furthermore, JP-A 2000-305221 discloses the lens-fitted photo film unit of which the operable member is biased by a spring toward its initial position for the purpose of preventing errors in a user s operation and ensuring precision in a selection mechanism. In this document, the spring is used to bias an aperture stop changing mechanism, by use of which the operable member is biased indirectly.

There is a type of the lens-fitted photo film unit in which a focal length and an amount of flash light are changed over at the time of close-up photography. In this type, there is linking among the operable member, a focal length changing plate and a flash light reducing plate. A toggle spring is connected with the focal length changing plate, and biases the operable member toward the initial position. Also, U.S. Pat. No. 5,950,025 (corresponding to JP-A 10-031249) discloses the lens-fitted photo film unit in which the operable member is retained on a view field changing plate of a rotatable type for a viewfinder. A toggle spring is connected with the view field changing plate, to bias the operable member toward the initial position.

Also, U.S. Pat. No. 6,154,609 (corresponding to JP-A 7-134368) discloses a construction with plural photographic modes to change over a view field of a viewfinder and an aperture size for a frame. This is in contrast with the above-mentioned JP-A 2000-305221 in which the aperture stop is changed over to a large aperture stop state at the time of flash photography.

JP-A 2000-162738 discloses three photographic modes in which the lens-fitted photo film unit is changeable. Three positions to stop the operable member are arranged in one straight direction. The operable member is slid, and is retained in one of the positions assigned to one mode desired by a user, to designate the selected one of the three photographic modes. To this end, ridges are formed for exactly positioning the operable member in its moving path.

If there are so great a number of modes at which the lens-fitted photo film unit can be set, the conditions where exposures are taken can be varied to a large extent. However, a problem arises in that the numerous modes may confuse a user who is uncertain on techniques of photography. He or she may fail to select the most suitable one of the modes in view of a scene.

In relation to the mode selection according to JP-A 2001-215599, a user is likely to commit an error in selecting one of the night flash mode and the daylight flash mode in the lens-fitted photo film unit. There is a higher probability of his or her selection of the slidable type of the operable member relevant to the daylight mode, to determine the night flash mode. This may cause a problem of occurrence of overexposure even in the product changeable in the numerous photographic modes.

SUMMARY OF THE INVENTION

In view of the foregoing problems, an object of the present invention is to provide a photographic mode selectable camera in which selection of an intended one of plural photographic modes can be effected correctly by reducing probability of errors in the selection.

In order to achieve the above and other objects and advantages of this invention, a photographic mode selectable camera is provided, the camera including a flash unit for applying flash light to a photographic object, and an exposure amount changer for changing over object light incident on photo film from the object between low and high exposure amounts. The photographic mode selectable camera includes a movable selector for designating a selected one of a daylight mode, a daylight flash mode and a night flash mode, wherein the movable selector, when the daylight mode is designated, sets the exposure amount changer at the low exposure amount and turns off the flash unit, and when the daylight flash mode is designated, sets the exposure amount changer at the low exposure amount and turns on the flash unit, and when the night flash mode is designated, sets the exposure amount changer at the high exposure amount and turns on the flash unit. The movable selector is externally operable between first, second and third set positions, designates the daylight mode when in the first set position, designates the daylight flash mode when in the second set position, and designates the night flash mode when in the third set position, and the second set position is located between the first and third set positions.

The camera further includes an aperture stop opening for passing the object light from the object toward the photo film. The exposure amount changer includes an aperture stop mechanism for changing over the aperture stop opening between large and small aperture stop states, for selecting the small aperture stop state when the daylight mode or the daylight flash mode is designated, and for selecting the large aperture stop state when the night flash mode is designated.

The camera further includes a shutter mechanism for providing the photo film with an exposure. The exposure amount changer further includes a shutter speed changing mechanism for changing over a shutter speed of the shutter mechanism between high and low shutter speeds, selects the high shutter speed when the daylight mode or the daylight flash mode is designated, and selects the low shutter speed when the night flash mode is designated.

The camera further includes a flash light amount adjustor for changing over the flash light of the flash unit between large and small light amounts, for selecting the large light amount when the daylight flash mode is designated, and for selecting the small light amount when the night flash mode is designated.

The camera is a lens-fitted photo film unit pre-loaded with the photo film.

The movable selector comprises a movable, external operable member. Furthermore, a first guide mechanism guides the external operable member in a first moving path between the first and second set positions. A second guide mechanism guides the external operable member in a second moving path between the second and third second set positions, wherein the second moving path extends angularly from the first moving path at the second set position.

The first guide mechanism includes a first guide plate secured to one of the second guide mechanism and the camera. A first guide opening is formed in the first guide plate, and having an edge extending along the first moving path. A first guide projection is formed to project from a remaining one of the second guide mechanism and the camera, for movably contacting the edge of the first guide opening to be guided. The second guide mechanism includes a second guide plate secured to one of the first guide mechanism and the external operable member. A second guide opening is formed in the second guide plate, and having an edge extending along the second moving path. A second guide projection is formed to project from a remaining one of the first guide mechanism and the external operable member, for movably contacting the edge of the second guide opening to be guided.

The edge of the first guide opening extends along a straight line, the first guide projection is slidable, the edge of the second guide opening extends along an arc, and the second guide projection is rotatable.

The first guide projection projects from the camera, the second guide plate is secured to the first guide plate, and the second guide projection projects from the external operable member.

In one preferred embodiment, the third set position is located externally from the first and second set positions, and the external operable member is pulled outwards when shifted from the second set position to the third set position.

The external operable member includes first and second edge portions. The first guide mechanism includes a slider slidable between first and second positions that correspond to respectively the first and second set positions. The second guide mechanism includes a rotational support mechanism for securing the first edge portion of the external operable member to the slider, and for supporting the external operable member on the slider in a rotatable manner between the second and third set positions, wherein the external operable member is shifted to the third set position by external operation to pull outwards the second edge portion.

In another preferred embodiment, the camera includes an outer cover. The first guide mechanism includes a first gap portion, formed in the outer cover to extend along the first moving path, for guiding the external operable member between the first and second set positions in a slidable manner. The second guide mechanism includes a second gap portion, formed in the outer cover to extend along the second moving path from an edge of the first gap portion, for guiding the external operable member between the second and third set positions in a slidable manner.

In still another preferred embodiment, the third set position is located internally from the first and second set positions, and the external operable member is depressed inwards when shifted from the second set position to the third set position.

In another preferred embodiment, the movable selector comprises an external operable member movable between the first to third positions. Furthermore, a first slidable member is secured to an inside of the external operable member, and slidable between first to third positions that correspond to respectively the first to third set positions. A second slidable member is slidable along a sliding path of the first slidable member. A linking mechanism links the first slidable member with the second slidable member in a removable manner, for disengagement with resiliency upon sliding of the first slidable member from the second position toward the third position, to allow the first slidable member to move independently from the second slidable member, and for engagement again with resiliency upon sliding of the first slidable member from the second position toward the first position, to allow the first slidable member to move together with the second slidable member, whereby the second slidable member shifts in a range corresponding to a section defined between the first and second set positions.

In a further preferred embodiment, the movable selector comprises an external operable member movable between the first to third set positions. Furthermore, a lock mechanism is movable between a releasing position and a locking position, for allowing the external operable member to move from the second set position to the third set position when in the releasing position, and for blocking movement of the external operable member from second set position toward the third set position when in the locking position.

The first to third set positions are arranged substantially along a straight line.

Furthermore, a sync switch is pressed and curved by a portion of the shutter blade in movement of the shutter blade from the shut position toward the open position, for being turned on. The shutter speed changing mechanism sets a curved amount of the sync switch stepwise at a selected one of large and small amounts, so as to set each of the low and high shutter speeds.

The shutter speed changing mechanism includes a pad movable to and from a position behind the sync switch, wherein the pad, when the high shutter speed is set, is positioned behind the sync switch to set the curved amount of the sync switch at the small amount, and when the low shutter speed is set, is positioned away from behind the sync switch to set the curved amount of the sync switch at the large amount.

According to one aspect of the invention, a camera includes guide means for temporarily retaining the mode selection operable member in the second set position in moving the mode selection operable member from the first set position to the second set position, and for setting a second shift of the mode selection operable member discontinuous from a first shift thereof, wherein the first shift is defined between the first and second set positions, and the second shift is defined between the second and third set positions.

According to another aspect of the invention, the movable selector includes a first external operable member, shiftable between first and second set positions, for designating the daylight mode when in the first set position, and for designating the daylight flash mode when in the second set position. A second external operable member is shiftable between third and fourth set positions, for designating the night flash mode when in the third set position, and for canceling designation of the night flash mode when in the fourth set position.

The second external operable member is movable when the first external operable member is in the second set position.

Moving paths of the first and second external operable members overlap on each other at least partially. The first external operable member, when in the first set position, locks the second external operable member in the fourth set position, and when in the second set position, allows the second external operable member to move to the third set position.

The moving paths of the first and second external operable members are collinear with each other.

In one preferred embodiment, the moving paths of the first and second external operable members extend angularly from each other.

In another preferred embodiment, the first external operable member is movable along a first moving path, and the second external operable member is movable along a second moving path extending in a direction different from the first moving path.

In still another preferred embodiment, moving paths of the first and second external operable members extend along each other.

In another preferred embodiment, a moving path of one of the first and second external operable members extends along a straight line, and a moving path of a remaining one of the first and second external operable members is curved.

In a further preferred embodiment, one of the first and second external operable members is depressible in a push-button fashion with reference to a moving path of a remaining one of the first and second external operable members.

BRIEF DESCRIPTION OF THE DRAWINGS

The above objects and advantages of the present invention will become more apparent from the following detailed description when read in connection with the accompanying drawings, in which:

FIGS. 35A–35C are perspectives illustrating one preferred combination of buttons slidable vertically and horizontally;

FIGS. 36A–36C are perspectives illustrating one preferred combination of buttons similar to FIGS. 35A–35C but where the second is slidable in the two directions;

FIG. 39 is an explanatory view in elevation, illustrating a state of the night flash mode according to the structure of FIGS. 37A–37C;

FIGS. 40A–40C are perspectives illustrating one preferred combination of buttons slidable in parallel;

DETAILED DESCRIPTION OF THE PREFERRED EMBODIMENT(S) OF THE PRESENT INVENTION

Figure 1:
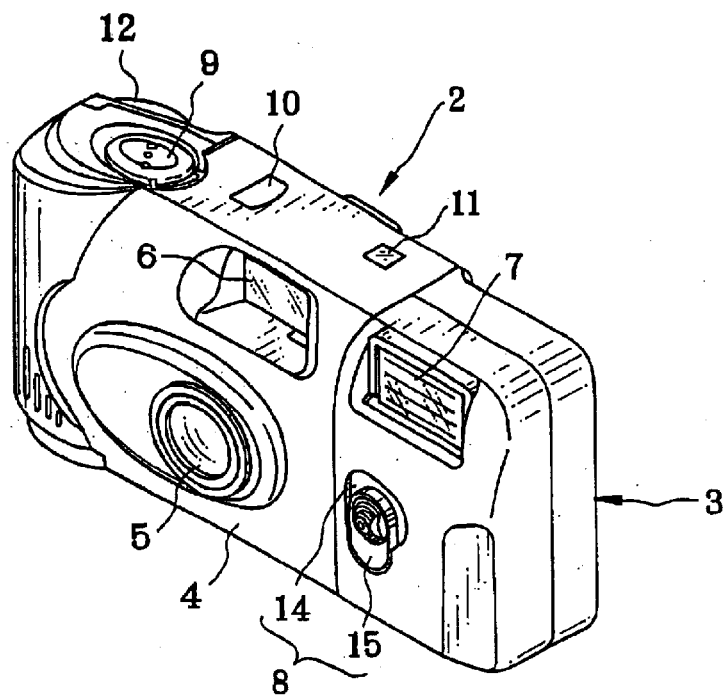
FIG. 1 is a perspective illustrating a lens-fitted photo film unit.

In FIG. 1, a lens-fitted photo film unit 2 as a camera is depicted. The lens-fitted photo film unit 2 includes a housing 3, a photo film cassette, and a sticker belt 4. The housing 3 is provided with various mechanisms for taking an exposure. The photo film cassette is loaded in the housing 3 at the time of manufacture in the factory. The sticker belt 4 is attached to an outside of the housing 3. Openings of various shapes are formed the sticker belt 4 for uncovering relevant portions of the sticker belt 4 for operation.

A front side of the housing 3 is provided with a taking lens 5, a viewfinder 6, a flash emitter 7 and a photographic mode selection device 8. An upper side of the housing 3 is provided with a shutter release button 9, a counter window 10 and a signaling opening 11. In a rear side of the housing 3, a winder wheel 12 partially appears, and is used for rotation to wind an exposed portion of the photo film.

Figure 2:
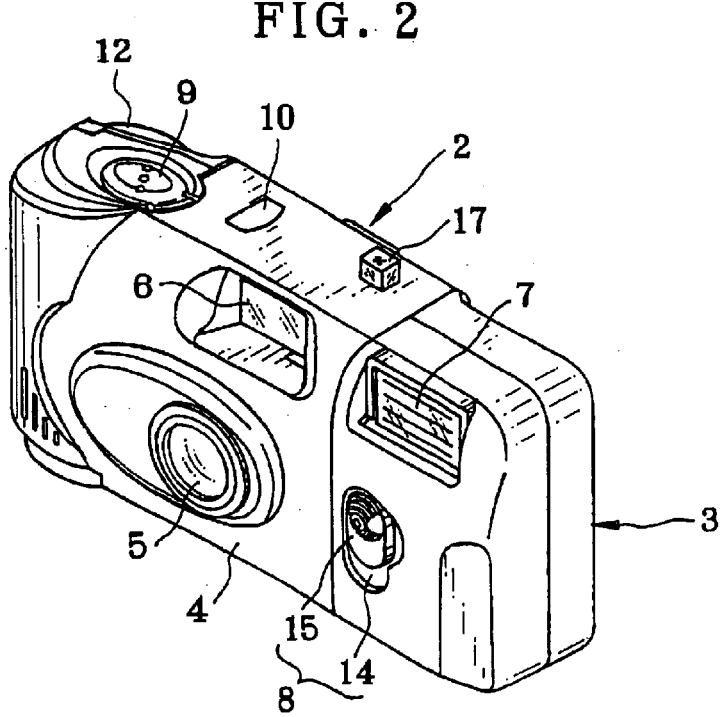
FIG. 2 is a perspective illustrating the lens-fitted photo film unit in which a daylight flash mode is set.
Figure 3:
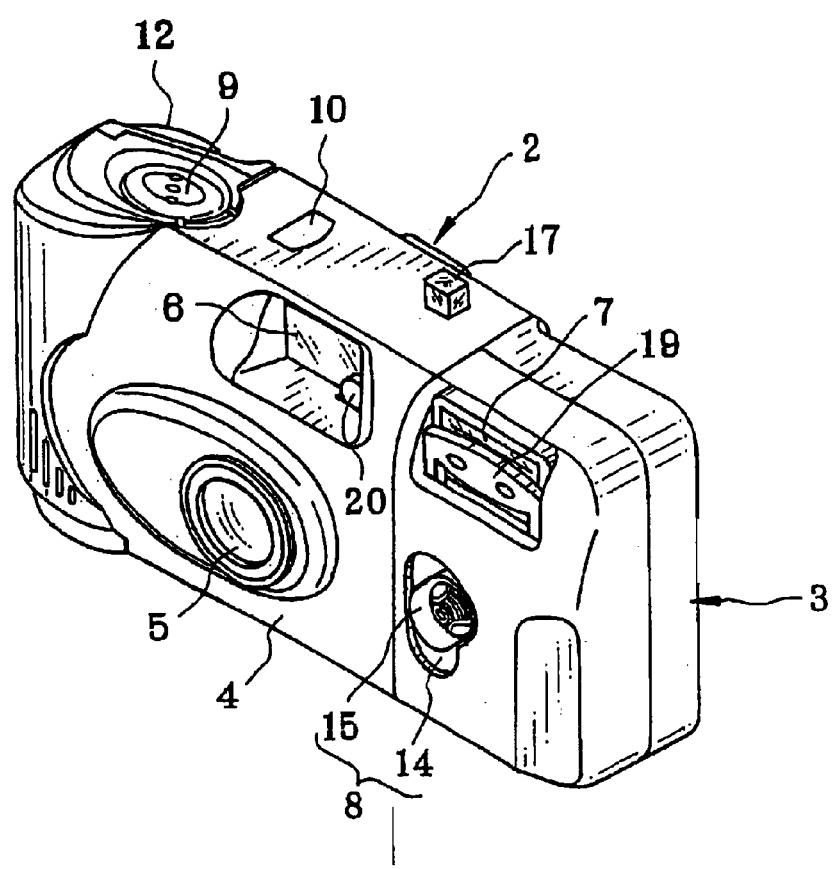
FIG. 3 is a perspective illustrating the lens-fitted photo film unit in which a night flash mode is set.

The photographic mode selection device 8 includes an external operable button 15 and a moving path gap 14. The external operable button 15 on the housing 3 has a shape formed by lengthening a circle in a vertical direction. The moving path gap 14 is formed in a front wall of the housing 3, and receives the external operable button 15 in a movable manner. The external operable button 15 is movable between first, second and third set positions. The first set position is disposed the lowest in the moving path gap 14. The second set position is illustrated in FIG. 2, and is higher than the first set position. The third set position is illustrated in FIG. 3, and is offset from the second set position rotationally in the clockwise direction.

When the external operable button 15 in the lens-fitted photo film unit 2 is set in the first set position, a daylight mode or first photographic mode is designated, to turn off a flash device, with a small aperture stop and with a high shutter speed. When the external operable button 15 is set in the second set position, a daylight flash mode or second photographic mode is designated, to turn on the flash device, with the small aperture stop and with the high shutter speed. In the daylight flash mode, a signaling light guide 17 projects from an upper face of the lens-fitted photo film unit 2. The signaling light guide 17 optically guides light emitted by a light emitting element driven upon completion of charging the flash device, and informs the readiness for an exposure on the outside of the housing 3.

When the external operable button 15 is in the third set position, the night flash mode or third photographic mode is designated, to turn on the flash device, with the large aperture stop and with the low shutter speed. There is a movable light reducing panel 19 in a flash amount adjustor as exposure amount changer. In the night flash mode, the light reducing panel 19 is set in front of the flash emitter 7, to reduce an amount of flash light for the purpose of balancing light amounts between a principal object and a background. A mode indicia disk 20 is disposed in front of the viewfinder 6. When a user observes a photographic field through the viewfinder 6, he or she views the mode indicia disk 20 and is informed of the night flash mode or third photographic mode designated in the lens-fitted photo film unit 2.

Figure 4:
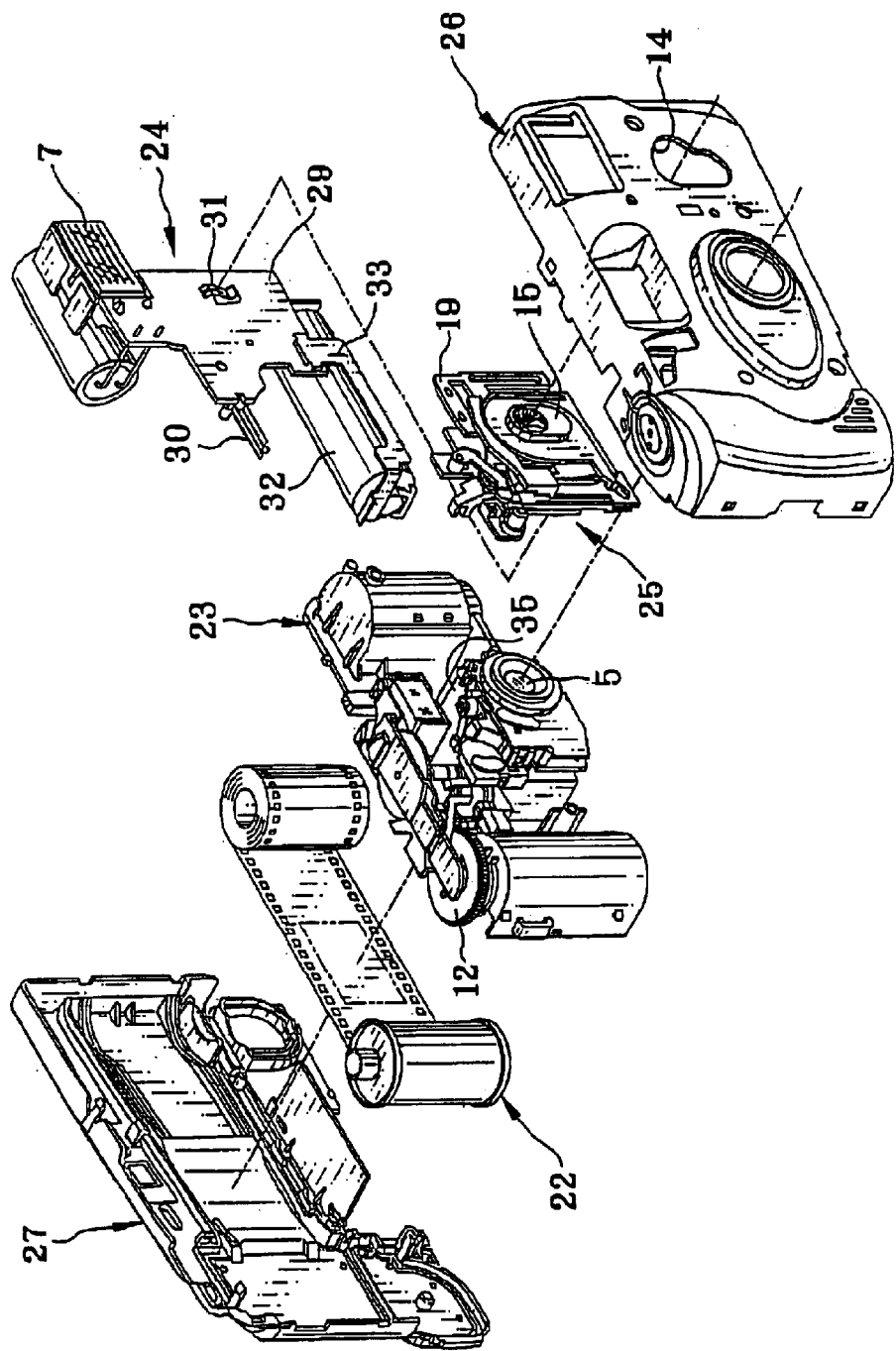
FIG. 4 is an exploded perspective illustrating the lens-fitted photo film unit.

In FIG. 4, a construction of the housing 3 is illustrated. The housing 3 includes a main body 23, a flash unit 24, a movable selector 25, a front cover 26 and a rear cover 27. The main body 23 is loaded with a photo film cassette 22 with photo film of 135 type. The flash unit 24 is secured to a front face of the main body 23. The movable selector 25 changes over the photographic modes. The front and rear covers 26 and 27 are attached to respectively the front and rear of the main body 23.

The flash unit 24 is constituted by a printed circuit board 29 and the flash emitter 7. The printed circuit board 29 includes circuit elements to operate as a flash circuit. The flash emitter 7 includes a flash discharge tube, a reflector, a diffusion plate and the like. The printed circuit board 29 is provided with a sync switch 30, a contact segment 31 and an electrode segment 33. The sync switch 30 is turned on upon a releasing operation of the shutter device, for causing emission of flash light. The contact segment 31 constitutes a flash charger switch turned on and off by movement of the external operable button 15 of the photographic mode selection device 8. The electrode segment 33 connects a battery 32 to the flash circuit.

A light-shielded tunnel 35 is included in the center of the main body 23. Various elements are assembled on the periphery of the light-shielded tunnel 35, including a shutter charging mechanism a shutter releasing mechanism, a photo film winding mechanism, a photo film retention mechanism, a frame counter mechanism, an aperture stop changing mechanism, a shutter speed changing mechanism, a photographic optical system and a viewfinder optical system.

Figure 5:
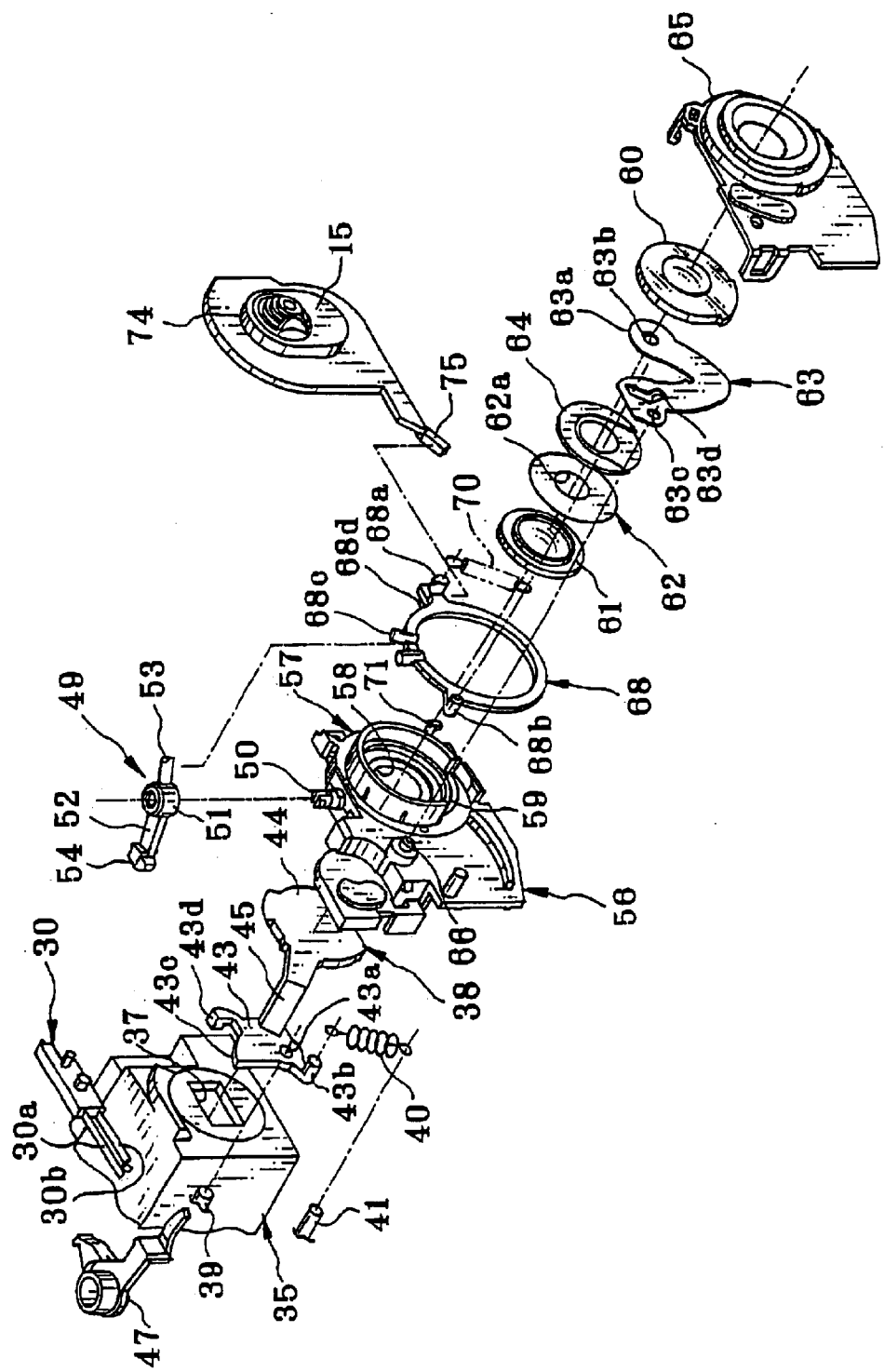
FIG. 5 is an exploded perspective illustrating mechanisms for changing over an aperture stop and a shutter speed.

In FIG. 5, the shutter releasing mechanism, the aperture stop changing mechanism and the like are illustrated on the periphery of the light-shielded tunnel 35. An exposure opening 37 is formed in the front of the light-shielded tunnel 35. A pin 39 projects from a lateral portion of the light-shielded tunnel 35. A shutter blade 38 as a shutter mechanism is supported on the pin 39 in a pivotally movable manner. Also, a pin 41 is disposed under the pin 39. A tension coil spring 40 has one end retained on the pin 41.

The shutter blade 38 in the shutter releasing mechanism includes a blade base portion 43, a blade portion 44 and an arm portion 45. The blade base portion 43 has a hole 43a for receiving insertion of the pin 39. The blade portion 44 is disposed in front of the exposure opening 37, and opens and shuts the exposure opening 37. The arm portion 45 connects the blade base portion 43 with the blade portion 44. The blade base portion 43 is provided with a pin 43b, a projection 43c and a sync projection 43d. The pin 43b is used for connection with a second end of the tension coil spring 40. The projection 43c is knocked by a shutter drive lever 47. The sync projection 43d turns on and off the sync switch 30 in the flash unit 24. The shutter blade 38 is biased by the tension coil spring 40, and is kept in a shut position to shut the exposure opening 37.

Figure 9:
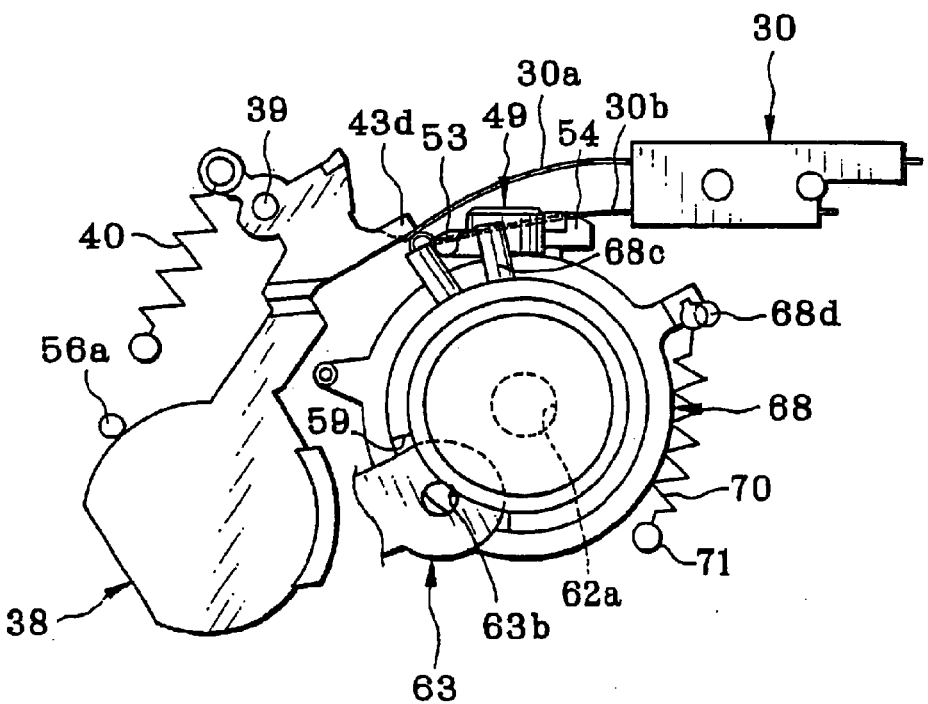
FIG. 9 is an explanatory view in elevation, illustrating a state of the low shutter speed in the shutter speed changing mechanism.

The shutter drive lever 47 is an element included in the shutter releasing mechanism, and is caused by the shutter charging mechanism to rotate to the charged position in the clockwise direction. In the shutter releasing operation, the shutter drive lever 47 rotates to the released position in the counterclockwise direction, and knocks the projection 43c of the shutter blade 38. The shutter blade 38 responsively rotates to an open position in the clockwise direction against the bias of the tension coil spring 40. A lens holder 56 is provided with a stopper pin 56a as depicted in FIG. 9. The shutter blade 38 being rotated contacts the stopper pin 56a, and then is caused by the tension coil spring 40 to return to the shut position.

The sync switch 30 includes an upper switch segment 30a and a lower switch segment 30b. When the shutter blade 38 rotates toward the open position, the sync projection 43d presses the upper switch segment 30a, and causes the same to contact the lower switch segment 30b. When the sync switch 30 is turned on by the contact between the switch segments 30a and 30b, the flash emitter 7 in the flash unit 24 is caused to emit flash light.

A pin 50 projects from an upper portion of the lens holder 56. A shutter speed changing lever 49 as a shutter speed changing mechanism is supported on the pin 50 in a rotatable manner. The shutter speed changing lever 49 includes a boss 51, arms 52 and 53, and a pad 54. The boss 51 has a hole through which the pin 50 is inserted. The arms 52 and 53 project from the boss 51. The pad 54 is formed on the end of the arm 52. The shutter speed changing lever 49 is rotated between high and low shutter speed positions, and when in the high shutter speed position of FIG. 6, sets the pad 54 under a free end of the lower switch segment 30b of the sync switch 30, and when in the low shutter speed position of FIG. 7, sets the pad 54 away from the underside of the lower switch segment 30b.

Figure 8:
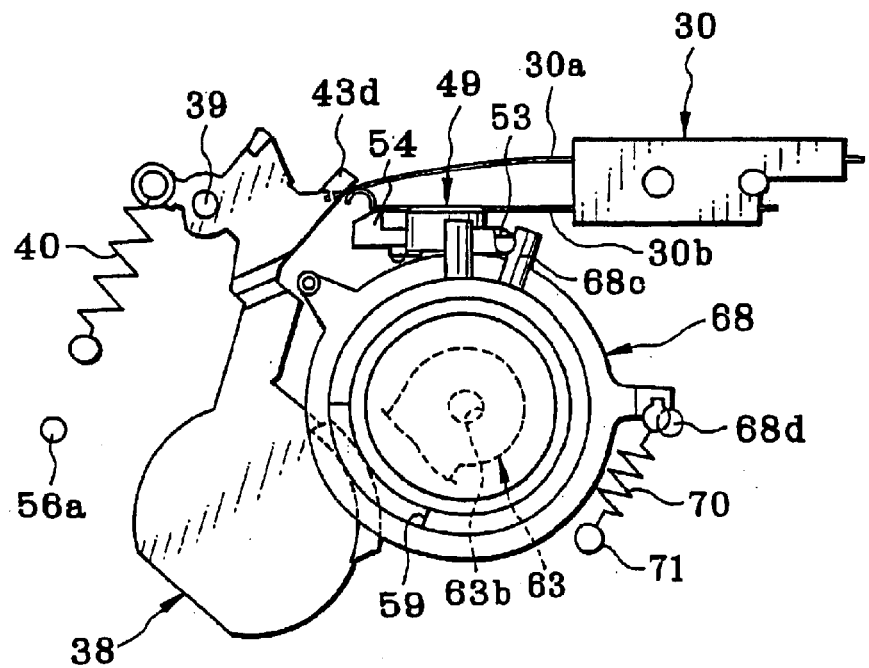
FIG. 8 is an explanatory view in elevation, illustrating a state of the high shutter speed in the shutter speed changing mechanism.

In FIG. 8, the shutter device is released while the pad 54 of the shutter speed changing lever 49 is in the high shutter speed position. The upper switch segment 30a of the sync switch 30 pushed by the sync projection 43d of the shutter blade 38 contacts the lower switch segment 30b, to emit flash light. As the lower switch segment 30b contacts the pad 54, rotation of the shutter blade 38 is blocked in the course of rotation toward the open position. Therefore, the shutter blade 38 swings back to the shut position in a short time. This makes the shutter speed high. An example of the high shutter speed assigned to the high shutter speed position of the shutter speed changing lever 49 is $\frac{1}{110}$ or $\frac{1}{120}$ second.

In contrast, if the pad 54 of the shutter speed changing lever 49 is in the low shutter speed position of FIG. 9, a rotational moving amount of the shutter blade 38 toward the open position is larger. This is because the lower switch segment 30b with resiliency can be deformed to a higher extent. Time required for the return of the shutter blade 38 to the shut position is longer, to lower the shutter speed. An example of the low shutter speed defined by the pad 54 is ⅟₄₅ second.

The lens holder 56 of a plate shape is secured to the front side of the light-shielded tunnel 35. A lens barrel 57 is formed on the center of the lens holder 56. A photographing opening 58 is formed in the lens barrel 57. A cutout 59 is formed in a lateral wall of the lens barrel 57. A first lens element 60 and a second lens element 61 are contained in the lens barrel 57, and constitute the taking lens 5. An aperture stop mechanism as exposure amount changer is incorporated between the first and second lens elements 60 and 61, including a fixed aperture stop panel 62, a small aperture stop plate 63 and a spacer 64. The fixed aperture stop panel 62 is circular and has a small thickness. A large aperture stop opening 62a is formed in the center of the fixed aperture stop panel 62.

A lens retention plate 65 is fixedly secured to the front of the lens holder 56, and retains the taking lens 5 and other relevant elements in the lens barrel 57. Also, an intermediate ring 68 mounted on the periphery of the lens barrel 57 is retained by the lens retention plate 65.

The small aperture stop plate 63 is a V-shaped plate with a small thickness. A plate portion 63a at an end of the small aperture stop plate 63 has a size to close the large aperture stop opening 62a. A small aperture stop opening 63b is formed in the plate portion 63a. There are a hole 63c and a groove 63d formed in a second end portion of the small aperture stop plate 63. A pin 66 projects from the vicinity of the lens barrel 57 in the lens holder 56, is inserted in the hole 63c and keeps the small aperture stop plate 63 movable pivotally. The small aperture stop plate 63 passes the cutout 59 to move the plate portion 63a into and away from the lens barrel 57. The small aperture stop plate 63 swings between first and second positions, and when in the first position, opens the large aperture stop opening 62a fully, and when in the second position, partially blocks the large aperture stop opening 62a to stop down the aperture.

The intermediate ring 68 is supported on the lens barrel 57 in a rotatable manner. The intermediate ring 68 includes a spring connection pin 68a, a linking pin 68b, squeezing pins 68c and a receiving pin 68d. The spring connection pin 68a is used to retention of one end of a tension coil spring 70. The linking pin 68b is inserted in the groove 63d of the small aperture stop plate 63. The squeezing pins 68c are so disposed that the arm 53 of the shutter speed changing lever 49 is disposed between those two. The receiving pin 68d projects toward the rear, and is pressed mechanically by the photographic mode selection device.

A pin 71 projects from a lower portion of the lens holder 56, and used to retain a second end of the tension coil spring 70, which biases the intermediate ring 68 in the clockwise direction. Note that the intermediate ring 68 is kept in a predetermined position in connection with the small aperture stop plate 63.

A transmission plate 74 in a second guide mechanism is formed as one piece including the external operable button 15. A shifting lever 75 projects from the transmission plate 74 in a horizontal direction. When the external operable button 15 rotationally shifts from the second set position to the third set position, the shifting lever 75 of the transmission plate 74 pushes up the receiving pin 68d of the intermediate ring 68. Therefore, the intermediate ring 68 rotates in the counterclockwise direction.

Figure 10:
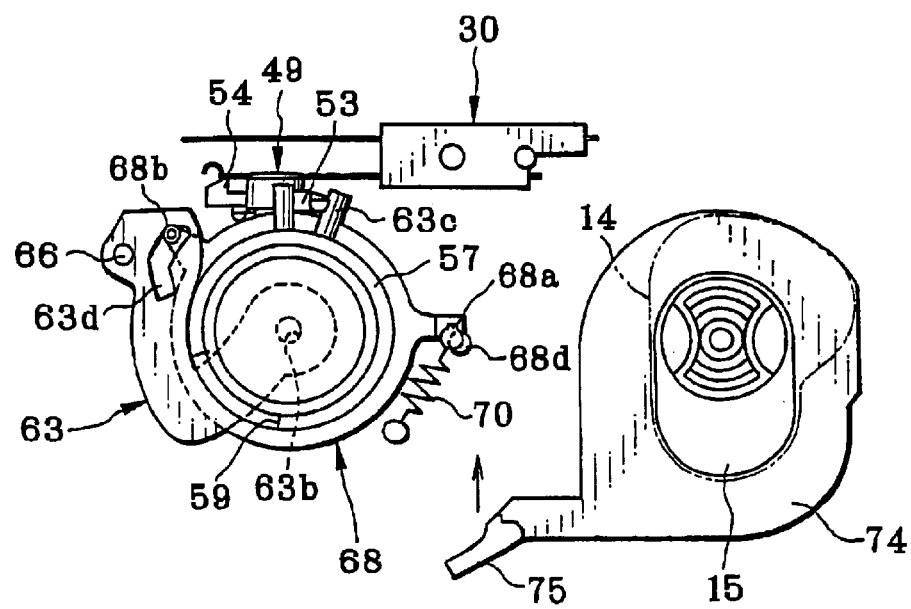
FIG. 10 is an explanatory view in elevation, illustrating a state of the mechanisms for the changeover in the daylight mode.
Figure 11:
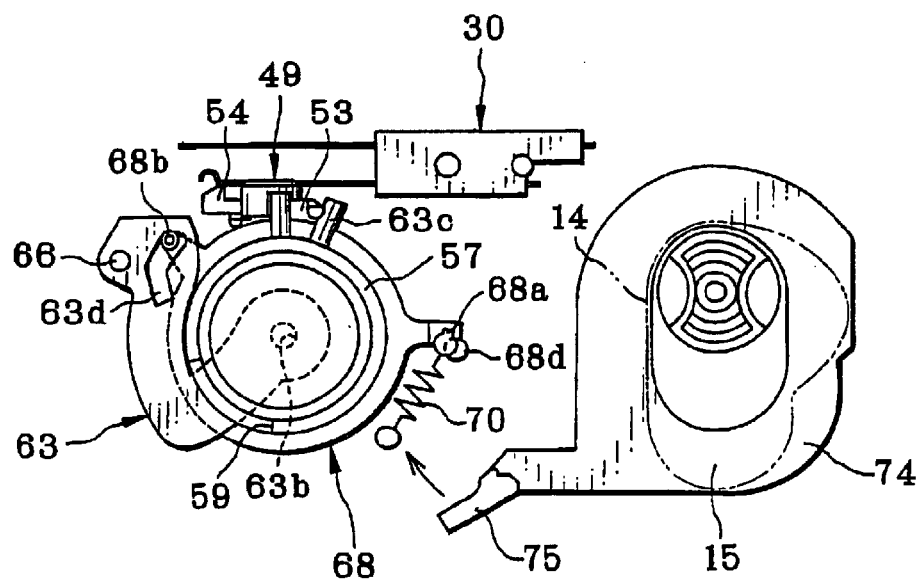
FIG. 11 is an explanatory view in elevation, illustrating a state of the mechanisms for the changeover in the daylight flash mode.

In FIGS. 10 and 11, states of the intermediate ring 68 in the daylight and daylight flash modes are illustrated. When the external operable button 15 is in each of the first and second set positions, the shifting lever 75 of the external operable button 15 does not contact the receiving pin 68d of the intermediate ring 68. Thus, the intermediate ring 68 is maintained in the initial position.

When the intermediate ring 68 is in the initial position, the small aperture stop plate 63 is set in the small aperture stop position where the plate portion 63a is inserted in the lens barrel 57. The small aperture stop opening 63b stops down the large aperture stop opening 62a to determine the small aperture stop state. An example of the f-number at the time of the small aperture stop state is f/14. Note that the squeezing pins 68c keep the shutter speed changing lever 49 in the high shutter speed position.

Figure 12:
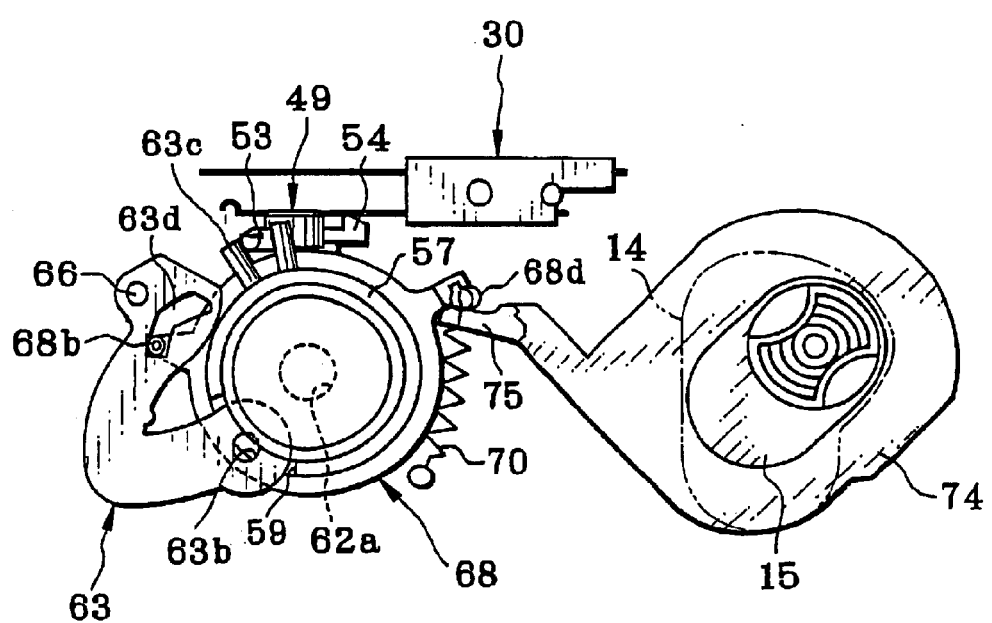
FIG. 12 is an explanatory view in elevation, illustrating a state of the mechanisms for the changeover in the night flash mode.

In FIG. 12, the external operable button 15 rotates from the second set position to the third set position. The shifting lever 75 pushes up the receiving pin 68d, and causes the intermediate ring 68 to rotate in the counterclockwise direction. In response, the small aperture stop plate 63 pressed by the linking pin 68b rotates in the clockwise direction. The plate portion 63a moves to an ineffective position for the large aperture stop, and away from the optical axis. An example of f-number at the large aperture stop is f/5.6. Also, the squeezing pins 68c cause the shutter speed changing lever 49 to rotate. The pad 54 is set in the low shutter speed position.

Figure 13:
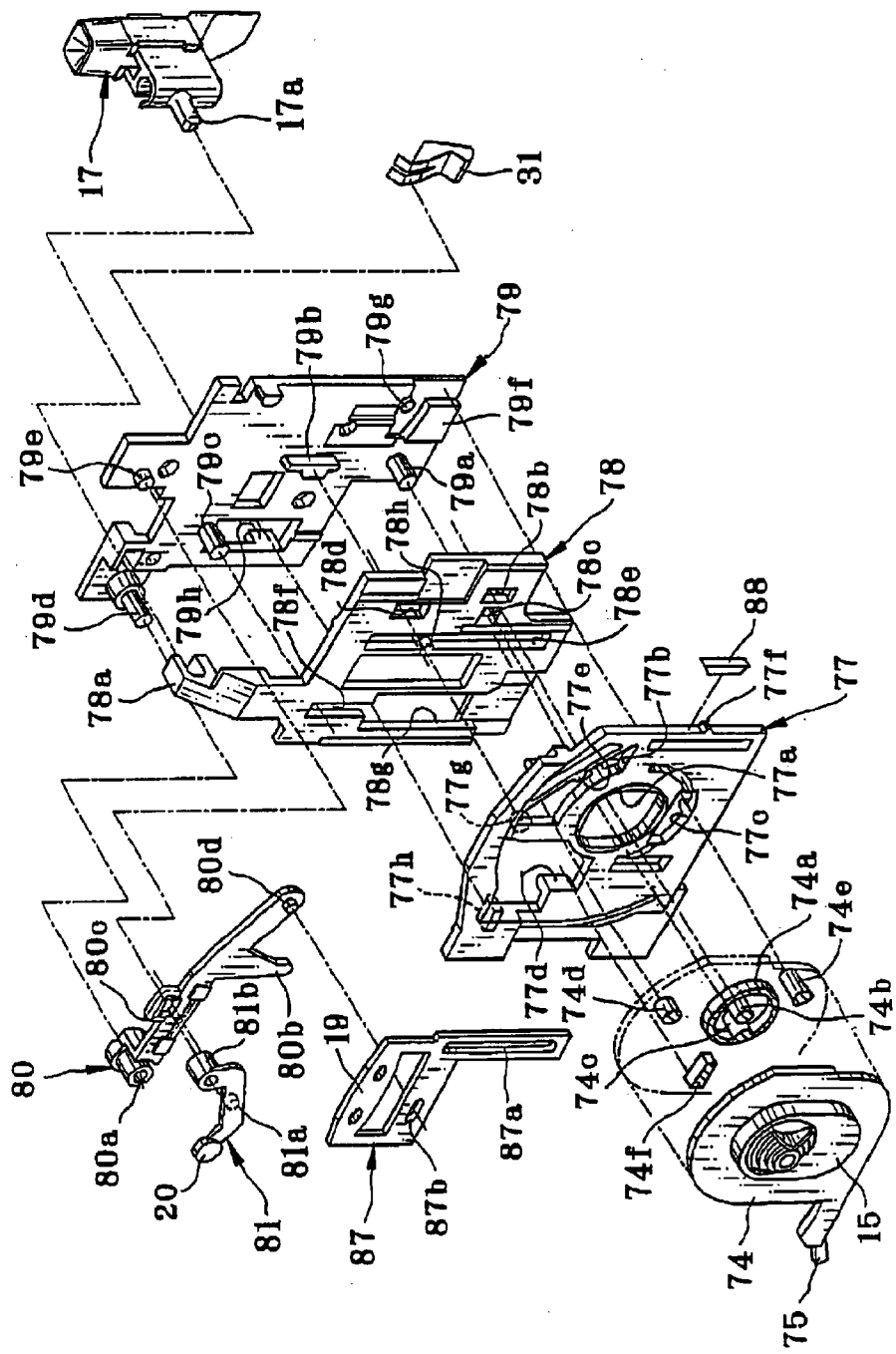
FIG. 13 is an exploded perspective illustrating a photographic mode selection device.

In FIG. 13, the construction of the movable selector 25 is illustrated. The movable selector 25 includes the external operable button 15, a guide bearing plate 77, a guide sliding plate 78, a guide receiving plate 79, a light reduction transmission lever 80, an indication lever 81, and a flash amount adjustor 87. Each of the guide bearing plate 77, the guide sliding plate 78 and the guide receiving plate 79 operates as guide mechanisms. The flash amount adjustor 87 operates as an exposure amount changer.

Figure 14:
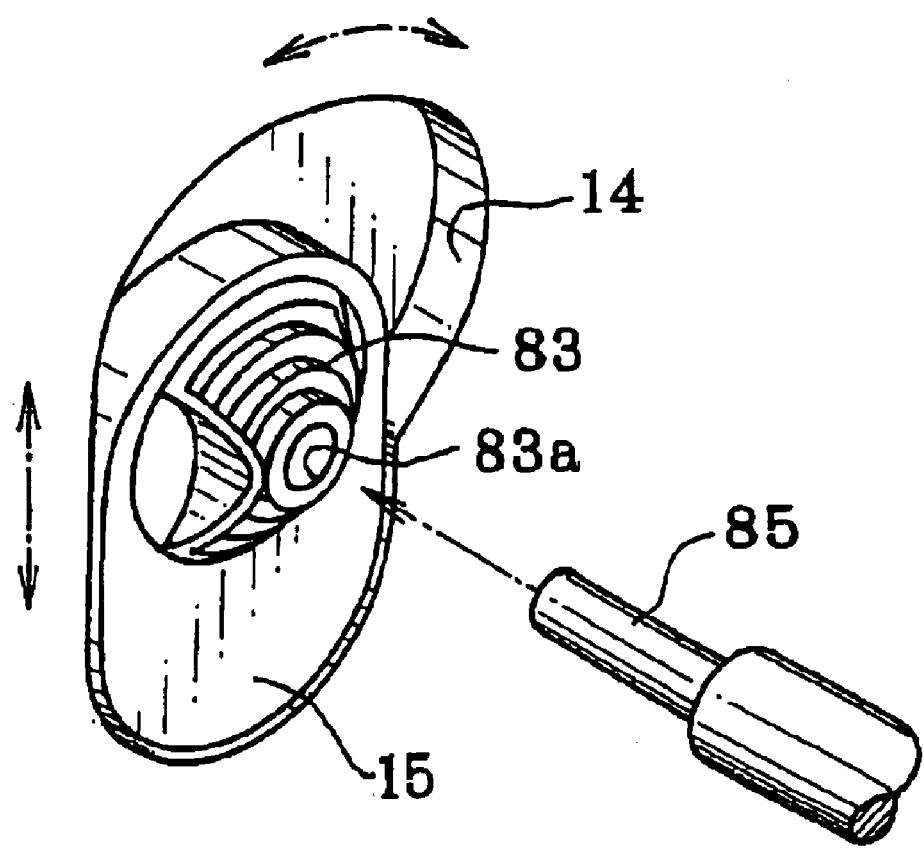
FIG. 14 is a perspective illustrating a state of inspection of the photographic mode selection device.

In FIG. 14, a projection portion 83 is formed with a front of the external operable button 15 nearly in a conical shape, and used for ensured touch of a finger with a good fitted state. A surface of the projection portion 83 is step-shaped for frictional contact of the finger. Also, a hole 83a is formed in the projection portion 83 for insertion of an inspection tool 85 of an inspection machine. The photographic mode selection device is inspected after completing the lens-fitted photo film unit 2. The inspection tool 85 is inserted in the hole 83a, and moved vertically and also rotated, to check operation of the movable selector 25.

The rear of the transmission plate 74 of the external operable button 15 is provided with a rotational hub ring 74a, sliding pins 74b and 74c, an engageable pin 74d, a guide pin 74e, and a light reduction shifting projection 74f. The sliding pins 74b and 74c slide the guide sliding plate 78. The engageable pin 74d operates for engagement in a clicked state in rotation of the external operable button 15. The guide pin 74e guides movement of the external operable button 15. The light reduction shifting projection 74f swings the light reduction transmission lever 80. The sliding pins 74b and 74c are disposed in the rotational hub ring 74a.

The guide bearing plate 77 includes a guide bearing opening 77a and openings 77b, 77c and 77d. The guide bearing opening 77a receives insertion of the rotational hub ring 74a of the external operable button 15. The openings 77b, 77c and 77d receive insertion of respectively the engageable pin 74d, the guide pin 74e and the light reduction shifting projection 74f. A projection 77e is formed to project from an edge of the opening 77c, and frictionally contacts the engageable pin 74d when the external operable button 15 is in the third set position for engagement with a clicked state.

The guide bearing plate 77 is slid up and down by movement of the external operable button 15 between the first and second set positions. When the external operable button 15 rotates between the second and third set positions, the guide bearing plate 77 does not move. The external operable button 15 is rotationally supported at the center defined by the guide bearing opening 77a.

A projection 77f is formed to project from a lateral edge of the guide bearing plate 77. A retention ridge 88 projects from an inner face of the front cover 26. The projection 77f, when the external operable button 15 moves between the first and second set positions, is engaged with the retention ridge 88 in a clicked state. Slots are formed in the vicinity of the projections 77e and 77f. Base portions of the projections 77e and 77f are resiliently flexed because of the slots when the engageable pin 74d moves past the projection 77e and when the retention ridge 88 moves past the projection 77f.

The rear of the guide bearing plate 77 is provided with a sliding pin 77g and a pressure projection 77h. The sliding pin 77g slides the guide sliding plate 78. The pressure projection 77h depresses the contact segment 31 or charger switch of the printed circuit board 29 in the flash unit 24, and charges the flash device.

An engagement fork 78a projects from the guide sliding plate 78, and engageable with a pin 17a formed with the signaling light guide 17. The guide sliding plate 78 includes openings 78b, 78c and 78d, guide slots 78e and 78f and an opening 78g. The openings 78b and 78c receive insertion of respectively the sliding pins 74b and 74c of the external operable button 15. The opening 78d receives insertion of the sliding pin 77g of the guide bearing plate 77. The guide slot 78e receives insertion of a guide projection 79a and a retention ridge 79b of the guide receiving plate 79. The guide slot 78f receives insertion of a guide projection 79c. The opening 78g receives insertion of the pressure projection 77h of the guide bearing plate 77. A projection 78h is formed to project from an edge of the guide slot 78e, and engageable with the retention ridge 79b of the guide receiving plate 79.

When the external operable button 15 shifts between the first and second set positions, the guide sliding plate 78 is slid up and down by the sliding pin 74b of the external operable button 15 and the sliding pin 77g of the guide bearing plate 77. When the external operable button 15 rotationally shifts between the second and third set positions, the sliding pin 74c presses the guide sliding plate 78 to slide the guide sliding plate 78 to a larger extent, the sliding pin 74c being disposed at a greater radius with reference to the rotational center of the external operable button 15.

The guide receiving plate 79 has the guide pins 79a and 79c and the retention ridge 79b. Also, the guide receiving plate 79 includes pins 79d and 79e, a regulation ridge 79f, a regulation pin 79g and an opening 79h. The pin 79d supports the light reduction transmission lever 80 in a rotatable manner. The pin 79e supports the indication lever 81 in a rotatable manner. The regulation ridge 79f contacts the guide pin 74e of the external operable button 15. The regulation pin 79g contacts the guide pin 74e. The opening 79h receives insertion of the pressure projection 77h of the guide bearing plate 77. The opening 79h is opposed to the contact segment 31 of a charger switch of the flash unit 24.

The guide receiving plate 79 is secured to the front of the printed circuit board 29 of the flash unit 24. The guide pins 79a and 79c and the retention ridge 79b guides the guide sliding plate 78, the guide bearing plate 77 and the external operable button 15. The regulation ridge 79f of the guide receiving plate 79 contacts the guide pin 74e of the external operable button 15, prevents the external operable button 15 in the first set position from rotating, and prevents the external operable button 15 in the third set position from sliding down. The regulation pin 79g of the guide receiving plate 79 contacts the guide pin 74e when the external operable button 15 is in the second set position, and blocks accidental rotation of the external operable button 15 to the third set position even upon occurrence of mechanical shock or vibration.

The light reduction transmission lever 80 includes a boss 80a, a shifting projection 80b, a linking hole 80c and a linking pin 80d. The boss 80a has a hole in which the pin 79d of the guide receiving plate 79 is inserted. The shifting projection 80b is pushed upwards by the light reduction shifting projection 74f of the external operable button 15. The linking hole 80c receives insertion of a linking pin 81a of the indication lever 81. The linking pin 80d is linked with the flash amount adjustor 87.

A slot 87a is formed in the flash amount adjustor 87 under the light reducing panel 19, and extends vertically. A slot 87b is formed in the flash amount adjustor 87, and extends horizontally. Two pins 26a and 26b project from the inner face of the front cover 26 and under the flash emitter, and are inserted in the slot 87a. See FIG. 18. Therefore, the flash amount adjustor 87 is slidable up and down on the front cover 26. Note that the linking pin 80d of the light reduction transmission lever 80 is inserted in the slot 87b.

The indication lever 81 includes a boss 81b, the mode indicia disk 20 and the linking pin 81a. The boss 81b has a hole in which the pin 79e of the guide receiving plate 79 is inserted. The mode indicia disk 20 is movable toward and away from the front of the viewfinder 6. The linking pin 81a is inserted in the linking hole 80c of the light reduction transmission lever 80. When the light reduction transmission lever 80 is moved up by means of the external operable button 15 to set the light reducing panel 19 in front of the flash emitter 7, the linking pin 81a of the indication lever 81 is pushed to rotate by an edge of the linking hole 80c of the light reduction transmission lever 80. Therefore, the mode indicia disk 20 is set in front of the viewfinder 6.

Figure 15:
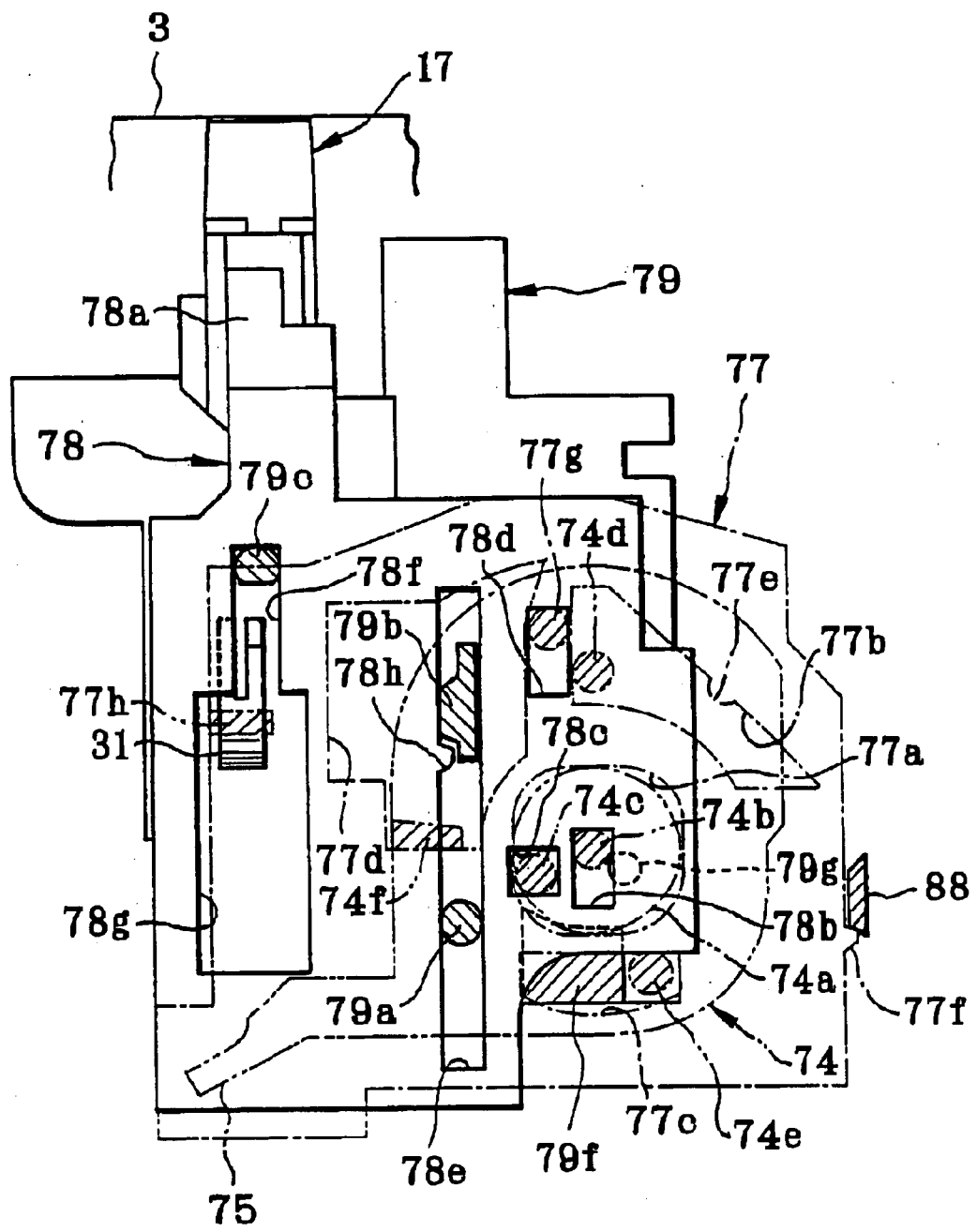
FIG. 15 is an explanatory view in elevation, illustrating a state of the photographic mode selection device in the daylight mode.
Figure 16:
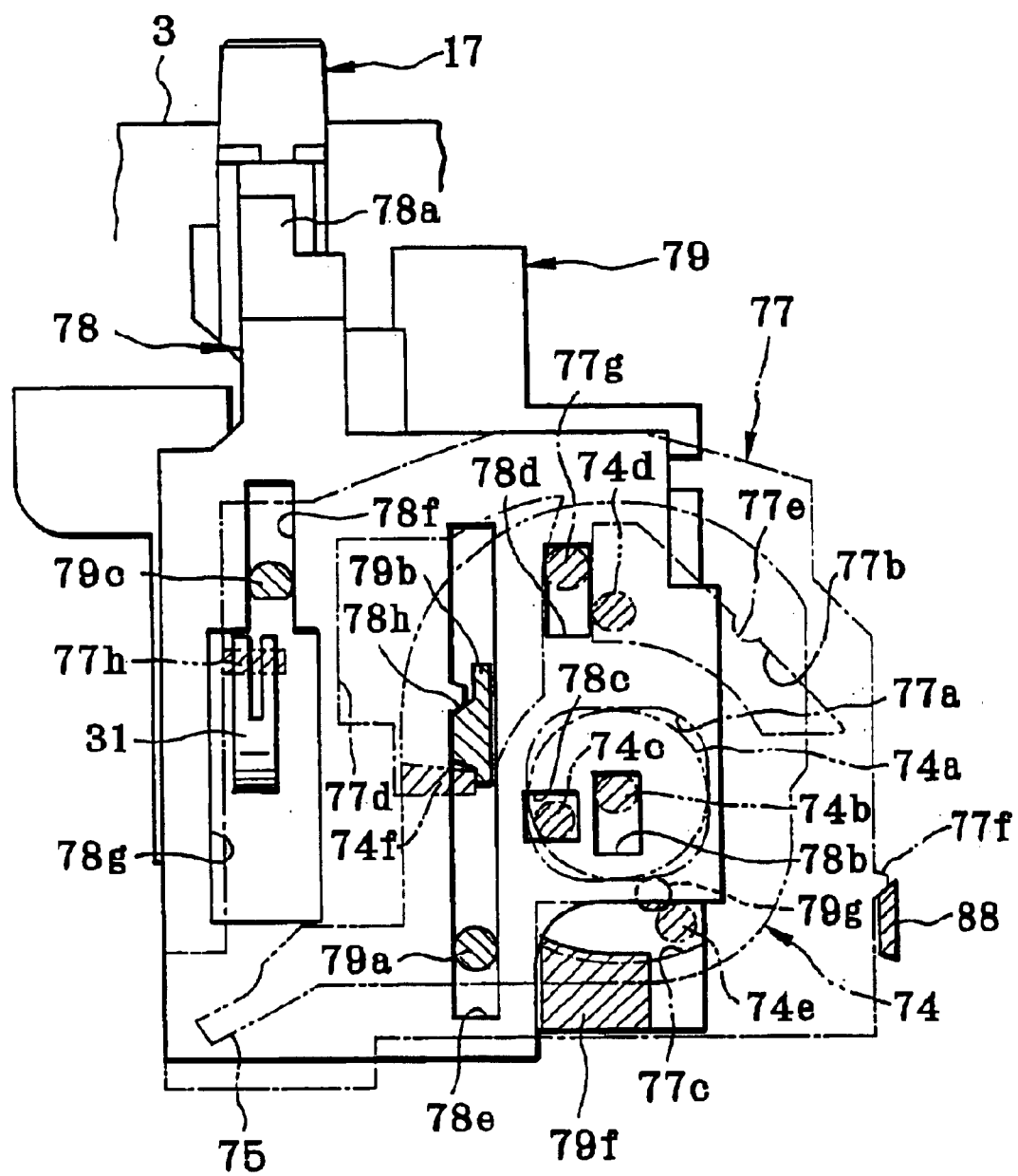
FIG. 16 is an explanatory view in elevation, illustrating a state of the photographic mode selection device in the daylight flash mode.
Figure 17:
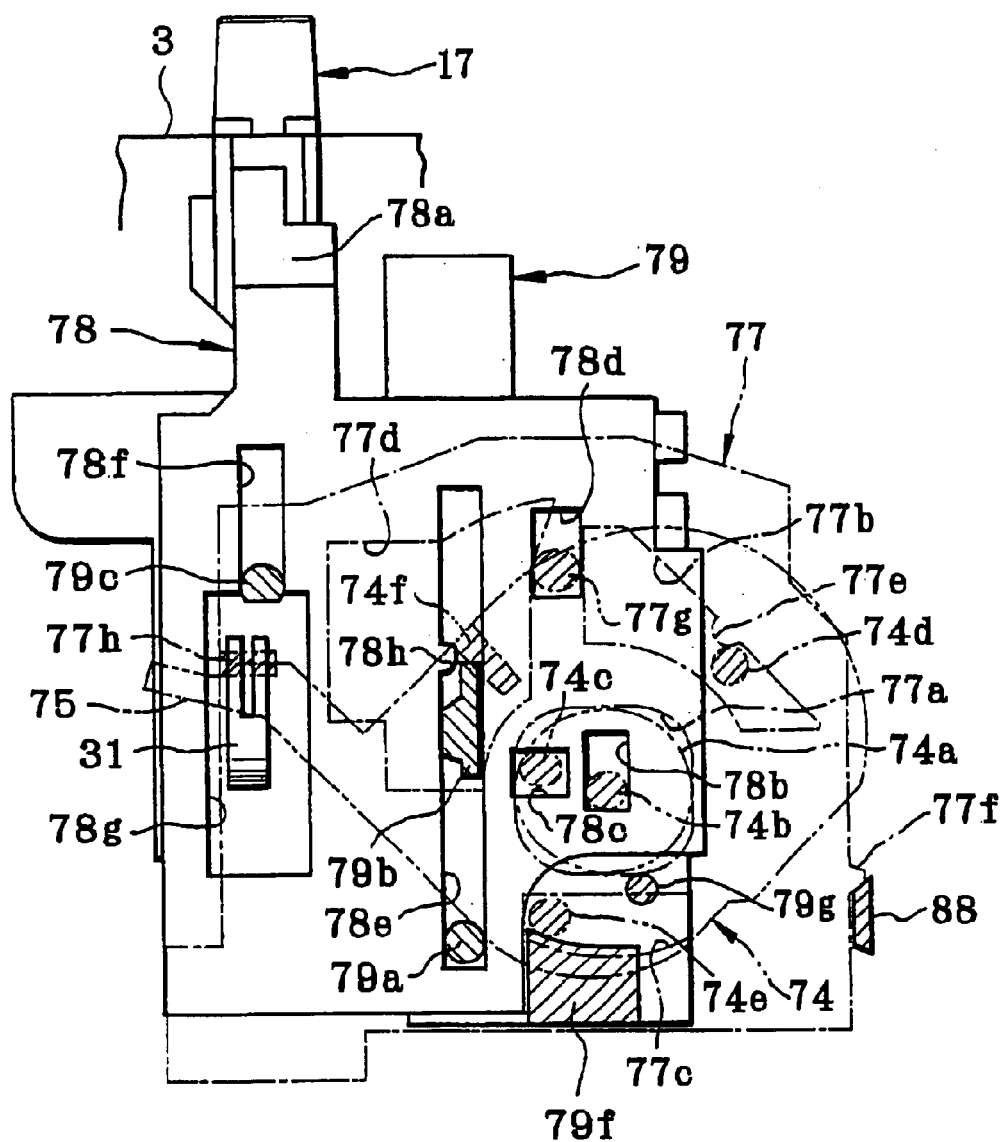
FIG. 17 is an explanatory view in elevation, illustrating a state of the photographic mode selection device in the night flash mode.

In FIGS. 15–17, states of the external operable button 15, the guide bearing plate 77, the guide sliding plate 78, the signaling light guide 17 and the guide receiving plate 79 are illustrated for the first, second and third photographic modes. It is to be noted that, in those drawings, signs are used in a simplified form for the purpose of clarification. In the external operable button 15, the contour of the rotational hub ring 74a of the transmission plate 74, the pins 74b–74e and the light reduction shifting projection 74f are indicated by the phantom lines. Portions for the pins 74b–74e and the light reduction shifting projection 74f are hatched. In the guide bearing plate 77, its contour, the openings 77a–77d, the sliding pin 77g and the pressure projection 77h are indicated by the broken lines. Portions for the sliding pin 77g and the pressure projection 77h are hatched. In the guide sliding plate 78, its contour and the openings 78b–78g are indicated by the solid lines. In the guide receiving plate 79, its contour, the guide pins 79a and 79c, the retention ridge 79b, the regulation ridge 79f and the regulation pin 79g are indicted by the solid lines.

In FIG. 15, the movable selector 25 in the daylight mode has the external operable button 15 set in the first set position. The guide bearing plate 77 and the guide sliding plate 78 are in their lowest positions in movable ranges. The projection 77f of the guide bearing plate 77 is engaged with the retention ridge 88 of the front cover 26. The projection 78h of the guide sliding plate 78 is engaged with the retention ridge 79b of the guide receiving plate 79. This prevents the external operable button 15 from accidentally sliding toward the second set position. As the guide pin 74e of the external operable button 15 contacts a lateral edge of the regulation ridge 79f of the guide receiving plate 79, the external operable button 15 does not rotate from the first set position.

Figure 18:
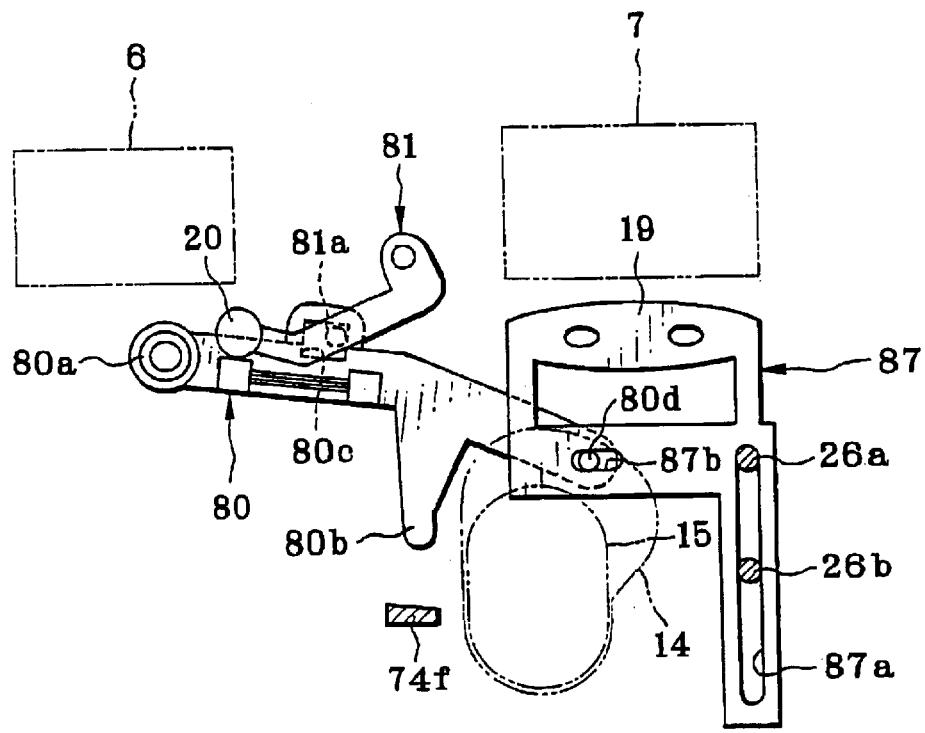
FIG. 18 is an explanatory view in elevation, illustrating a state of a light reduction transmission lever and an indication lever in the daylight mode.

At the time of the daylight mode or first photographic mode, the signaling light guide 17 does not protrude from the upper face of the housing 3. In FIG. 18, the light reduction shifting projection 74f of the external operable button 15 does not contact the shifting projection 80b of the light reduction transmission lever 80. The light reducing panel 19 is not located in front of the flash emitter 7. The mode indicia disk 20 of the indication lever 81 does not appear in front of the viewfinder 6, either.

In FIG. 16, the external operable button 15 slides from the first set position to the second set position. The guide bearing plate 77 slides up together, as the guide bearing opening 77a is engaged with the rotational hub ring 74a. The pressure projection 77h of the guide bearing plate 77 pushes the contact segment 31 in the charger switch in the flash unit 24, to start charging the flash device. Also, the guide sliding plate 78 is pushed by the sliding pin 74b of the external operable button 15 and the sliding pin 77g of the guide bearing plate 77, and is slid up. The slide of the guide sliding plate 78 moves up the signaling light guide 17, and causes the signaling light guide 17 to project from an upper face of the housing 3.

Figure 19:
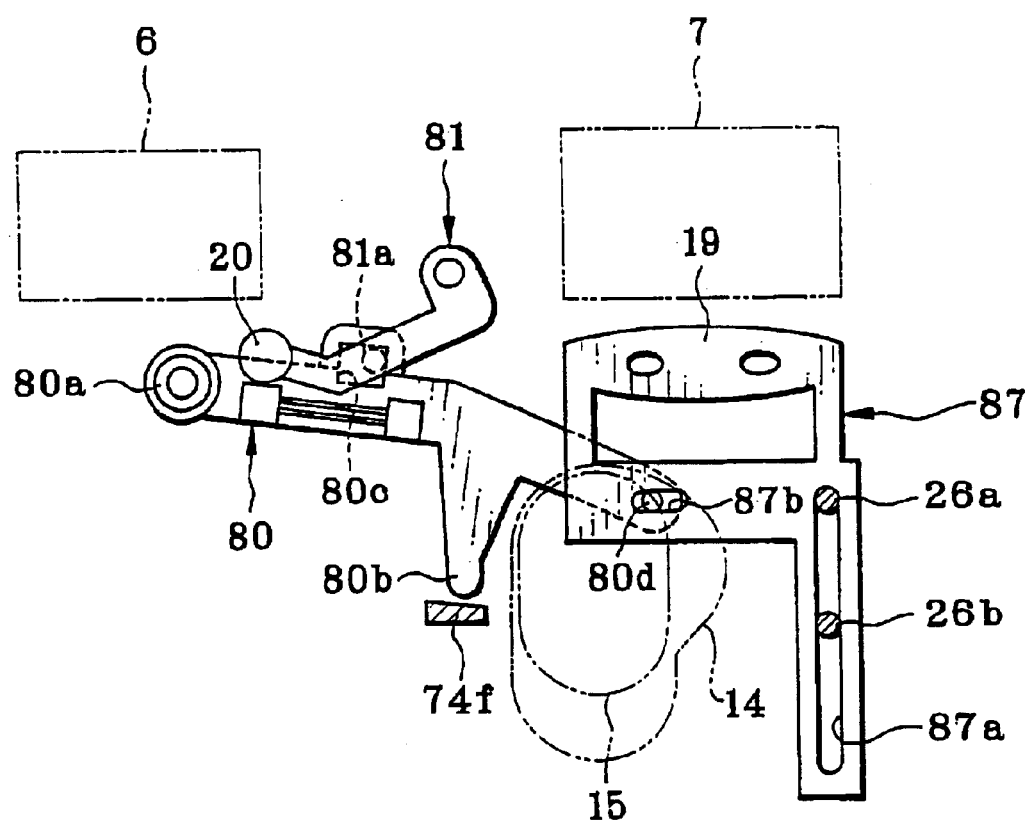
FIG. 19 is an explanatory view in elevation, illustrating a state of the light reduction transmission lever and the indication lever in the daylight flash mode.

The light reduction shifting projection 74f of the external operable button 15, as depicted in FIG. 19, does not contact the shifting projection 80b of the light reduction transmission lever 80 even in the daylight flash mode or second photographic mode. The light reducing panel 19 and the mode indicia disk 20 do not become externally visible in the front of the lens-fitted photo film unit 2.

Even if shock or vibration occurs to the external operable button 15, the external operable button 15 does not slide to the first set position, because the projection 77f of the guide bearing plate 77 is engaged with the retention ridge 88 of the front cover 26, and because the projection 78h of the guide sliding plate 78 is engaged with the retention ridge 79b of the guide receiving plate 79. The external operable button 15 does not rotate to the third set position either, because the guide pin 74e of the external operable button 15 contacts the regulation pin 79g of the guide receiving plate 79.

In FIG. 17, the shift of the external operable button 15 from the second set position to the third set position is illustrated. The external operable button 15 rotates in the clockwise direction about the rotational hub ring 74a that is supported in the guide bearing opening 77a in a rotatable manner. The sliding pin 74c presses an edge of the opening 78c of the guide sliding plate 78, to move up the guide sliding plate 78 higher than a level at the time of the daylight flash mode or second photographic mode. Consequently, an amount of protrusion of the signaling light guide 17 over the upper face of the housing 3 becomes greater. Note that the guide bearing plate 77 does not move between the second and third photographic modes. The charger switch in the flash unit 24 is kept turned on.

Figure 20:
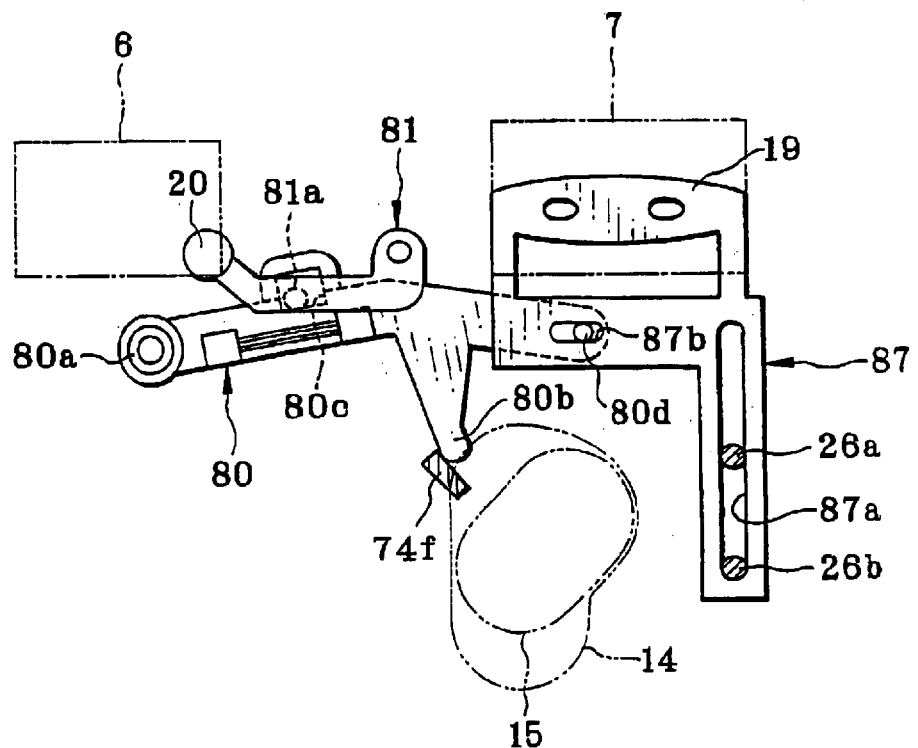
FIG. 20 is an explanatory view in elevation, illustrating a state of the light reduction transmission lever and the indication lever in the night flash mode.

In FIG. 20, the external operable button 15 in the third set position causes the light reduction shifting projection 74f to push up the shifting projection 80b of the light reduction transmission lever 80. The light reduction transmission lever 80 rotates in the counterclockwise direction about the boss 80a. The linking pin 80d of the light reduction transmission lever 80 shifts up the flash amount adjustor 87. The light reducing panel 19 of the flash amount adjustor 87 is set in front of the flash emitter 7. As the linking pin 81a of the indication lever 81 is pushed by the edge of the linking hole 80c of the light reduction transmission lever 80, the indication lever 81 rotates in the clockwise direction to set the mode indicia disk 20 in front of the viewfinder 6.

Note that the guide sliding plate 78 does not slide down even if mechanical shock or vibration occurs, because the projection 77f of the guide bearing plate 77 is engaged with the retention ridge 88 of the front cover 26, and because the guide pin 74e of the external operable button 15 contacts an upper portion of the regulation ridge 79f of the guide receiving plate 79. Furthermore, occurrence of shock or vibration does not rotate the external operable button 15 to the second set position, because the engageable pin 74d of the external operable button 15 is engaged with the projection 77e of the guide bearing plate 77.

The operation of the above construction is described now. In FIG. 1, the lens-fitted photo film unit 2, when in the daylight mode, has the photographic mode selection device 8 of which the external operable button 15 is set in the first set position that is located the lowest in the moving path gap 14.

Figure 6:
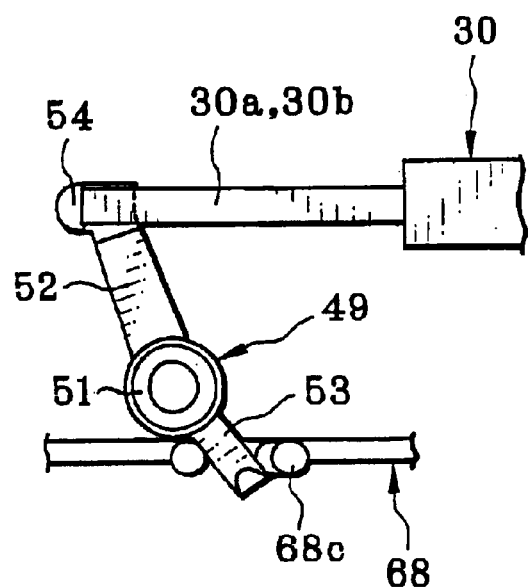
FIG. 6 is an explanatory view in plan, illustrating a shutter speed changing mechanism set for a high shutter speed.

In the daylight mode, the intermediate ring 68 is biased by the tension coil spring 70 and set in the initial position. See FIG. 10. At this time, the small aperture stop plate 63 is set in the small aperture stop position. The shutter speed changing lever 49 is set in the high shutter speed position as depicted in FIG. 6.

In FIG. 15, the transmission plate 74, the guide bearing plate 77 and the guide sliding plate 78 are in their lower positions in the daylight mode. The contact segment 31 in the charger of the flash unit 24 is not depressed. There is no protrusion of the signaling light guide 17 over the upper face of the housing 3.

In FIG. 18, the light reduction shifting projection 74f of the transmission plate 74 in the daylight mode does not contact the shifting projection 80b of the light reduction transmission lever 80. The light reducing panel 19 and the mode indicia disk 20 do not appear visibly in the front of the lens-fitted photo film unit 2.

When an exposure is taken in the daylight mode, no flash light is emitted. The aperture stop is set in the small aperture stop state. In FIG. 8, the shutter speed changing lever 49 reduces the range of rotation of the shutter blade 38, to set the shutter speed high. Thus, it is possible to take an exposure optimized for an outdoor scene with high brightness under daylight.

In FIG. 2, the external operable button 15 of the photographic mode selection device 8 is slid to the second set position in an upper portion of the moving path gap 14. The lens-fitted photo film unit 2 is set in the daylight flash mode.

In the daylight flash mode, the intermediate ring 68 is also maintained in the initial position. See FIG. 11. The aperture stop is set in the small aperture stop state. The shutter speed is high. These are the same as in the daylight mode.

In FIG. 16, the transmission plate 74, the guide bearing plate 77 and the guide sliding plate 78 are slid up in the daylight flash mode. The contact segment 31 in the charger switch of the flash unit 24 is depressed and turned on by the pressure projection 77h of the guide bearing plate 77. Thus, the flash unit 24 is charged.

The guide sliding plate 78 pushes up the signaling light guide 17 in a projecting state over the upper face of the housing 3. After completion of the charging, the light emitting element in the flash unit 24 is turned on continuously or in a blinking state. Light from the light emitting element is introduced into the signaling light guide 17, and emanated by the signaling light guide 17 to the outside of the housing 3.

In FIG. 19, the light reduction shifting projection 74f of the transmission plate 74 does not contact the shifting projection 80b of the light reduction transmission lever 80 either in the daylight flash mode. The externally invisible state of the light reducing panel 19 and the mode indicia disk 20 is maintained.

At the time of an exposure in the daylight flash mode, flash light is emitted. Because of the small aperture stop and the high shutter speed, an exposure can be taken in an optimized condition for sync exposure in an outdoor scene with high brightness.

In FIG. 3, the external operable button 15 of the photographic mode selection device 8 is rotationally shifted from the second set position to the third set position. The lens-fitted photo film unit 2 is set in the night flash mode.

Figure 7:
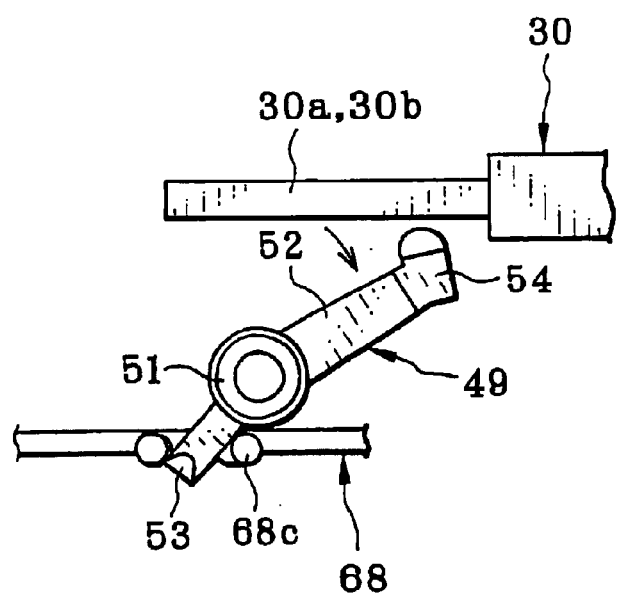
FIG. 7 is an explanatory view in plan, illustrating the shutter speed changing mechanism set for a low shutter speed.

In the night flash mode, the shifting lever 75 in the transmission plate 74 pushes up the receiving pin 68d of the intermediate ring 68. See FIG. 12. The intermediate ring 68 rotates from the initial position in the counterclockwise direction against the tension coil spring 70. Rotation of the intermediate ring 68 causes the small aperture stop plate 63 to rotate to the large aperture stop position, to render the large aperture stop opening 62a effective on the optical axis for an exposure. In FIG. 7, the shutter speed changing lever 49 is set in the low shutter speed position.

In FIG. 17, the transmission plate 74 is rotated together with the movable selector 25 in the night flash mode. The guide sliding plate 78 is slid further in the upward direction than the daylight flash mode. The signaling light guide 17 slightly moves up, and still operates for indicating the completion of the flash charging operation. Note that the guide bearing plate 77 is kept positioned in the same manner as the daylight flash mode. The charger switch of the flash unit 24 is kept turned on.

In the night flash mode, the light reduction shifting projection 74f of the transmission plate 74 pushes the shifting projection 80b. See FIG. 20. The light reduction transmission lever 80 rotates in the counterclockwise direction, to set the light reducing panel 19 in front of the flash emitter 7. According to rotation of the light reduction transmission lever 80, the indication lever 81 rotates, to set the mode indicia disk 20 in front of the viewfinder 6. A user to take a photograph can observe a scene through the viewfinder 6, and can be informed of the night flash mode.

Flash light is emitted in taking an exposure in the night flash mode. However, an amount of the flash light is reduced by the light reducing panel 19 partially masking the flash emitter. Ambient light of a background around a principal object is received at a higher amount because of the large aperture stop state and the low shutter speed. Consequently, no overexposure occurs even at night or indoors. The principal object and the background can be photographed in a well-balanced condition.

If a user is not very familiar with the differences between the photographic modes, it is likely that he or she commits an error in exactly designating one mode. However, the lens-fitted photo film unit 2 of the invention is constructed so that the probability of designating the daylight flash mode is high if an error is likely to occur in the designation. This is because the daylight flash mode is assigned to the intermediate position or second set position among the three set positions.

One of the daylight mode and the daylight flash mode is selected by the vertical sliding operation. Only the night flash mode is designated by the rotating operation. This is effective in giving impression to a user as to the night flash mode as a special mode. It is possible to raise a ratio of opportunity of selecting the daylight flash mode over the night flash mode.

No overexposure occurs in the daylight flash mode even for an outdoor scene under daylight, a night scene or an indoor scene. Thus, no extraordinary error occurs even if a user is uncertain about exact designation of the modes.

Figures 21A, 21B, 21C:
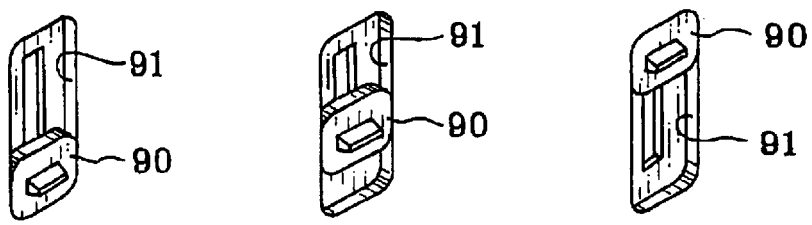
FIG. 21A is a perspective illustrating another preferred external operable button in a position for the daylight mode.
FIG. 21B is a perspective illustrating the button of FIG. 21A in a position for the daylight flash mode.
FIG. 21C is a perspective illustrating the button of FIG. 21A in a position for the night flash mode.

In the above embodiment, the rotational movement for selection of the second and third photographic modes is distinct from the sliding movement for selection of the first and second photographic modes. However, it is possible to use a simplified construction of FIGS. 21A–21C. An external operable button 90 in a movable selector is movable in a moving path gap 91 between first, second and third set positions to designate one of the daylight mode, the daylight flash mode and the night flash mode.

Figure 22:
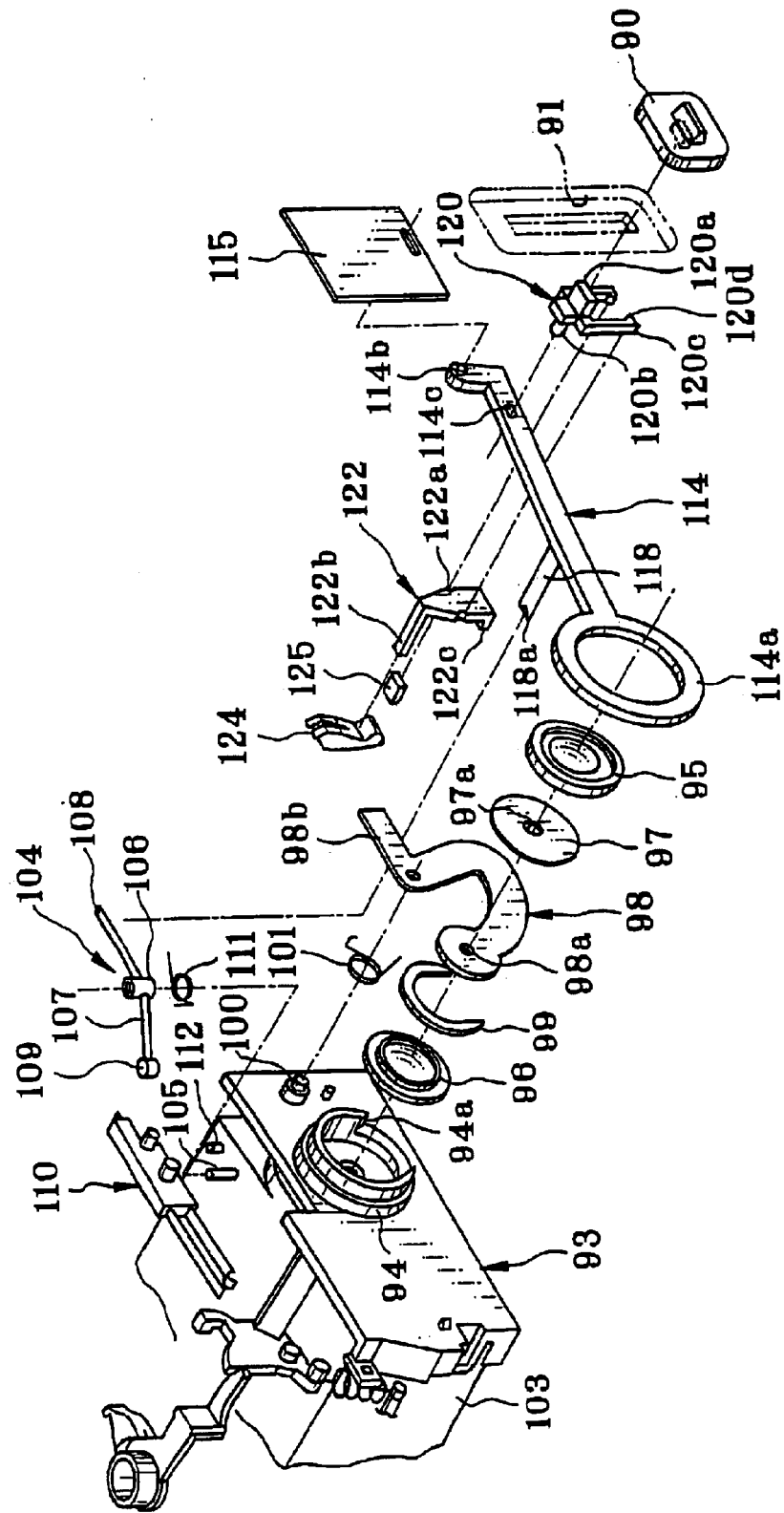
FIG. 22 is an exploded perspective illustrating a photographic mode selection device with the button of FIGS. 21A–21C.

In FIG. 22, details of the preferred embodiment are illustrated in which the external operable button is vertically slid between the first, second and third set positions. Elements similar to those in the above embodiment are designated with identical reference numerals.

A lens holder 93 has a lens barrel 94, in which a first lens element 95 and a second lens element 96 are contained. Elements are disposed between the first and second lens elements 95 and 96, including a fixed aperture stop panel 97, a small aperture stop plate 98 and a spacer 99. The fixed aperture stop panel 97 has a large aperture stop opening 97a. A cutout 94a is formed in a lateral wall of the lens barrel 94, and receives passage of the small aperture stop plate 98.

The small aperture stop plate 98 has a V-shape. A small aperture stop opening 98a is formed in one end portion of the small aperture stop plate 98. A pin 100 projects from the vicinity of the lens barrel 94 of the lens holder 93, and supports the small aperture stop plate 98 in a rotatable manner. The small aperture stop plate 98, when in the position of FIGS. 23 and 24, sets the small aperture stop opening 98a on the optical axis, and when in the position of FIG. 25, sets the small aperture stop opening 98a away from the optical axis.

A torsion coil spring 101 is retained on the pin 100, and biases the small aperture stop plate 98 in a direction to insert the small aperture stop opening 98a in the optical axis. A linking arm 98b is formed on a second end of the small aperture stop plate 98, and extends horizontally.

A pin 105 projects from an upper face of a light-shielded tunnel 103. A shutter speed changing lever 104 is supported by the pin 105 in a rotatable manner. The shutter speed changing lever 104 includes a boss 106, arms 107 and 108 and a pad 109. The boss 106 is supported by the pin 105. The arms 107 and 108 project from the boss 106. The pad 109 is formed with an end of the arm 107.

Figure 23:
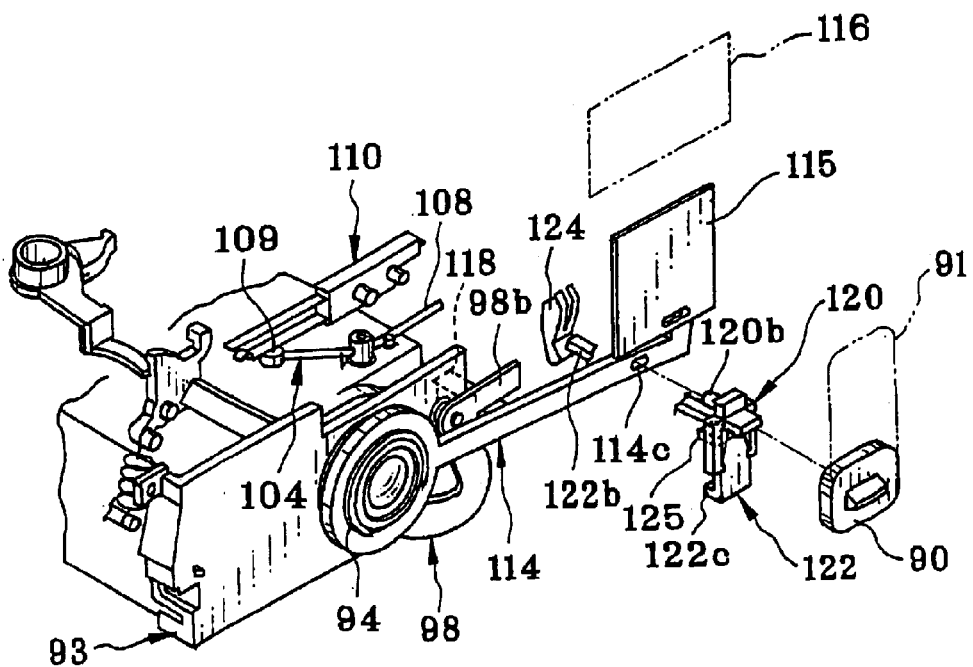
FIG. 23 is an exploded perspective illustrating a state of the photographic mode selection device in the daylight mode.
Figure 24:
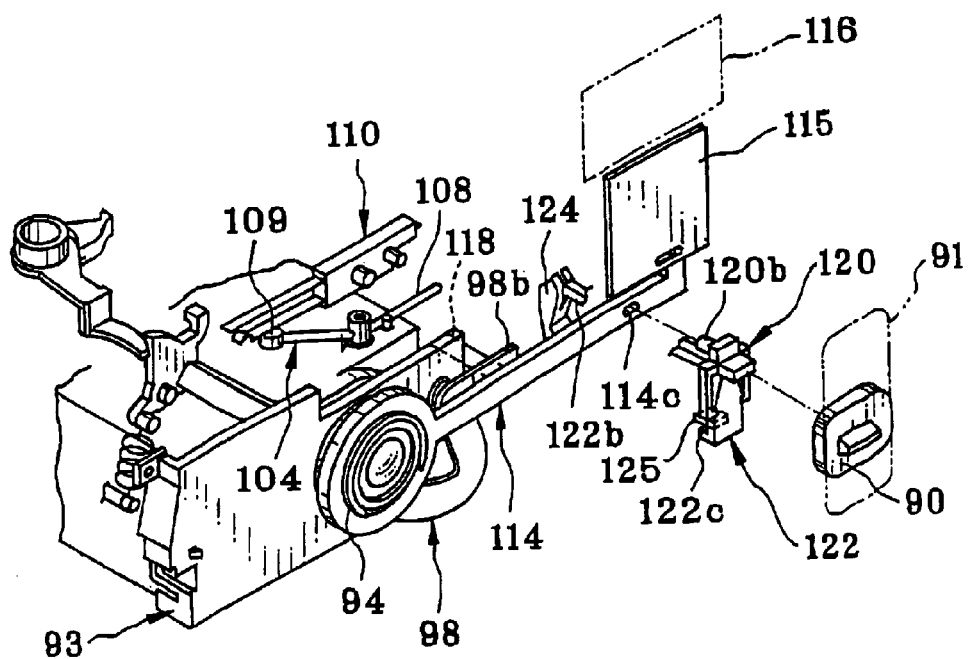
FIG. 24 is an exploded perspective illustrating a state of the photographic mode selection device in the daylight flash mode.
Figure 25:
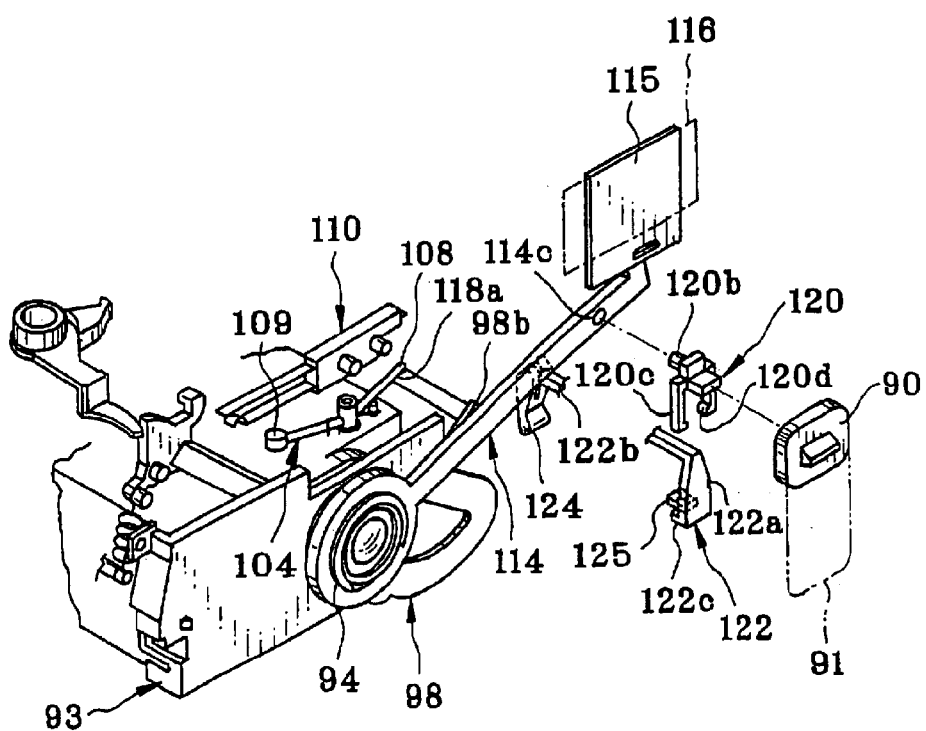
FIG. 25 is an exploded perspective illustrating a state of the photographic mode selection device in the night flash mode.

The flash device includes a sync switch 110. The shutter speed changing lever 104 is movable between high and low shutter speed positions, and when in the high shutter speed position, sets the pad 109 under the sync switch 110 as depicted in FIGS. 23 and 24, and when in the low shutter speed position, sets the pad 109 away from under the sync switch 110 as depicted in FIG. 25. A torsion coil spring 111 biases the shutter speed changing lever 104. The high shutter speed position is an initial position of the shutter speed changing lever 104 because of the torsion coil spring 111 and the contact with a positioning pin 112.

A shifting lever 114 is provided with a hub ring portion 114a, which is supported by the outside of the lens barrel 94 in a rotatable manner. An end portion of the shifting lever 114 is bent in an L-shape. A pin 114b projects from the end portion of the shifting lever 114. A light reducing panel 115 in a flash amount adjustor is secured to the pin 114b. The light reducing panel 115 is guided in a vertically slidable manner on the inner face of the front cover. When the shifting lever 114 rotates about the center of the hub ring portion 114a, the light reducing panel 115 is set in front of and away from a flash emitter 116. See FIGS. 23–25.

A linking pin 118 projects from a middle portion of the shifting lever 114 toward the rear. When the shifting lever 114 rotates, the linking pin 118 pushes and rotates the linking arm 98b of the small aperture stop plate 98. Also, an inclined face 118a is formed on an end of the linking pin 118 for rotating the shutter speed changing lever 104 against the spring bias when in contact with the arm 108 of the shutter speed changing lever 104.

A first slidable member 120 is disposed on the inside of the front cover at the moving path gap 91, and is connected with the external operable button 90 through a slot in the moving path gap 91. The first slidable member 120 includes a connection projection 120a, a pin 120b and a resilient fork 120c. The connection projection 120a is fixedly secured to the rear of the external operable button 90. The pin 120b is inserted in a slot 114c formed in an end portion of the shifting lever 114. The resilient fork 120c includes two projections directed downwards. Claws 120d project from ends of the resilient fork 120c.

A second slidable member or flash charger 122 is nipped by the resilient fork 120c of the first slidable member 120, and slid together with the first slidable member 120. Connection notches 122a are formed in lateral portions of the flash charger 122, for engagement with the claws 120d of the resilient fork 120c. The flash charger 122 includes a pressure pin 122b and a connection portion 122c. The pressure pin 122b pushes a contact segment 124 of the charger switch of the flash device. The connection portion 122c contacts a stopper projection 125 in a plate shape disposed on the flash device.

In FIG. 23, the external operable button 90 is set in the first set position. The first slidable member 120 connected with the external operable button 90 is in the lowest position in its sliding range. The pressure pin 122b of the flash charger 122 does not push the contact segment 124. No charging occurs in the flash unit.

As the shifting lever 114 has been rotated in the clockwise direction by the first slidable member 120, the light reducing panel 115 is located under the flash emitter 116. The linking pin 118 of the shifting lever 114 is located in its lowest position in the movable range, and thus does not contact the small aperture stop plate 98 or the shutter speed changing lever 104. The lens-fitted photo film unit is set in the daylight mode or first photographic mode in the state without emission of flash light, with the small aperture stop and with the high shutter speed.

In FIG. 24, the external operable button 90 is set in the second set position. In response, the first slidable member 120 and the flash charger 122 are slid up. The pressure pin 122b of the flash charger 122 presses the contact segment 124, to start charging in the flash unit.

When the shifting lever 114 is rotated in the counterclockwise direction by the upward slide of the first slidable member 120. However, the light reducing panel 115 is not set in front of the flash emitter 116. The linking pin 118 does not contact the small aperture stop plate 98 or the shutter speed changing lever 104. Thus, the lens-fitted photo film unit is set in the daylight flash mode or second photographic mode in the state with emission of flash light, with the small aperture stop and with the high shutter speed.

In FIG. 25, the external operable button 90 is set in the third set position. In response, the first slidable member 120 and the flash charger 122 are slid up. However, the flash charger 122 is stopped in the position for the daylight flash mode, because the connection portion 122c is blocked by the stopper projection 125. The first slidable member 120 is disengaged from the flash charger 122, and slides up separately. The flash charger 122 keeps pressing the contact segment 124.

The shifting lever 114 is rotated in the counterclockwise direction by the upward slide of the first slidable member 120. In response, the light reducing panel 115 is set in front of the flash emitter 116. The linking pin 118 pushes the linking arm 98b of the small aperture stop plate 98, and sets the small aperture stop plate 98 away from the optical axis. The inclined face 118a of the linking pin 118 contacts the arm 108 of the shutter speed changing lever 104, and rotates the shutter speed changing lever 104 to the low shutter speed position. Thus, the lens-fitted photo film unit is set in the night flash mode or third photographic mode in the state with emission of reduced flash light, with the large aperture stop and with the low shutter speed.

It follows in the present embodiment that occurrence of an overexposed state can be prevented, because an unfamiliar user can be caused to designate the daylight flash mode to which the intermediate position is assigned in the moving path of the external operable button 90.

Figures 26A, 26B, 26C:
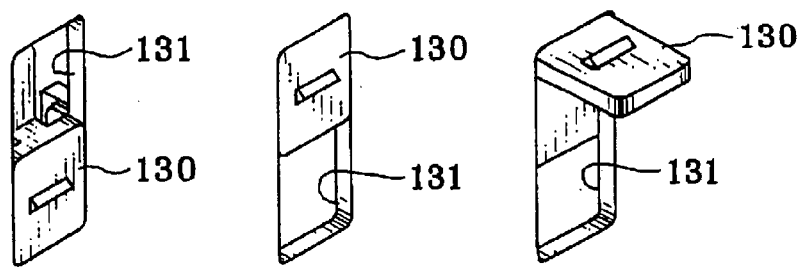
FIGS. 26A–26C are perspectives illustrating one preferred external operable button with a slidable and pullable structure.

In FIGS. 26A–26C, another preferred embodiment is illustrated. An external operable button 130 in a movable selector is vertically slidable in a moving path gap 131 between the first and second set positions. When in the second set position, the external operable button 130 is pulled toward the front and can be set in the third set position.

Figure 27:
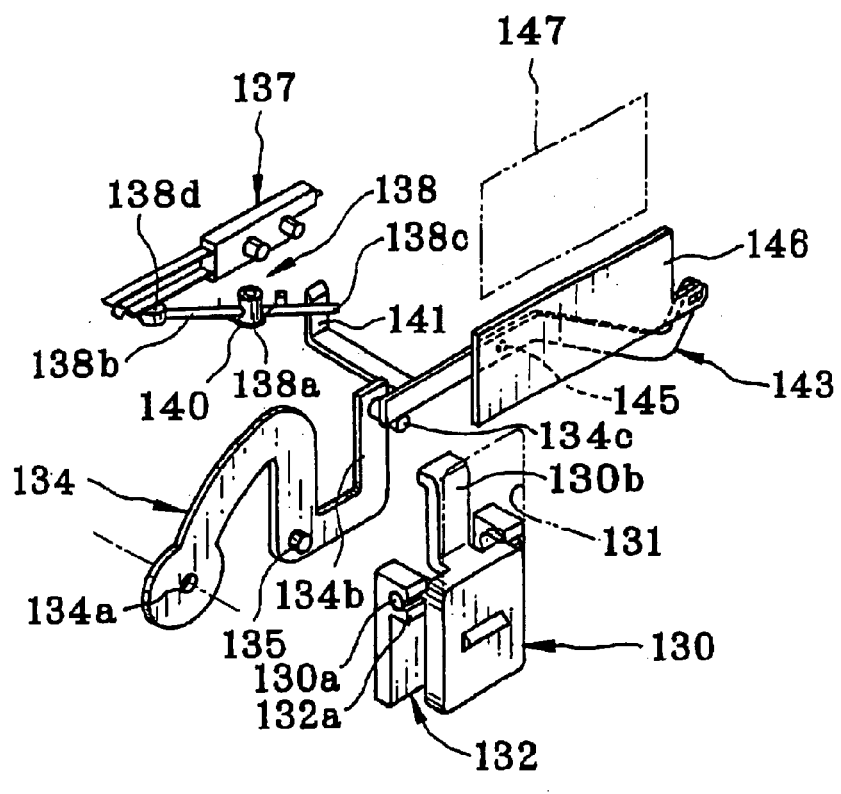
FIG. 27 is an exploded perspective illustrating a state of the structure of FIGS. 26A–26C in the daylight mode.

In FIG. 27, a preferred embodiment is illustrated, in which the external operable button 130 is pulled out for designating the night flash mode or third photographic mode. Elements similar to those in the above embodiment are designated with identical reference numerals.

The external operable button 130 has a plate shape, and includes rotational pins 130a and a shifting arm 130b. The rotational pins 130a project from lateral faces of the external operable button 130. The shifting arm 130b extends from an upper plate edge of the external operable button 130. A guide slider plate 132 includes a pair of rotational support portions 132a, which support the rotational pins 130a in a rotatable manner.

The guide slider plate 132 is slidable in a range to move the external operable button 130 inside the moving path gap 131. There is a pressing projection (not shown) formed to project from the rear of the guide slider plate 132, for turning on the charger switch of the flash unit when moved upwards.

A small aperture stop plate 134 has a small aperture stop opening 134a, which operates when on the optical axis. The small aperture stop plate 134 has substantially a crank shape. A pin 135 projects from the lens holder, and supports the small aperture stop plate 134. The small aperture stop plate 134 is rotatable between first and second position, and when in the first position, sets the small aperture stop opening 134a on the optical axis, and when in the second position, sets the small aperture stop opening 134a away from the optical axis.

A spring (not shown) biases the small aperture stop plate 134 in a direction to set the small aperture stop opening 134a on the optical axis. A linking arm 134b is disposed at a second end of the small aperture stop plate 134, and protrudes in a vertical direction. A transmission pin 134c projects from the linking arm 134b toward the front.

A sync switch 137 is included in the flash device. A shutter speed changing lever 138 is disposed near to the sync switch 137 in a rotatable manner. The shutter speed changing lever 138 includes a boss 138a, arms 138b and 138c, and a pad 138d. The arms 138b and 138c project from the boss 138a. The pad 138d is formed at the end of the arm 138b. The shutter speed changing lever 138 is rotatable between the high and low shutter speed positions, and when in the high shutter speed position, sets the pad 138d under the sync switch 137, and when in the low shutter speed position, sets the pad 138d away from under the sync switch 137.

A torsion coil spring 140 biases the shutter speed changing lever 138 toward the low shutter speed position. However, a regulation lever 141 is engaged with the arm 138c to set the shutter speed changing lever 138 in the high shutter speed position. There is an inclined face at an end of the regulation lever 141, for facilitating retention of the arm 138c at the time of rotating the shutter speed changing lever 138 to the high shutter speed position from the low shutter speed position.

A light reduction transmission lever 143 has one end from which the regulation lever 141 projects in the L-shape. The end of the light reduction transmission lever 143 is placed on the transmission pin 134c of the small aperture stop plate 134. When the external operable button 130 is pulled up, the shifting arm 130b of the external operable button 130 pushes down the end of the light reduction transmission lever 143, and rotates the light reduction transmission lever 143 and the small aperture stop plate 134.

A pivot 145 projecting from the lens-fitted photo film unit keeps the light reduction transmission lever 143 rotatable. A light reducing panel 146 in a flash amount adjustor is attached to a second end of the light reduction transmission lever 143. The light reducing panel 146 is kept slidable up and down on the inner surface of the front cover. There is a flash emitter 147. The light reducing panel 146 is set into and away from the space in front of the flash emitter 147 by rotation of the light reduction transmission lever 143.

In FIG. 27, the state of the external operable button 130 set in the first set position is depicted. A pressure projection on the rear of the guide slider plate 132 does not depress the charger switch of the flash device. The small aperture stop plate 134 is positioned to set the small aperture stop opening 134a on the optical axis by the bias of a spring. The light reduction transmission lever 143 does not rotate. The light reducing panel 146 is disposed under the flash emitter 147.

The regulation lever 141 of the light reduction transmission lever 143 sets the shutter speed changing lever 138 in the high shutter speed position against the torsion coil spring 140. Therefore, the lens-fitted photo film unit is set in the daylight mode or first photographic mode with no emission of flash light, in the small aperture stop state, and with the high shutter speed.

Figure 28:
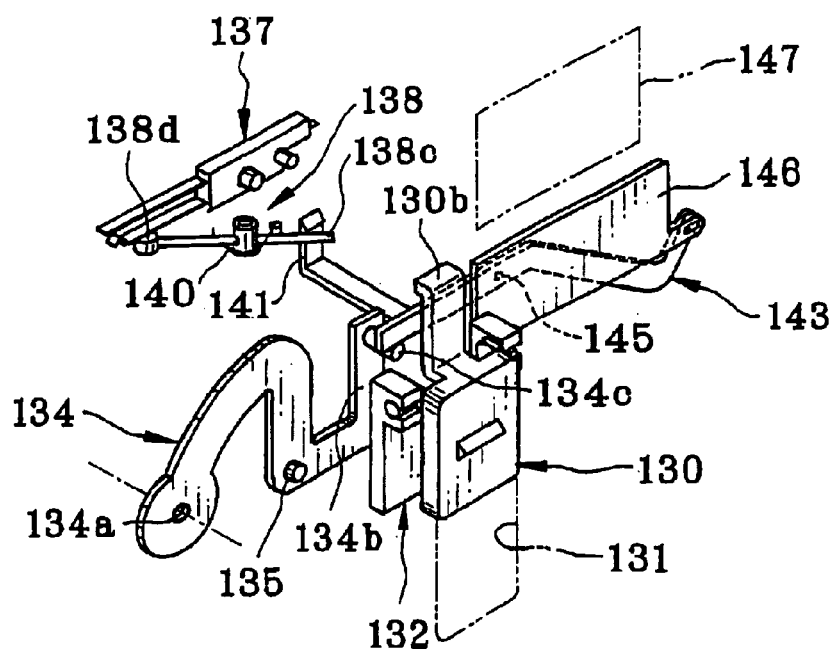
FIG. 28 is an exploded perspective illustrating a state of the structure of FIGS. 26A–26C in the daylight flash mode.

In FIG. 28, setting of the external operable button 130 in the second set position is depicted. The guide slider plate 132 is slid up in response to this. The pressure projection of the guide slider plate 132 depresses the charger switch, to start charging the flash device.

Even if the external operable button 130 is slid up, there is no movement of the small aperture stop plate 134 or the light reduction transmission lever 143. Thus, the lens-fitted photo film unit is set in the daylight flash mode or second photographic mode with emission of flash light, in the small aperture stop state, and with the high shutter speed.

Figure 29:
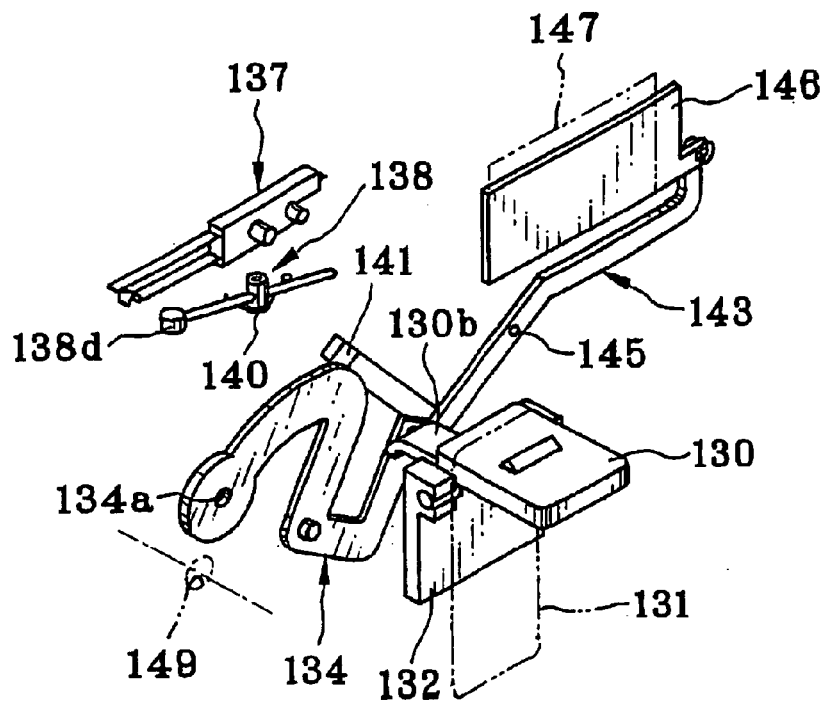
FIG. 29 is an exploded perspective illustrating a state of the structure of FIGS. 26A–26C in the night flash mode.

In FIG. 29, the external operable button 130 is pulled up toward the front. The shifting arm 130b pushes down the transmission end of the light reduction transmission lever 143. The light reduction transmission lever 143 rotates in the counterclockwise direction. The light reducing panel 146 is set in front of the flash emitter 147. The regulation lever 141 shifts downwards. So the shutter speed changing lever 138 is caused by the torsion coil spring 140 to rotate to the low shutter speed position.

The light reduction transmission lever 143 rotated in the counterclockwise direction pushes the transmission pin 134c of the small aperture stop plate 134, which is caused to rotate in the clockwise direction. The small aperture stop opening 134a is set away from the optical axis. A large aperture stop opening 149 in an exposure amount changer on the optical axis is rendered effective. Therefore, the lens-fitted photo film unit is set in the night flash mode or third photographic mode with emission of reduced flash light, in the large aperture stop state, and with the low shutter speed.

In the present embodiment, it is possible to prevent occurrence of an overexposed state, because opportunity of designating the daylight flash mode is increased specifically when an unfamiliar user is uncertain in suitable designation of the photographic modes.

Figures 30A, 30B, 30C:
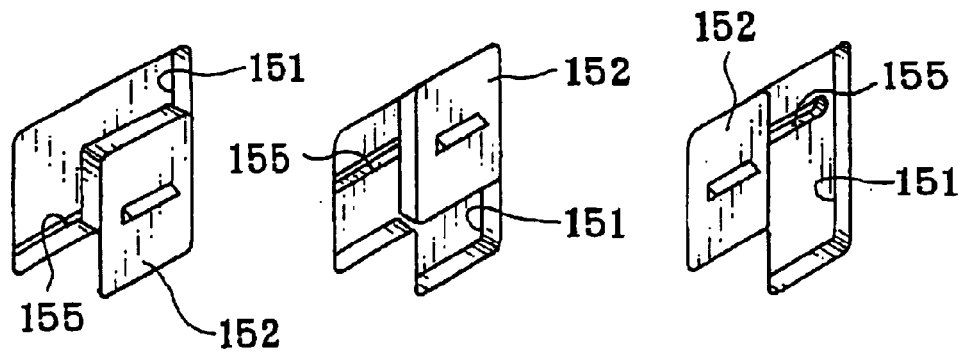
FIGS. 30A–30C are perspectives illustrating one preferred external operable button slidable vertically and horizontally.

In FIGS. 30A–30C, another preferred external operable button 152 in a movable selector is depicted. In a moving path gap 151 with first and second gap portions, the external operable button 152 is slid vertically to designate one of the first and second photographic modes that are the daylight and daylight flash modes. The external operable button 152 is slid horizontally to designate one of the second and third photographic modes that are the daylight sync and night flash modes.

Figure 31:
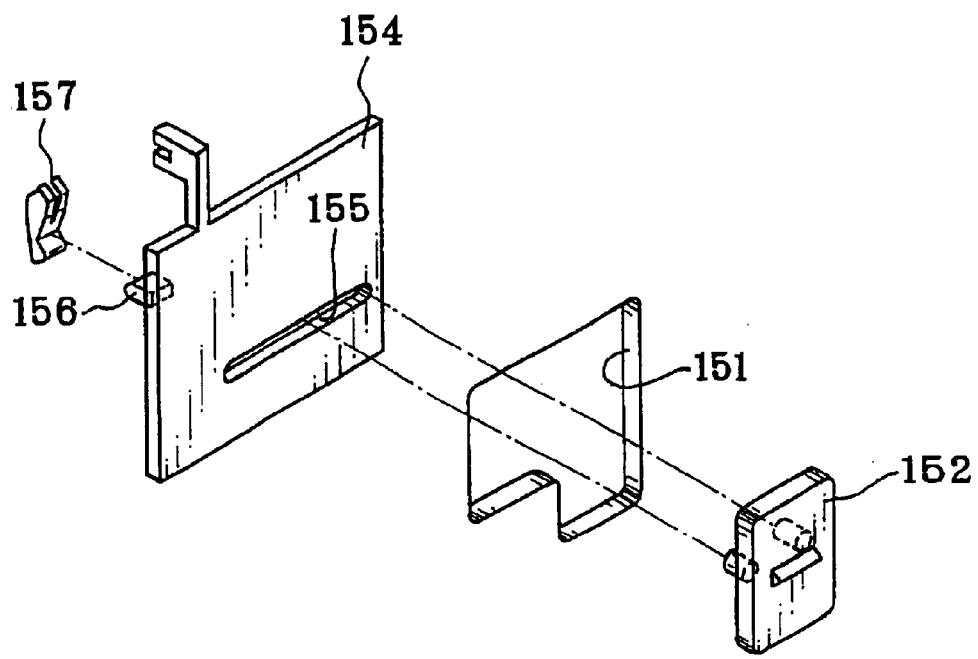
FIG. 31 is an exploded perspective illustrating a photographic mode selection device with the button of FIGS. 30A–30C.

In FIG. 31, a slidable plate 154 is slidable up and down vertically. A slot 155 is formed in the slidable plate 154 for keeping the external operable button 152 slidable in the horizontal direction. When the external operable button 152 is slid up, a pressure projection 156 of the slidable plate 154 presses a contact segment 157, to start the charging operation. When the external operable button 152 is slid horizontally, the aperture stop and the shutter speed are changed over in response to the slide of the external operable button 152. The light reducing panel and the mode indicia disk can be moved to appear.

Figures 32A, 32B, 32C:
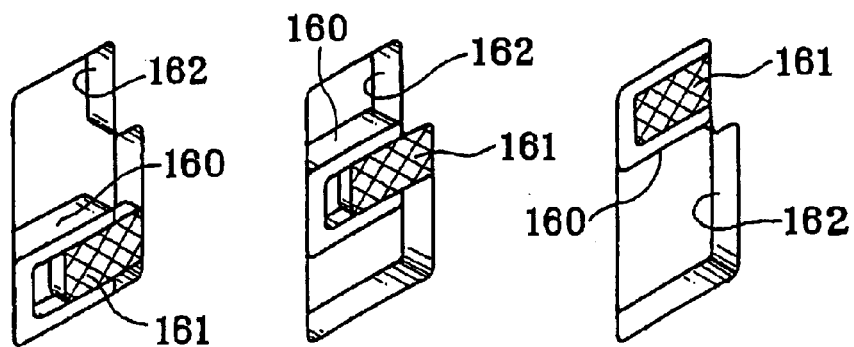
FIGS. 32A–32C are perspectives illustrating one preferred external operable button to which a lock mechanism is added.

In FIGS. 32A–32C, one preferred external operable button 160 in a movable selector is illustrated, and is movable vertically in the first, second and third set positions. A lock button 161 as a lock mechanism is associated with the external operable button 160 in a movable manner toward the outside. A moving path gap 162 is provided with a stepped portion. When the external operable button 160 is shifted to the second set position, the lock button 161 contacts the stepped portion, and prevents the external operable button 160 from sliding further to the third set position.

Figures 33A, 33B, 33C:
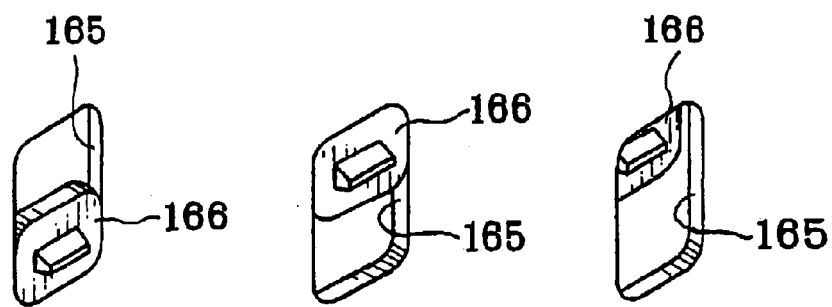
FIGS. 33A–33C are perspectives illustrating one preferred external operable button with a slidable and depressible structure.

In FIGS. 33A–33C, another preferred external operable button 166 in a slidable and depressible structure is depicted.

A moving path gap 165 renders the external operable button 166 shiftable between the first and second set positions. When the external operable button 166 is depressed from the second set position in an inward direction through a hole in the moving path gap 165, the external operable button 166 is set in the third set position.

In any of the above embodiments, the single external operable button is used. However, two buttons can be used for selectively designating the first, second and third photographic modes.

Figures 34A, 34B, 34C:
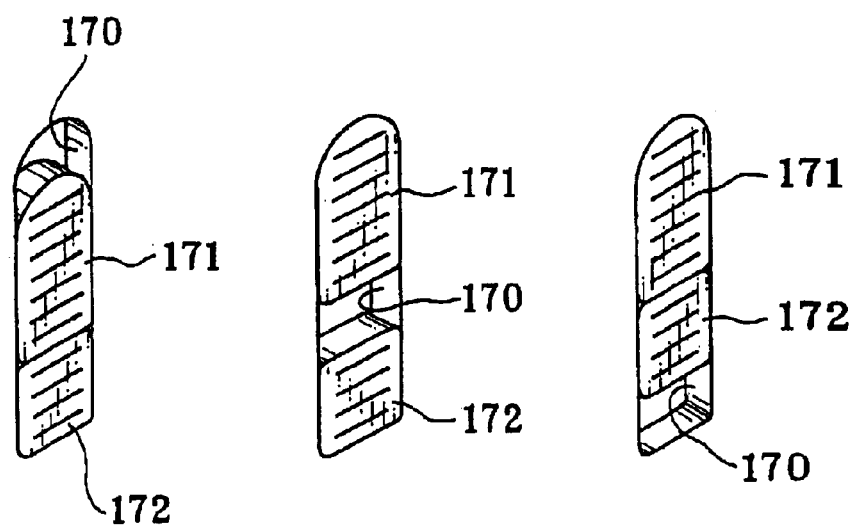
FIGS. 34A–34C are perspectives illustrating one preferred combination of slidable buttons, one being movable within a range limited by the other.

In FIGS. 34A–34C, a moving path gap 170 movably receives a first external operable button 171 and also a second external operable button 172 disposed vertically under the first button 171. In FIG. 34A, the first and second buttons 171 and 172 are both shifted down, to designate the daylight mode or first photographic mode. In FIG. 34B, the first button 171 is shifted up with the second button 172 kept shifted down, to designate the daylight flash mode or second photographic mode. In FIG. 34C, the first and second buttons 171 and 172 are both shifted up, to designate the night flash mode or third photographic mode. It is to be noted that, if the second button 172 is slid up from the state of FIG. 34A to the state of FIG. 34C, the setting can be changed over from the first photographic mode directly to the third photographic mode.

In FIGS. 35A–35C, a preferred combination of a first external operable button 176 and a second external operable button 177 is illustrated. For those buttons, a moving path gap 175 has an L-shape. In FIG. 35A, the first button 176 is in its lower position to designate the daylight mode or first photographic mode. In FIG. 35B, the first button 176 is in its upper position to designate the daylight flash mode or second photographic mode. In FIG. 35C, the second button 177 is slid horizontally to its left position, to designate the night flash mode or third photographic mode.

In FIGS. 36A–36C, another preferred combination of a first external operable button 181 and a second external operable button 182 is disposed in a moving path gap 180 of an L-shape. In FIG. 36A, the first and second buttons 181 and 182 are both shifted down, to designate the daylight mode or first photographic mode. In FIG. 36B, the first and second external operable buttons 181 and 182 are both shifted up, to designate the daylight flash mode or second photographic mode. In FIG. 36C, the second button 182 is shifted to the left, to designate the third photographic mode.

Consequently, the disposition of the first and second external operable buttons in the single moving path gap is advantageous, because the first external operable button for selection of the first and second photographic modes can block the movement of the second external operable button for selection of the second and third photographic modes. It is possible to prevent an accidental designation of the third photographic mode. If a user is uncertain in selecting a suitable one of the modes, it is probable for him or her to designate the daylight flash mode or second photographic mode. Occurrence of an overexposed state can be prevented, because unsuitable designation of the third photographic mode can be avoided.

Figures 37A, 37B, 37C:
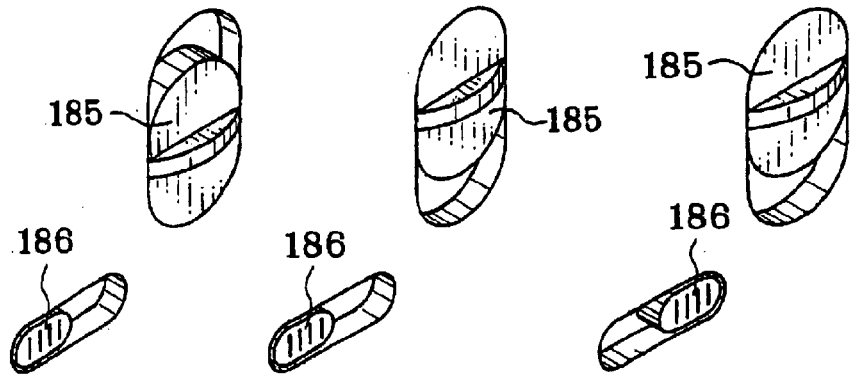
FIGS. 37A–37C are perspectives illustrating one preferred combination of buttons slidable in completely separate path gaps.

Furthermore, two separate operable buttons may be used in combination. In FIG. 37, a preferred embodiment is illustrated. A first external operable button 185 is slidable vertically, to designate one of first and second photographic modes that are the daylight and daylight flash modes. A second external operable button 186 is slidable horizontally, to designate one of second and third photographic modes that are the daylight sync and night flash modes. A substantial difference between the first and second photographic modes lies in turning on and off of the flash emission. So a conventional type of a button member can be used for the first button 185 in the same manner as the widely used type of flash-incorporated lens-fitted photo film unit.

Figure 38:
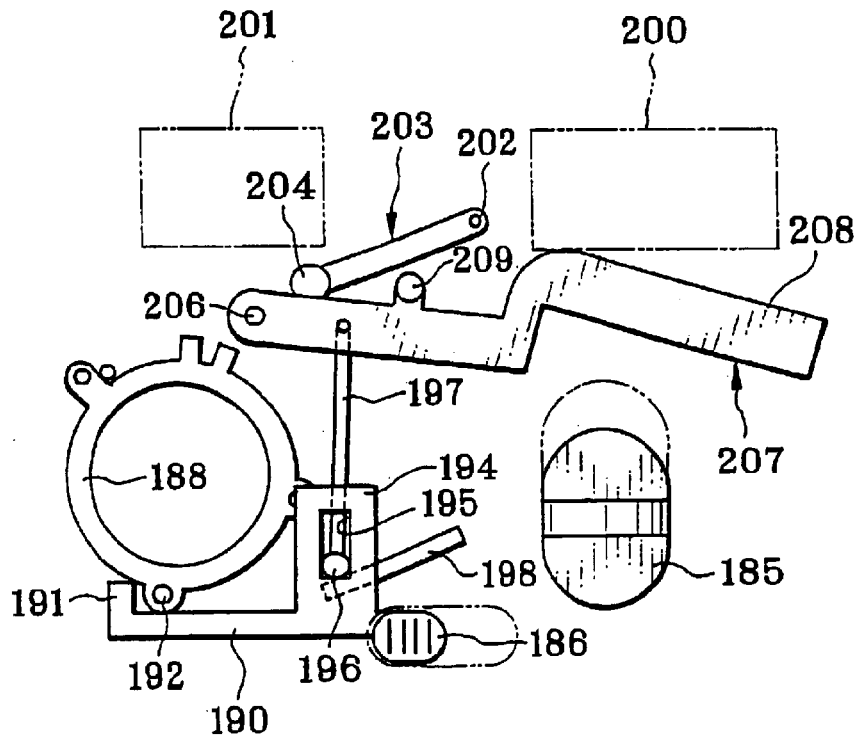
FIG. 38 is an explanatory view in elevation, illustrating a state of the daylight mode according to the structure of FIGS. 37A–37C.

In FIGS. 38 and 39, actuation of the second button 186 for the flash light reduction, and changing over of the aperture stop and the shutter speed is illustrated. A ring 188 in the drawings is the same as that used in the first one of the preferred embodiments. The ring 188 is shifted to change over the aperture stop and the shutter speed in the same manner as the first embodiment. The operation of the ring 188 is similar to that described heretofore.

An arm 190 extends from the second button 186 horizontally. A shifting projection 191 projects from an end of the arm 190 in an upward direction. When the second button 186 slides from the left toward the right in the drawing, a pin 192 on the underside of the ring 188 is contacted by the shifting projection 191, to rotate the ring 188 in the counterclockwise direction. Thus, the aperture stop and the shutter speed are changed over in the same manner as the first embodiment.

An extension portion 194 is formed integrally with the arm 190 of the second button 186, and protrudes upwards. A slot 195 is formed in the extension portion 194, and has a straight shape extending in a vertical direction. A movable pin 196 is inserted in the slot 195, and is movable up and down. A linking lever 197 is disposed to extend up from the slot 195, and has a lower end where the movable pin 196 projects. An inclined ridge 198 is disposed behind the extension portion 194 for contacting the movable pin 196.

There are a flash emitter 200 and a viewfinder 201, between which an indication lever 203 is disposed. A pivot 202 supports one end of the indication lever 203 to keep the indication lever 203 rotatable thereabout. A mode indicia disk 204 is disposed at a second end of the indication lever 203, and shiftable into and out of a space in front of the viewfinder 201.

A light reducing lever 207 is disposed under the flash emitter 200. A pivot 206 of the light reducing lever 207 is disposed at its first end, and keeps the light reducing lever 207 rotatable. A light reducing arm or panel 208 in a flash amount adjustor is included in a second end portion of the light reducing lever 207, and movable into and away from a space in front of the flash emitter 200. Also, a linking pin 209 projects from a portion on an upper edge of the light reducing lever 207, for rotating the indication lever 203. An upper end of the linking lever 197 of the movable pin 196 is connected with the light reducing lever 207.

In FIG. 38, the second button 186 is shifted to the left. The ring 188 does not rotate. So the small aperture stop and the high shutter speed are determined. As the movable pin 196 is guided by the inclined ridge 198 and disposed under the slot 195 in the extension portion 194, the light reducing lever 207 and the indication lever 203 do not appear visibly.

In FIG. 39, the second button 186 is slid to the right. The shifting projection 191 causes the ring 188 to rotate in the counterclockwise direction, to set the large aperture stop and the low shutter speed. The movable pin 196 is guided by the inclined ridge 198 and moved to an upper portion of the slot 195 in the extension portion 194. Thus, the light reducing lever 207 pushed by the linking lever 197 rotates in the counterclockwise direction, to set the light reducing arm 208 in front of the flash emitter 200. The light reducing lever 207 in the rotation causes the linking pin 209 to press up the indication lever 203 to set the mode indicia disk 204 in front of the viewfinder 201.

In FIGS. 40A–40C, a preferred embodiment is illustrated, in which two buttons are similarly movable. A first external operable button 215 is used to designate one of first and second photographic modes that are the daylight and daylight flash modes. A second external operable button 216 is slidable like the first button 215, and used to designate one of second and third photographic modes that are the daylight sync and night flash modes. It is preferable for the second button 216 to have a smaller size than the first button 215. This is effective in implicitly indicating that the third photographic mode assigned to the first button 215 is a specialized mode.

Figures 41A, 41B, 41C:
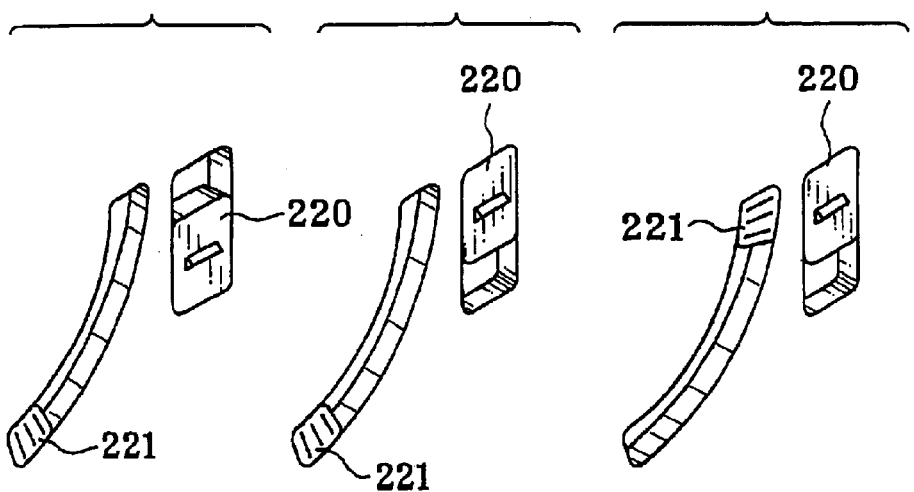
FIGS. 41A–41C are perspectives illustrating one preferred combination of buttons, one sliding straight and the other moving with a curve.

In FIGS. 41A–41C, a preferred combination of two buttons is illustrated. A first external operable button 220 is slidable up and down for designating one of the first and second photographic modes. A second external operable button 221 is moved in an arc-shaped orbit for designating one of the second and third photographic modes.

Figures 42A, 42B, 42C:
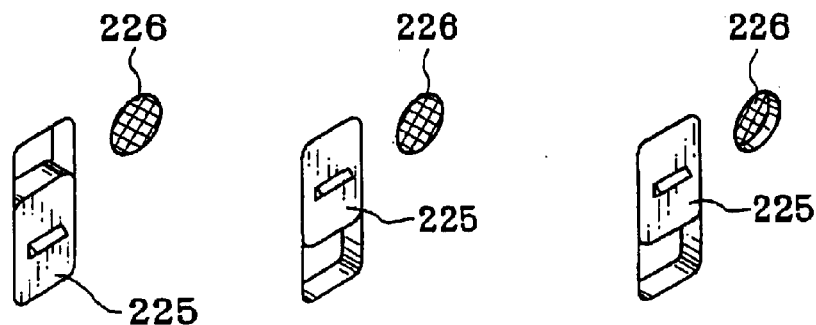
FIGS. 42A–42C are perspectives illustrating one preferred combination of buttons, one sliding straight and the other being depressible.

In FIGS. 42A–42C, another preferred button combination is illustrated. A first external operable button 225 is vertically slidable, and used for designating one of first and second photographic modes. A second external operable button 226 is a pushbutton depressible toward the inside, and used for designating one of second and third photographic modes.

It is to be noted that one of the first and second external operable buttons can be given priority over the remaining one of the two. For example, the priority may be given to the first external operable button. Only when the first external operable button is positioned for the daylight sync or second photographic mode, the second external operable button can be moved and positioned for the night sync or third photographic mode. Furthermore, the priority may be given to the second external operable button. The second external operable button can be moved and positioned for the third photographic mode in a manner irrespective of positions of the first external operable button.

It is to be noted that the sliding, rotating or moving direction of any of the external operable buttons is described only as examples. The two opposite directions assigned to the two modes changed over to one another may be modified and exchanged as desired for the purposes of the external operable buttons.

In the above embodiments, the photographic mode selector of the invention is used in the lens-fitted photo film unit. However, a camera of the invention may be an ordinary type for use with silver halide photosensitive material, a digital camera, and other optical instruments.

Referring now to FIGS. 43–48, a preferred embodiment is described, in which biasing of an operable button with a spring can be reliable even with an economized space and at a reduced cost. In a lens-fitted photo film unit, an external operable button 315 is disposed on a front cover. There is a moving path gap 314 in which the external operable button 315 is movable.

Figure 43:
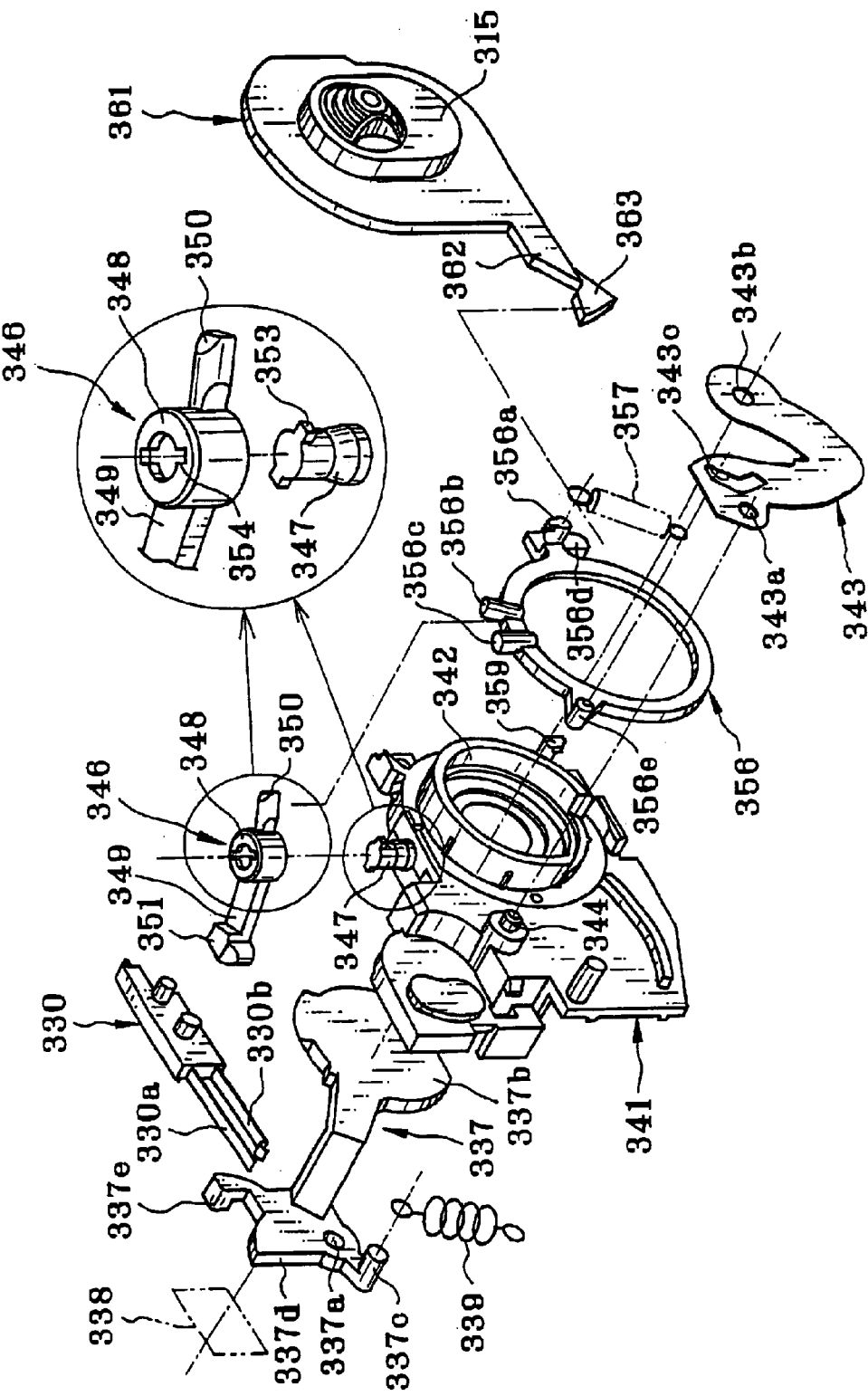
FIG. 43 is an exploded perspective illustrating one preferred embodiment of changing over the aperture stop and the shutter speed.
Figure 44A:
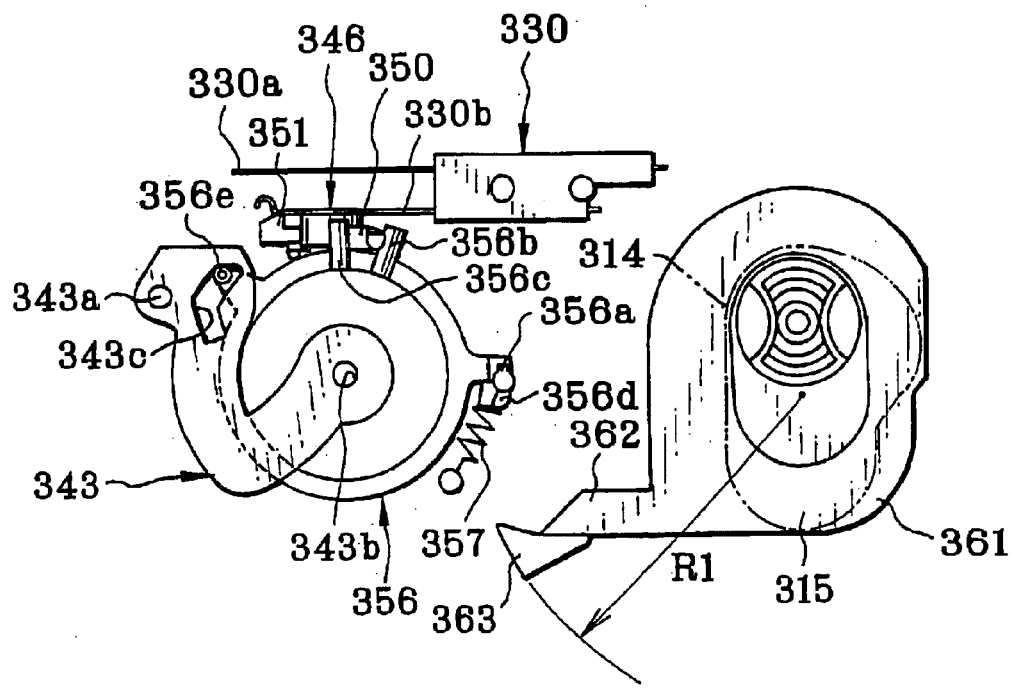
FIG. 44A is an explanatory view in elevation, illustrating a state of the daylight flash mode of the structure of FIG. 43.
Figure 44B:
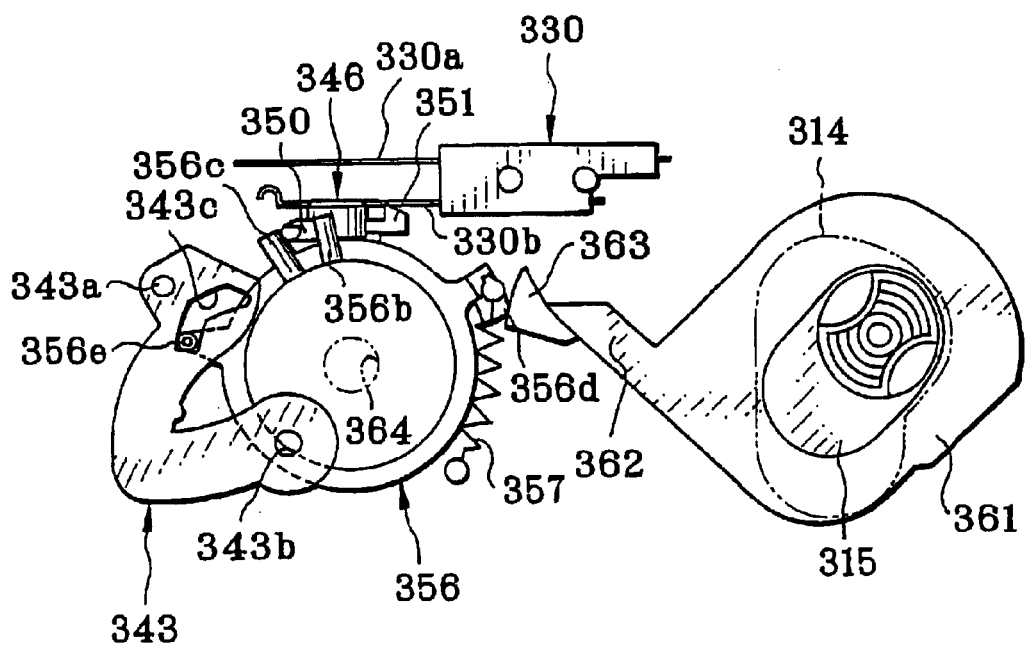
FIG. 44B is an explanatory view in elevation, illustrating a state of the night flash mode of the structure of FIG. 43.

Among the various elements assembled on the periphery of the light-shielded tunnel, FIG. 43 illustrates the aperture stop changing mechanism and the shutter speed changing mechanism. There is a shutter blade 337, which includes a hole 337a, a blade portion 337b, a pin 337c, a transmission portion 337d and a sync projection 337e. The hole 337a receives insertion of a pin, and kept rotatable. The blade portion 337b is disposed in front of an exposure opening 338, and moves between open and shut positions. A tension coil spring 339 is connected with the pin 337c. The transmission portion 337d is knocked for an exposure by a shutter driving lever. A sync switch 330 in the flash unit is turned on by the sync projection 337e.

The sync switch 330 includes an upper switch segment 330a and a lower switch segment 330b. When the shutter blade 337 rotates toward the open position, the sync projection 337e presses the upper switch segment 330a, and causes the upper switch segment 330a to contact the lower switch segment 330b. The sync switch 330 is turned on, so a flash emitter 307 in the flash unit is caused to emit flash light.

A lens holder 341 supports a taking lens. A front face of the lens holder 341 is provided with a lens barrel 342 and a pin 344. The lens barrel 342 has a small cylindrical shape, and contains the taking lens and a fixed aperture stop panel having a large aperture stop opening. The pin 344 supports a V-shaped small aperture stop plate 343 in a rotatable manner. A hole 343a is formed in the small aperture stop plate 343, receives insertion of the pin 344, and is supported on the front of the lens holder 341 in a pivotally movable manner. A cutout is formed in the lens barrel 342, for allowing the small aperture stop plate 343 to move into and out of the lens barrel 342. A small aperture stop opening 343b in the small aperture stop plate 343 is set on and away from the optical axis, to change over the aperture stop.

On an upper surface of the lens holder 341, a shutter speed changing lever 346 is supported in a pivotally movable manner about a pivot 347. The shutter speed changing lever 346 includes a boss 348, an arm 349, a projection 350 and a pad 351. The boss 348 is supported on the pivot 347. The arm 349 and the projection 350 protrude from the boss 348. The pad 351 is formed with an end of the arm 349. A lens retention plate (not shown) is secured to a front face of the lens holder 341, and keeps the taking lens and the small aperture stop plate 343 retained.

A pair of retention projections 353 are formed with an end of the pivot 347 of the lens holder 341. In correspondence, a pair of notches 354 are formed in the boss 348 of the shutter speed changing lever 346 for insertion of the retention projections 353. To secure the shutter speed changing lever 346 to the pivot 347, at first the pivot 347 is inserted in the boss 348 by positioning the retention projections 353 in the notches 354. The retention projections 353 are caused to reach a top of the boss 348, before the shutter speed changing lever 346 is rotated to a small extent. Thus, an upper face of the boss 348 is retained by the retention projections 353. There occurs no accidental drop of the shutter speed changing lever 346 from the lens holder 341.

An intermediate ring 356 is supported on the periphery of the lens barrel 342 of the lens holder 341 in a rotatable manner. The intermediate ring 356 includes a spring retention pin 356a, squeezing pins 356b and 356c and a follower pin 356d. The spring retention pin 356a is used to connection with one end of a tension coil spring 357. The squeezing pins 356b and 356c are so disposed that the projection 350 of the shutter speed changing lever 346 is disposed between those. The follower pin 356d projects toward the rear, and pushed by the selector in the photographic mode selection device. A slot 343c is formed in the small aperture stop plate 343 in a flexed shape. A linking pin 356e is inserted in the slot 343c in a shiftable manner.

A pin 359 projects from a lower portion of the lens holder 341. The tension coil spring 357 has a second end retained on the pin 359, and biases the intermediate ring 356 in a clockwise direction. The intermediate ring 356 in the biased state is kept in the initial position by the small aperture stop plate 343.

A transmission plate 361 is included in a piece having the external operable button 315. A shifting lever 362 projects from the transmission plate 361 in a horizontal direction. A shifting lever cam 363 is formed with an end of the shifting lever 362. When the external operable button 315 rotates from the second set position to the third set position, the shifting lever cam 363 pushes up the follower pin 356d. Thus, the intermediate ring 356 rotates in the counterclockwise direction.

The slot 343c in the small aperture stop plate 343 has a combined shape of two arcs. A first of the arcs is included in a circle concentric with the intermediate ring 356 when the small aperture stop plate 343 is in the small aperture stop position. A second of the arcs is included in a circle concentric with the intermediate ring 356 when the small aperture stop plate 343 is in the large aperture stop position. This combined shape is effective in preventing the small aperture stop plate 343 from swinging even when the intermediate ring 356 is rotated to a small extent by a mechanical shock or vibration or an error in manual operation. No exposure is taken while the small aperture stop plate 343 is stopped in an ineffective intermediate position.

Figure 45:
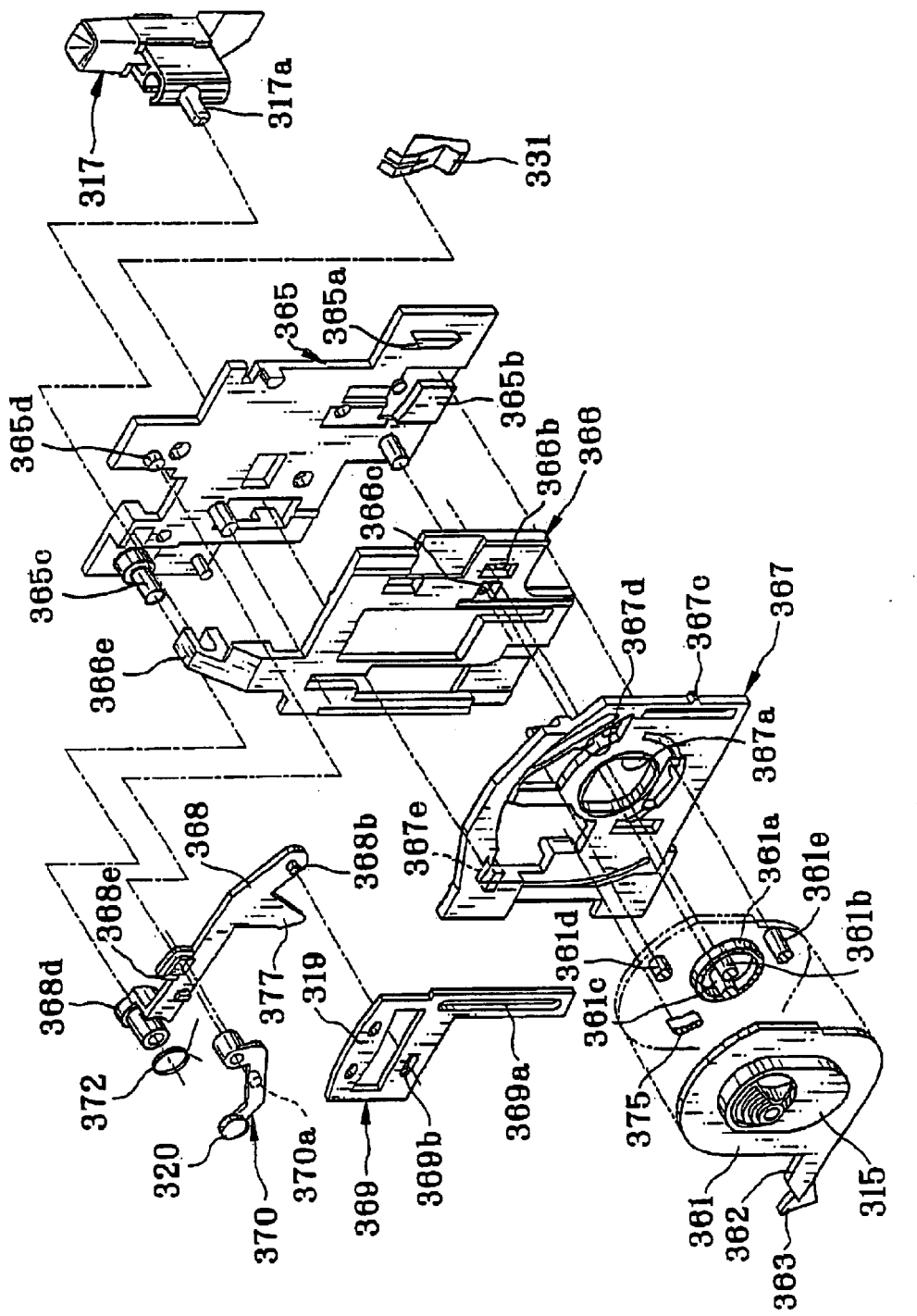
FIG. 45 is a perspective illustrating a photographic mode selection device.

In FIG. 45, the photographic mode selection device is illustrated. The selection device includes the transmission plate 361, a guide bearing plate 367, a guide sliding plate 366, a guide receiving plate 365, a light reduction transmission lever 368, a flash amount adjustor 369 and an indication lever 370. The guide receiving plate 365 is attached to a front face of the printed circuit board of the flash unit, and keeps the guide sliding plate 366 and the guide bearing plate 367 slidable in the vertical direction.

The rear of the transmission plate 361 is provided with a rotational hub ring 361a, sliding pins 361b and 361c, an engageable pin 361d, a guide pin 361e, and a light reduction shifting projection 375. The sliding pins 361b and 361c slide the guide sliding plate 366. The engageable pin 361d is for engagement in a clicked state at the time of rotation of the external operable button 315. The guide pin 361e guides movement of the external operable button 315. The light reduction shifting projection 375 actuates the light reduction transmission lever 368. The sliding pins 361b and 361c are disposed inside the rotational hub ring 361a.

A guide bearing opening 367a is formed in the guide bearing plate 367, and receives insertion of the rotational hub ring 361a of the transmission plate 361, to keep the transmission plate 361 rotatable. Slots 366b and 366c are formed in the guide sliding plate 366. Between the transmission plate 361 and the guide sliding plate 366, the sliding pins 361b and 361c of the transmission plate 361 come through the guide bearing plate 367, and are inserted in the guide sliding plate 366.

When the external operable button 315 slides from the first set position to the second set position, the transmission plate 361, the guide bearing plate 367 and the guide sliding plate 366 slide together in the upward direction as engaged with one another. When the external operable button 315 rotates from the second set position to the third set position, the sliding pin 361c of the transmission plate 361 causes the guide sliding plate 366 to slide further in the upward direction. The slide and rotation of the transmission plate 361 are stabilized, because the guide pin 361e moves in contact with a guide cam 365b of the guide receiving plate 365.

A retention mechanism is provided on the guide receiving plate 365 and the guide bearing plate 367, and keeps the guide bearing plate 367 positioned upwards and retained in a clicked state. The retention mechanism includes a retention ridge 365a and a resilient projection 367c. The retention ridge 365a is formed to project from the guide receiving plate 365. The resilient projection 367c projects from the guide bearing plate 367.

A stop mechanism for retention in a clicked state is associated with the transmission plate 361 and the guide bearing plate 367, for retaining the transmission plate 361 when the external operable button 315 is rotated to the third set position, and for keeping the guide sliding plate 366 positioned higher than the second set position. The stop mechanism for the retention includes the engageable pin 361d of the transmission plate 361, and a resilient projection 367d projecting from the guide bearing plate 367.

An engagement fork 366e projects from the guide sliding plate 366, and is engaged with an engageable pin 317a of a signaling light guide 317. When the external operable button 315 is in the first set position, the signaling light guide 317 is contained in the housing of the lens-fitted photo film unit. When the external operable button 315 is shifted to the second set position, the signaling light guide 317 comes to protrude from the upper face of the housing upon the slide of the guide sliding plate 366. When the external operable button 315 is rotationally shifted to the third set position, the guide sliding plate 366 slides further in the upward direction. An amount of protrusion of the signaling light guide 317 increases.

A pressure projection 367e projects from the rear of the guide bearing plate 367, and comes through the guide sliding plate 366 and the guide receiving plate 365 when the external operable button 315 is in the second or third set position. A contact segment 331 in the charger switch of the flash unit is depressed by the pressure projection 367e.

Pins 365c and 365d protrude from the guide receiving plate 365, and support respectively the light reduction transmission lever 368 and the indication lever 370 in a rotatable manner. A boss 368d of the light reduction transmission lever 368 is positioned on the pin 365c. One end of a torsion coil spring 372 positioned on the boss 368d is retained on a portion of the light reduction transmission lever 368. A second end of the torsion coil spring 372 is retained on the guide receiving plate 365. The torsion coil spring 372 in connection with the light reduction transmission lever 368 biases a light reducing panel 319 in the clockwise direction toward the inside of the housing.

A slot 369a is formed in the flash amount adjustor 369 under the light reducing panel 319, and extends in the vertical direction. A slot 369b is formed in the flash amount adjustor 369, and extends horizontally. Plural pins 326b project from an inner face of the front cover, are disposed under the flash emitter, and are inserted in the slot 369a. The flash amount adjustor 369 is kept slidable vertically on the inside of the front cover by the pins 326b. A linking pin 368b is formed with an end of the light reduction transmission lever 368, and is inserted in the slot 369b extending in the horizontal direction.

Figure 46:
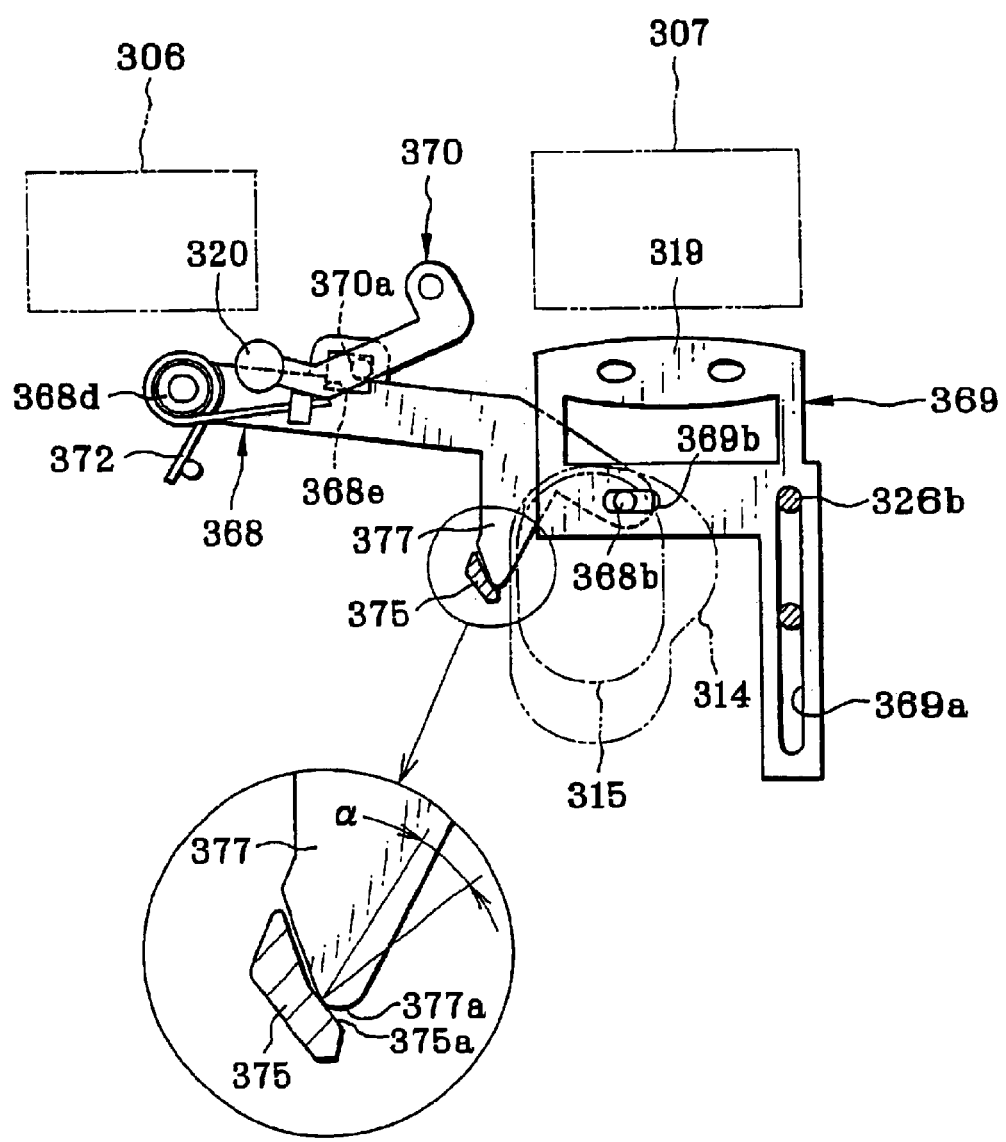
FIG. 46 is an explanatory view in elevation, illustrating the photographic mode selection device in the daylight flash mode.

In FIG. 46, the external operable button 315 is in the second set position. A shifting projection 377 of the light reduction transmission lever 368 contacts the light reduction shifting projection 375. The external operable button 315 is maintained in the second set position by the bias of the torsion coil spring 372. Also at the time of the second set position, an arc-shaped contact portion 377a of the shifting projection 377 contacts a cam portion 375a of the light reduction shifting projection 375 at a small pressure angle α. Thus, a force required to rotate the external operable button 315 toward the third set position is small.

Figure 47:
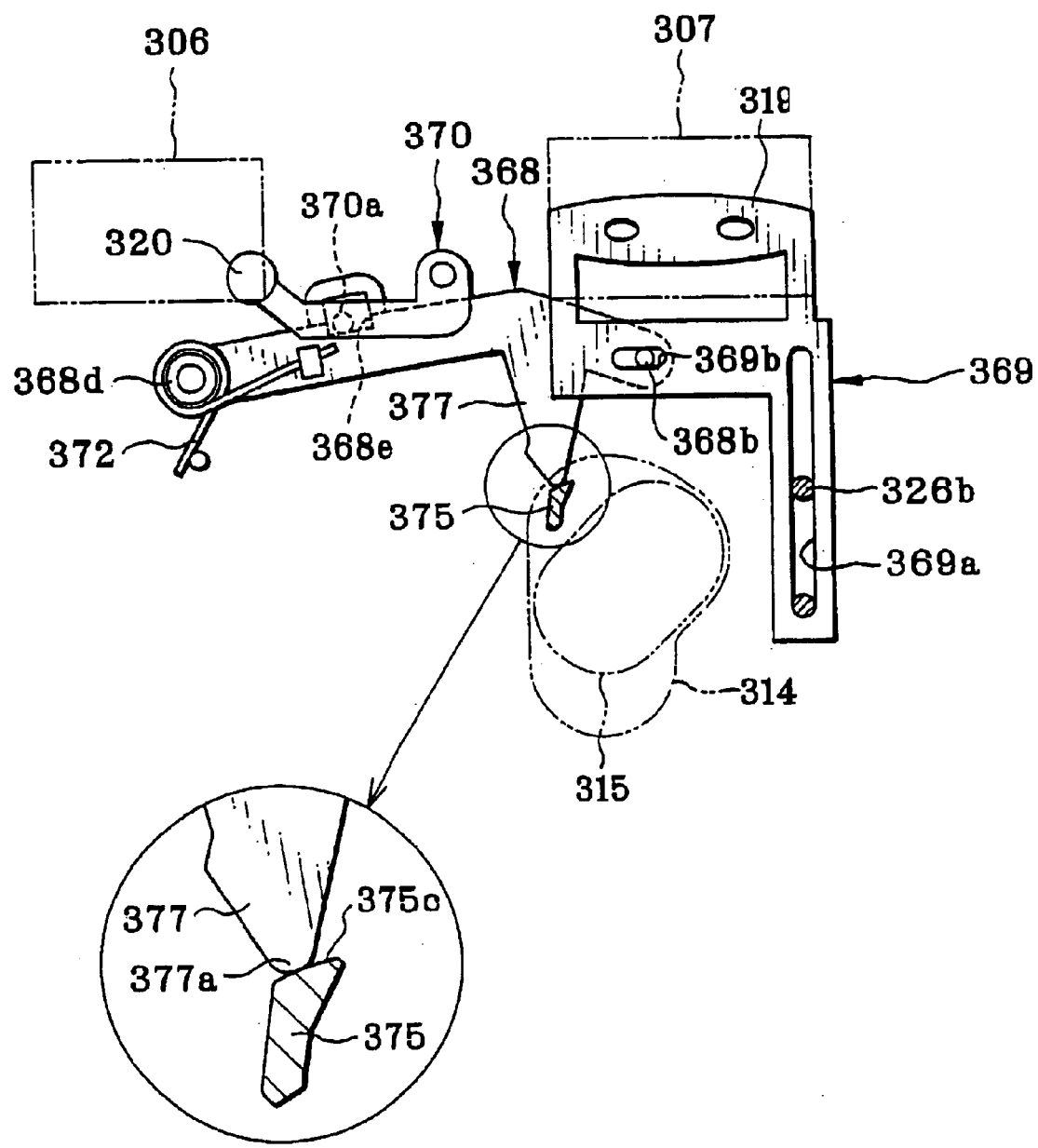
FIG. 47 is an explanatory view in elevation, illustrating the photographic mode selection device in the night flash mode.

In FIG. 47, the light reduction shifting projection 375 presses the shifting projection 377 when the external operable button 315 is shifted to the third set position. The light reduction transmission lever 368 rotates in the counterclockwise direction against the bias of the torsion coil spring 372. The linking pin 368b shifts up the flash amount adjustor 369, to set the light reducing panel 319 in front of the flash emitter 307. On the indication lever 370, a linking projection 370a is formed. A linking opening 368e is formed in the light reduction transmission lever 368. An edge of the linking opening 368e pushes the linking projection 370a to rotate the indication lever 370 in the clockwise direction. So a mode indicia disk 320 is set in front of a viewfinder 306.

Between the second and third set positions, the aperture stop and the shutter speed are changed over. Should the external operable button 315 be accidentally retained between the second and third set positions, serious problems occur. Specifically upon occurrence of mechanical shock or vibration, an error in manual operation or jamming of a foreign matter, an erroneous position of the external operable button 315 causes an unsuitable aperture stop, and lowers the image quality. If a portion of the small aperture stop plate 343 without the small aperture stop opening stops on the optical axis, no exposure occurs on the photo film. In addition, the shutter speed may become unstable. An error may occur in the synchronism of the flash device.

In the present embodiment, the light reduction transmission lever 368 causes the torsion coil spring 372 to bias the transmission plate 361 from the third set position toward the second set position. If a user incidentally stops moving the external operable button 315 between the second and third set positions, the external operable button 315 can be moved to the second set position by the virtue of the light reduction transmission lever 368.

Figure 48:
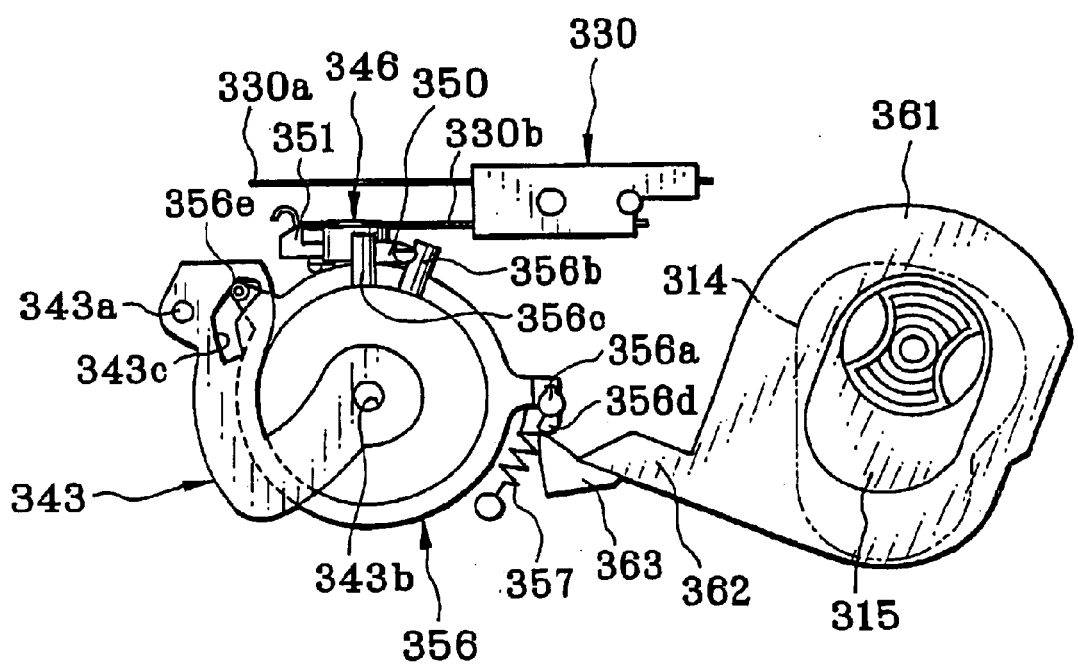
FIG. 48 is an explanatory view in elevation, illustrating an intermediate state of the mechanisms between the daylight flash mode and the night flash mode.

In FIG. 48, the transmission plate 361 becomes engaged with the intermediate ring 356 when the external operable button 315 comes to a position between the second and third set positions. Even if the transmission plate 361 slightly rotates by a finger s contact on the external operable button 315 in the second set position, the intermediate ring 356 does not rotate. Thus, there is no change in the aperture stop or the shutter speed. The light reduction transmission lever 368 becomes linked with the transmission plate 361 at the light reduction shifting projection 375 in movement of the external operable button 315 to the second set position. However, there is no serious influence to the image quality, because only a lower small portion of the flash emitter 307 is covered when a position of the light reducing panel 319 is offset.

If the external operable button 315 rotates slightly in an accidental manner after rotation of the external operable button 315 to the third set position, there occurs no change in the state of the aperture stop, because the slot 343c in the small aperture stop plate 343 is suitably shaped for not being influenced by small rotation of the intermediate ring 356. Furthermore, image quality is protected from serious influence even if there is offsetting in the position of the light reducing panel 319.

Note that the light reduction transmission lever 368 is biased by the spring. The flash charger switch can be turned off by pushing down the signaling light guide into the housing from a protruding state over the upper face. This is an effect the same as that of the known lens-fitted photo film unit.

When the signaling light guide 317 is pushed toward the inside of the housing at the time of third set position of the external operable button 315, the guide sliding plate 366 is slid down. The guide sliding plate 366 pushes the sliding pin 361c, and rotates the transmission plate 361 toward the second set position at a small amount. The retention between the transmission plate 361 and the guide bearing plate 367 in the clicked state is released. The transmission plate 361 is caused to rotate to the second set position by the bias to the light reduction transmission lever 368. Then the signaling light guide 317 is pushed down further into the housing. The guide sliding plate 366 slides down the guide bearing plate 367 and the transmission plate 361, to shift the external operable button 315 to the first set position.

Figure 49:
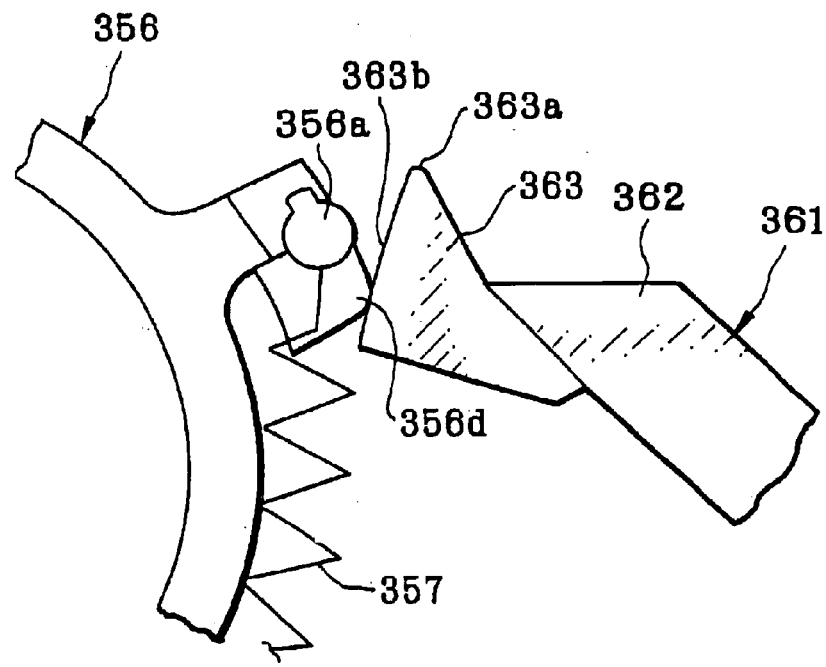
FIG. 49 is an explanatory view in elevation, illustrating a pressing cam.

In FIGS. 49–55, details of the present embodiment are depicted. In FIG. 49, a pressing portion 363b of the shifting lever cam 363 is defined on an arc of a circle with a radius R1 about a rotational axis of the external operable button 315. If the external operable button 315 as stopped is rotationally offset to a small extent, there is no change in a rotational position of the intermediate ring 356. Force applied to the intermediate ring 356 by the tension coil spring 357 is directed to the rotational center of the transmission plate 361. Load applied to the shifting lever 362 is reduced. Therefore, no error occurs in the timing of rotation of the intermediate ring 356 due to deformation of the shifting lever 362. No failure occurs in the changeover of the intermediate ring 356.

Pressing force of the intermediate ring 356 for rotating the transmission plate 361 to the second set position becomes the maximum shortly before the change in the contacted direction of the shifting lever cam 363 from a pressing portion 363a to the pressing portion 363b, and is decreased after the change. Therefore, the force of the retention of the stop mechanism for the external operable button 315 in the third set position with a click can be determined small. Note that it is further possible to use this operation for retaining the external operable button 315 in the third set position.

Figure 50:
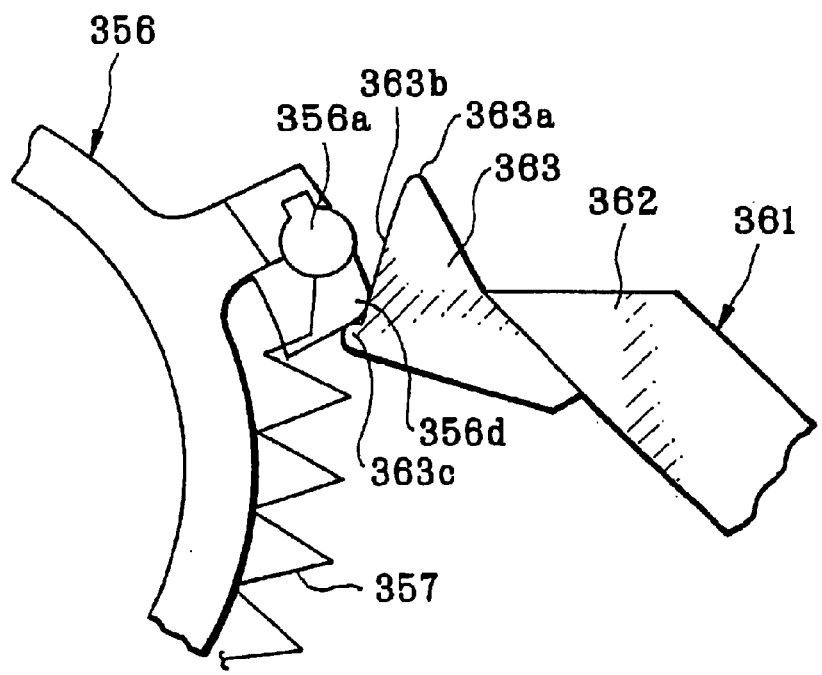
FIG. 50 is an explanatory view in elevation, illustrating another preferred pressing cam having a projection.

It is to be noted that, in FIG. 50, a projection 363c may be formed to project from a lower end of the pressing portion 363b of the shifting lever cam 363 and into a path of movement of the follower pin 356d. The projection 363c contacts the squeezing pin 356b, and is effective in blocking rotation of the intermediate ring 356. Even when there is a mechanical shock or vibration, or an error in manual operation, no disengagement occurs between the transmission plate 361 and the intermediate ring 356. The intermediate ring 356 does not rotate back to the initial position.

Figure 51:
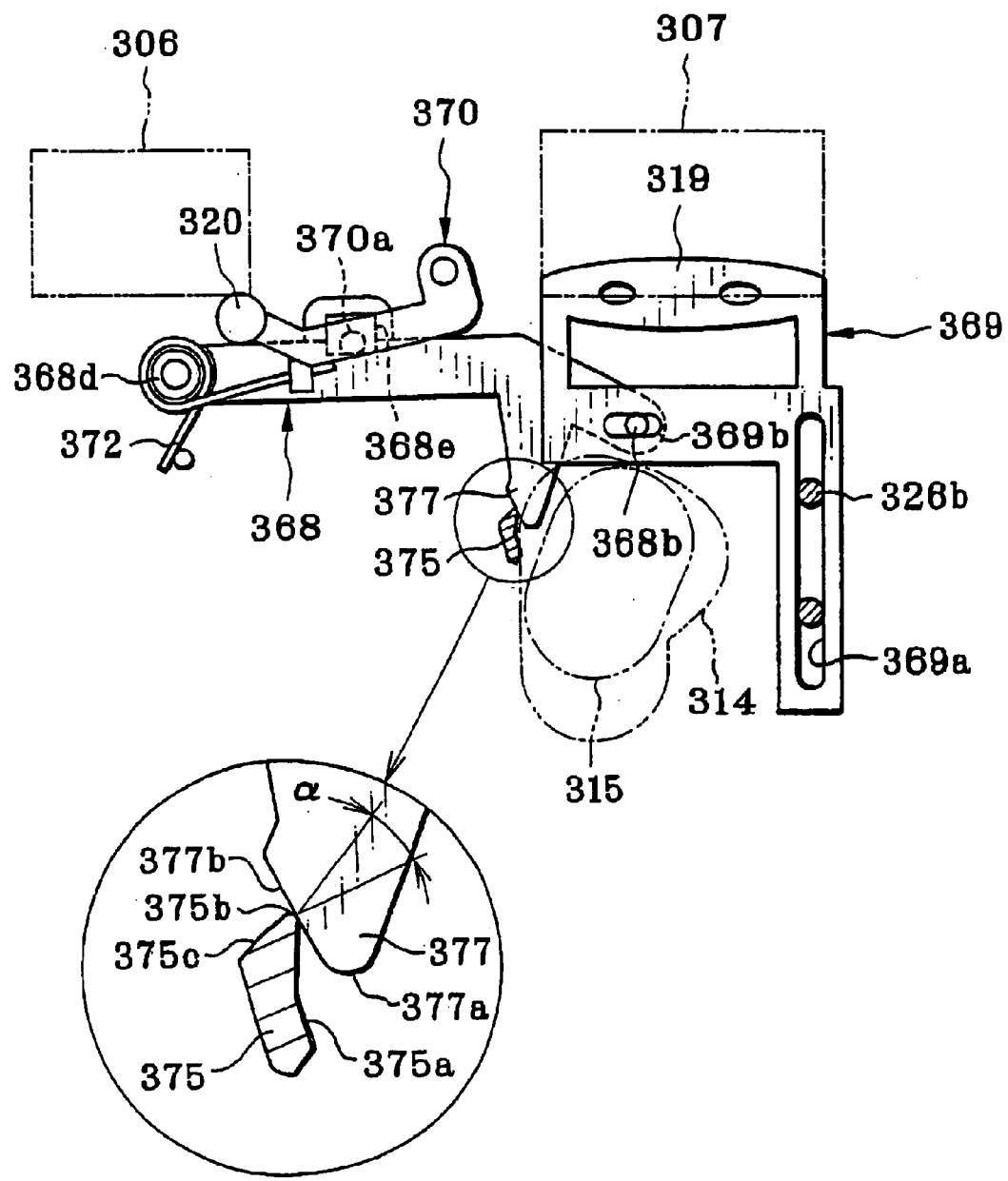
FIG. 51 is an explanatory view in elevation, illustrating a state of changeover from the daylight flash mode to the night flash mode.

In FIG. 51, the external operable button 315 is rotated toward the third set position at a small amount. The contacted direction of the light reduction shifting projection 375 and the shifting projection 377 is changed over. An arc-shaped contact portion 375b of the light reduction shifting projection 375 comes in contact with a flatly shaped cam follower 377b of the shifting projection 377. At this time, the cam portion 375a becomes separate from the arc-shaped contact portion 377a, as the contacted direction is changed.

Figure 52:
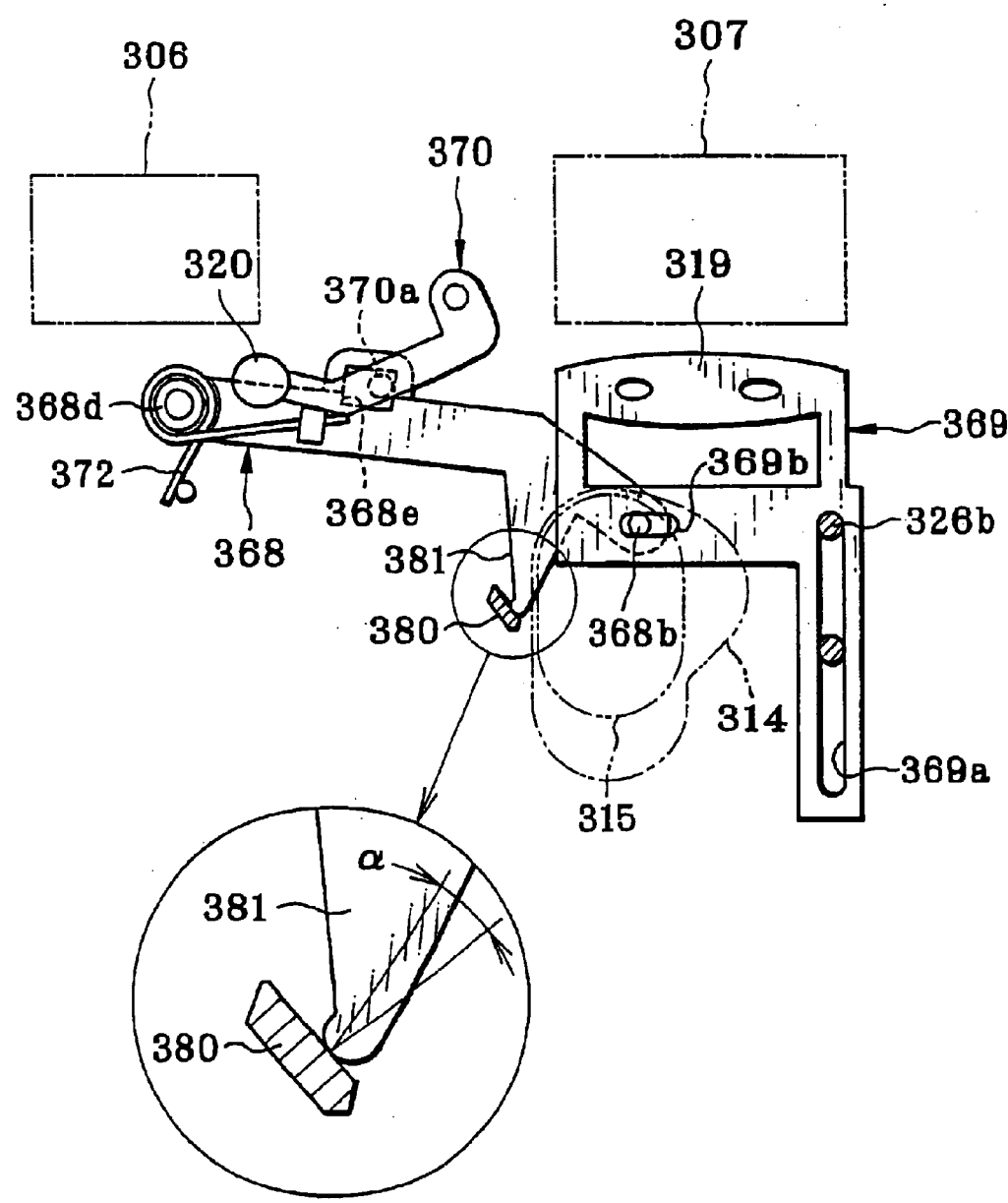
FIG. 52 is an explanatory view in elevation, illustrating a state according to a comparable example for a daylight flash mode.
Figure 53:
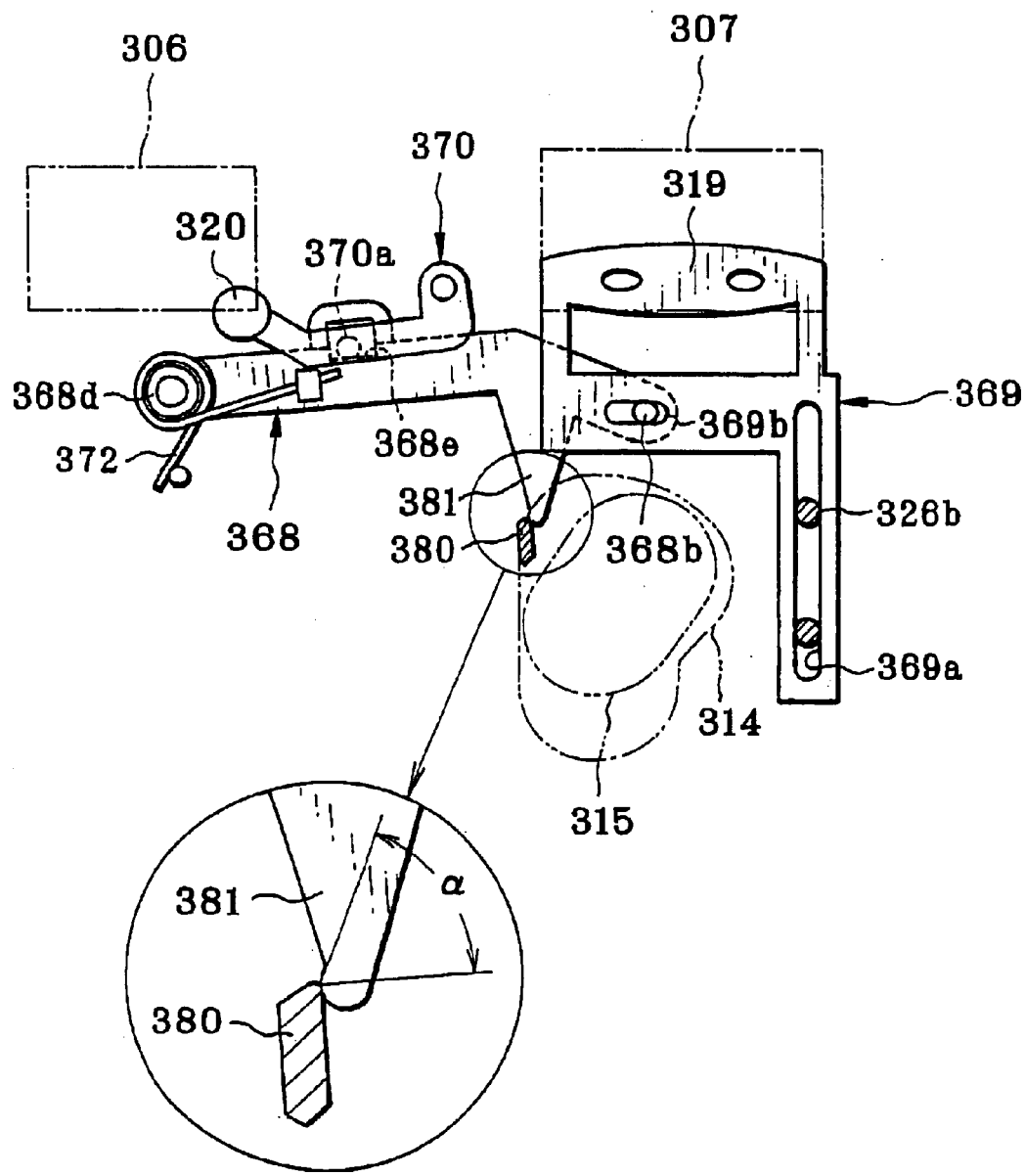
FIG. 53 is an explanatory view in elevation, illustrating a state similar to that of FIG. 51 but according to the example of FIG. 52.
Figure 54:
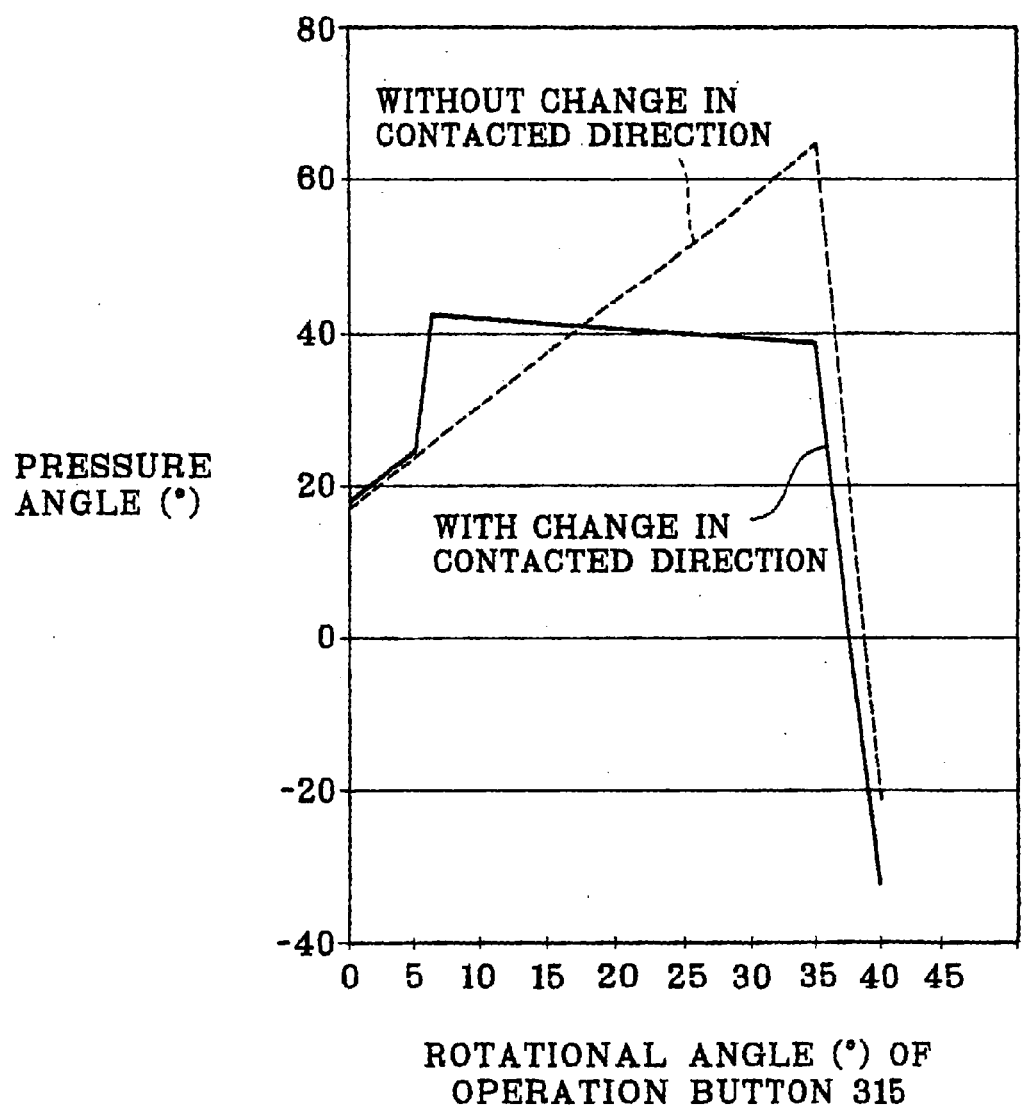
FIG. 54 is a graph illustrating a relationship between a pressure angle of a shifting projection and a rotational angle of the button.

In FIGS. 52 and 53, a comparable example is illustrated, in which a contacted direction of a light reducing shifting projection 380 and a shifting projection 381 does not change. In FIG. 54, changes in the pressure angles of those elements are illustrated in relation with rotation of the external operable button 315. According to the present lens-fitted photo film unit, there are limited ranges in disposition of fulcrums and operation points of linking members. The shapes of the light reducing shifting projection 380 and the shifting projection 381 without the changes in the contacted direction causes the pressure angle α to become 60 degrees or greater, as indicated by the broken line in FIG. 54. Load applied to the external operable button 315 in operation is likely to be excessively high. Failure may occur in linking of the external operable button 315 due to low precision in the production of parts, interference of small foreign particles, or the like. However, the present embodiment is according to a changeable structure in the contacted direction of the light reduction shifting projection 375 and the shifting projection 377. As indicated by solid line in FIG. 54, the pressure angle can be a considerably small level.

In FIG. 47, the external operable button 315 comes to the third set position. An arc-shaped surface 375c of the light reduction shifting projection 375 comes in contact with the arc-shaped contact portion 377a of the shifting projection 377. As the arc-shaped surface 375c has a shape along an arc of a circle defined about the rotational center of the external operable button 315 and having a radius R2, the pressing force of the light reduction transmission lever 368 is received at the rotational center of the transmission plate 361. Consequently, the light reduction transmission lever 368 does not rotate even upon a small rotation of the external operable button 315. The position of the light reducing panel 319 is stabilized. As the force of the light reduction transmission lever 368 biasing the transmission plate 361 toward the second set position is smaller, the stop mechanism for the retention of the transmission plate 361 in the third set position can have smaller force of the retention. Note that it is further possible to use this operation for retaining the external operable button 315 in the clicked state.

Figure 55:
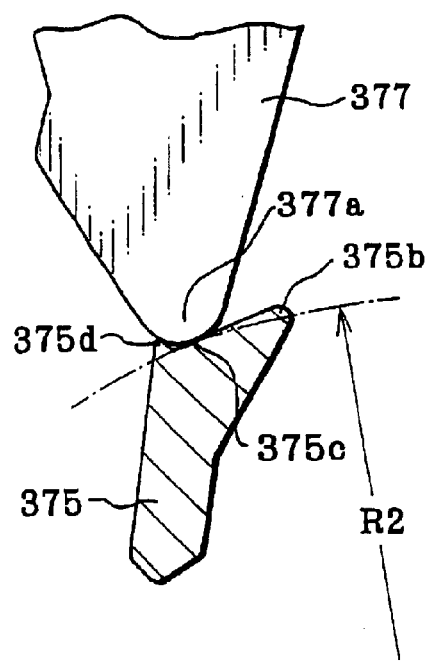
FIG. 55 is an explanatory view in elevation, illustrating another preferred light reduction shifting projection.

Note that, as illustrated in FIG. 55, the arc-shaped contact portion 375b of the light reduction shifting projection 375 may be formed to protrude over an arc defined by the arc-shaped surface 375c. This is effective in preventing disengagement of the light reduction shifting projection 375 from the shifting projection 377 even upon errors in manual operation. Furthermore, a projection 375d may be formed on the arc-shaped surface 375c. The projection 375d prevents the external operable button 315 from rotating to the second set position even with the bias of the torsion coil spring 372. The structure of the projection 375d can be effective additionally to the mechanism for the retention in the clicked state.

Figure 56:
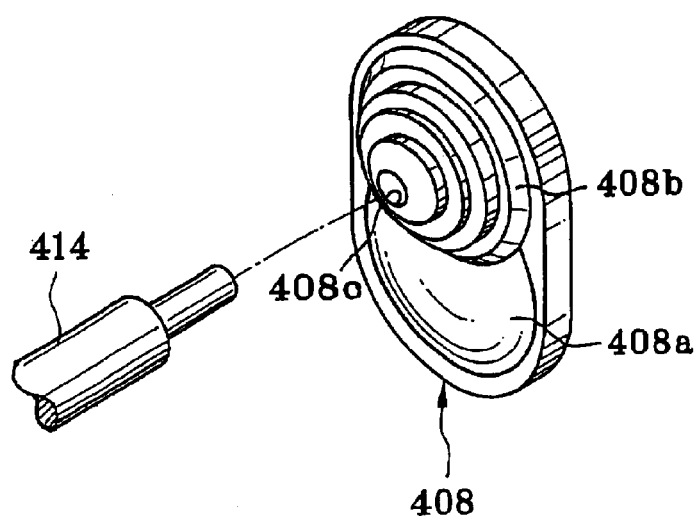
FIG. 56 is a perspective illustrating another preferred external operable button with an inspection tool.

In FIGS. 56–59, other preferred variants of external operable buttons are illustrated. In FIG. 56, an external operable button 408 includes a concave surface 408a and a projecting portion 408b. The concave surface 408a is formed in a lower portion of the external operable button 408, and adapted for pressing up the external operable button 408 with a finger for a vertical slide. The projecting portion 408b is formed in an upper portion of the external operable button 408, and adapted for pressing the external operable button 408 for its rotation and all other movement with the finger. Plural stepped ridges are formed in the projecting portion 408b, and are effective in frictional contact of the finger.

A hole 408c is formed in an end of the projecting portion 408b. An inspection tool 414 for the purpose of inspecting a switching operation is inserted into the projecting portion 408b. After the lens-fitted photo film unit is completed, the inspection tool 414 with a pin-shaped end is inserted in the hole 408c. The inspection tool 414 is moved for a straight slide and rotation in the same manner as the external operable button 408. Therefore, the changing operation of the photographic modes is checked as to normality according to the shift of the external operable button 408 between the three positions.

Other preferred buttons are hereinafter described, which are different in the shape but used in the common type of lens-fitted photo film unit.

Figure 57:
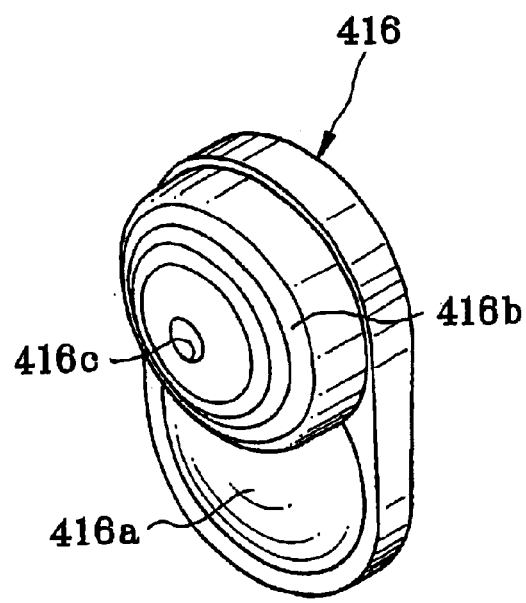
FIG. 57 is a perspective illustrating one preferred external operable button having a smooth surface.

In FIG. 57, another external operable button 416 is illustrated. A concave surface 416a is formed in a lower portion of the external operable button 416, and adapted for pressing up the external operable button 416 with a finger for a vertical slide. A projecting portion 416b is formed in an upper portion of the external operable button 416. Plural stepped ridges are formed in the projecting portion 416b, and are effective in frictional contact of the finger. The ridges are adapted for pressing the external operable button 416 for its rotation and all other movement with the finger. Each of the ridges has a surface rounded off without an angular edge. Because of the rounded shape, the touch of the finger on the projecting portion 416b can be good still with high friction. A hole 416c is formed in the center of the projecting portion 416b, and used for the inspection of the switching operation in the same manner as the above embodiments.

Figure 58:
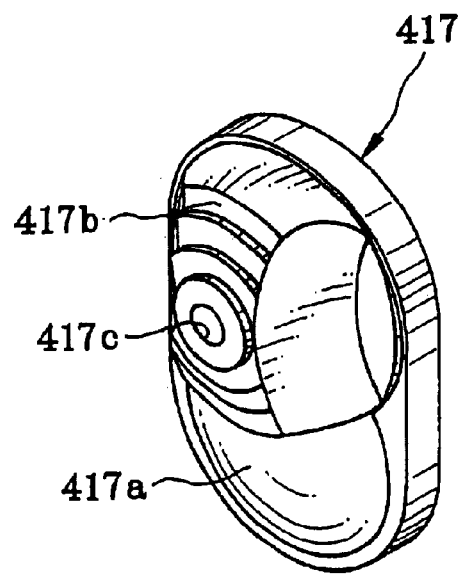
FIG. 58 is a perspective illustrating one preferred external operable button having two cutouts.

In FIG. 58, still another preferred external operable button 417 is illustrated. A concave surface 417a is formed in a lower portion of the external operable button 417, and adapted for pressing up the external operable button 417 with a finger for a vertical slide. A projecting portion 417b is formed in an upper portion of the external operable button 417. Plural stepped ridges are formed in the projecting portion 417b, and are effective in frictional contact of the finger. Also, a pair of cutouts are formed in the projecting portion 417b. The ridges are adapted for pressing the external operable button 417 for its rotation and all other movement with the finger. The cutouts are specifically advantageous in touching or pinching the external operable button 417 with fingers for any movement of the external operable button 417. Also, a hole 417c is formed in the center of the projecting portion 417b, and used for the inspection of the switching operation in the same manner as the above embodiments.

Figure 59:
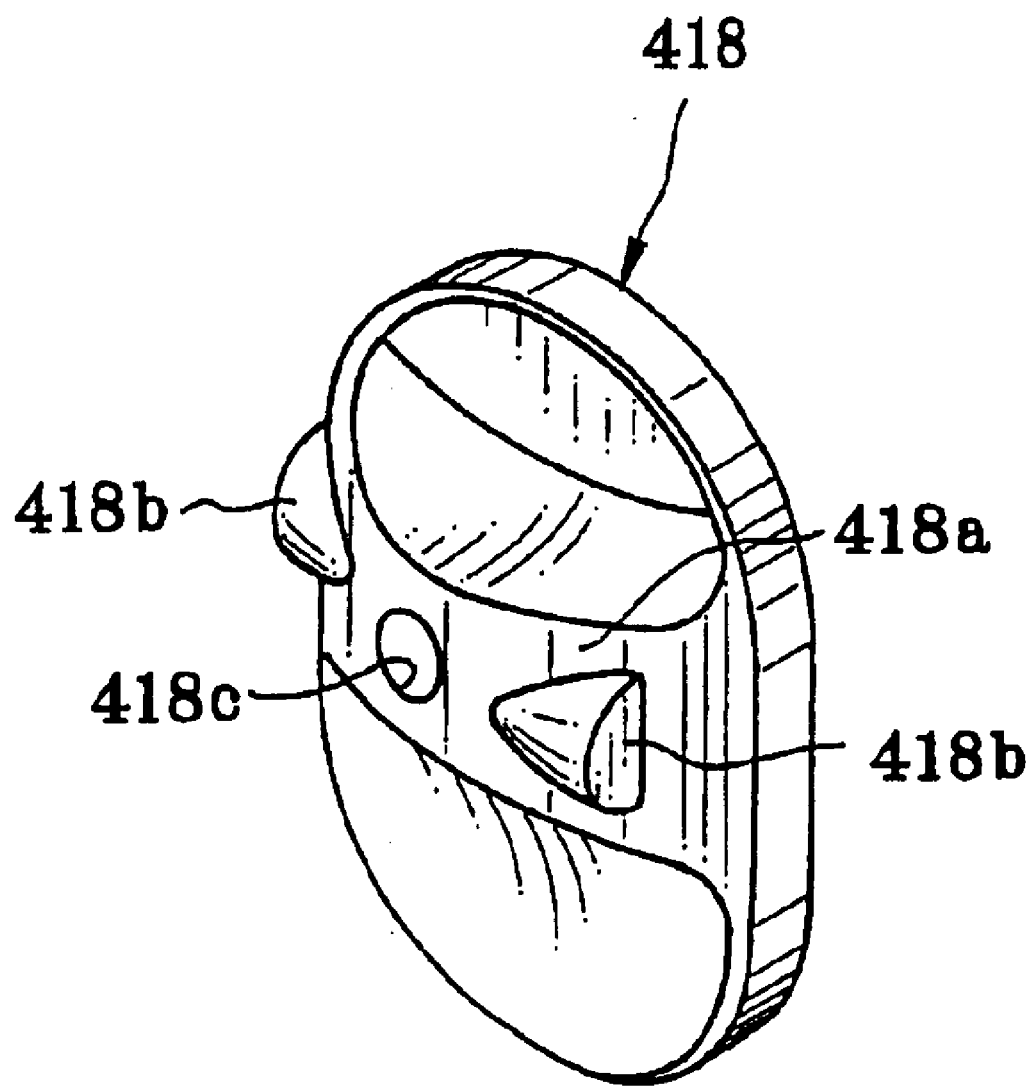
FIG. 59 is a perspective illustrating one preferred external operable button having small projections.

In FIG. 59, a preferred external operable button 418 is illustrated. A projecting portion 418a constitutes a middle portion of the external operable button 418. Cutouts are formed in upper and lower end portion of the external operable button 418, to define the projecting portion 418a between those. The external operable button 418 is adapted for pressing up and down the external operable button 418 with a finger for a vertical slide. Two small projections 418b are formed on the projecting portion 418a, and adapted to press the external operable button 418 for rotation with the finger. A top end of each of the small projections 418b has a level slightly lower than that of the projecting portion 418a. A surface of the small projections 418b is formed smoothly with this height. This smoothness is effective in reducing the contact pressure to a packaging material outside the lens-fitted photo film unit. Also, a hole 418c is formed in the center of the projecting portion 418a, and used for the inspection of the switching operation in the same manner as the above embodiments.

Note that, in the above embodiments, the engageable portion for engagement with the inspection tool 414 for switch inspection is the hole as a negatively shaped portion. However, the engageable portion for this purpose may be a projection or the like in view of the operability and suitability for the inspection. However, the hole as the engageable portion is advantageous, because difficulties or troubles of packaging material, such as minute dust or breakage, can be avoided without raising the level of the contact pressure to the packaging material. Also, it is possible to prevent interference between products inside a vending machine loaded with a great number of lens-fitted photo film units. Furthermore, the inspection tool 414 can have a pin shape for use with the hole by insertion. If the form of the external operable button is changed, the inspection tool 414 of the same type can be used. Even when scratches or fine damages occurs to the engageable portion with the inspection tool 414 in the course of the switch inspection, the scratches can be considerably inconspicuous typically when the engageable portion is the negatively shaped portion. Thus, the hole is specially preferable for use with the inspection tool 414 as an engageable portion.

In the above embodiment, the aperture stop is changed over between the large and small aperture stop states for the purpose of changing over the exposure amount. However, a fixed aperture stop may be used without a changeable structure. To change over the exposure amount, only the shutter speed of the shutter blade may be changed over. When the daylight mode or daylight flash mode is selected, the shutter speed can be the high shutter speed. When the night flash mode is selected, the shutter speed can be the low shutter speed.

Furthermore, the shutter speed may be fixed. For the purpose of changing over the exposure amount, only the aperture stop may be changed over.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed:

1. A lens-fitted photo film unit that has a flash unit in which a flash emitter emits a flashlight toward a subject, said lens-fitted photo film unit comprising:
    an exposure mechanism arranged to produce a latent image during exposure having a longitudinal dimension and a relatively shorter vertical dimension;
    a light reducing panel arranged to cover a central area of the flash emitter while the light reducing panel is in a light-blocking position, the light reducing panel being arranged with respect to the flash emitter while in the light-blocking position so that a portion of the flash emitter including an entire edge of the flash emitter parallel to the longitudinal dimension is not covered by the light reducing panel, and the width of the end of the light reducing panel with respect to the longitudinal direction being smaller than the width of the center thereof.

2. The lens-fitted photo film unit according to claim 1, wherein at least one opening is formed in the light reducing panel.

3. The lens-fitted photo film unit according to claim 1, wherein the light reducing panel is movable between a first position corresponding to the light-blocking position to cover the central area of the flash emitter, and a second position not to cover the flash emitter.

4. The lens-fitted photo film unit according to claim 3, wherein the light reducing panel at the second position is located inside the lens-fitted photo film unit.

5. A lens-fitted photo film unit that has a flash unit in which a flash emitter emits a flashlight toward a subject, said lens-fitted photo film unit comprising:
    an exposure mechanism arranged to produce a latent image during exposure having a longitudinal dimension and a relatively shorter vertical dimension; and
    a light reducing panel selectively movable between first and second extreme positions of travel, the first position being one in which the light reducing panel blocks a portion of the flash emitter, the second position being one in which the light reducing panel blocks no portion of the flash emitter;
    wherein the light reducing panel is shaped and positioned so that, while in the first position, a first portion of the flash emitter including an entire first edge that is parallel to the longitudinal dimension is unblocked by the light reducing panel, and so that while in the first position a second portion of the flash emitter including a portion of a second edge opposite the first edge is unblocked by the light reducing panel.

6. The lens-fitted photo film unit of claim 5, wherein the light reducing panel, while in the first position, blocks a portion of the second edge of the flash emitter.

7. The lens-fitted photo film unit of claim 5, wherein the first and second unblocked portions of the flash emitter are not interconnected.

8. The lens-fitted photo film unit of claim 5, wherein the first unblocked portion of the flash emitter comprises an arcuate edge.

9. The lens-fitted photo film unit of claim 5, wherein the second unblocked portion of the flash emitter comprises an arcuate edge.

10. The lens-fitted photo film unit of claim 8, wherein the second unblocked portion of the flash emitter comprises an arcuate edge.

11. The lens-fitted photo film unit of claim 8, wherein the arcuate edge is entirely concave.

12. The lens-fitted photo film unit of claim 9, wherein the arcuate edge is entirely concave.

13. A lens-fitted photo film unit that has a flash unit in which a flash emitter emits a flashlight toward a subject, said lens-fitted photo film unit comprising:
    a light reducing panel to cover a central area of the flash emitter, the light reducing panel being extended in a longitudinal direction of the flash emitter, and a width of both ends of the light reducing panel with respect to the longitudinal direction being smaller than a width of the center thereof.

14. The lens-fitted photo film unit according to claim 13, wherein an edge of the light reducing panel extended in the longitudinal direction is arc-shaped.

15. The lens-fitted photo film unit according to claim 13, wherein at least one opening is formed in the light reducing panel.

16. The lens-fitted photo film unit according to claim 13, wherein the light reducing panel is movable between a first position to cover the central area of the flash emitter, and a second position not to cover the flash emitter.

17. The lens-fitted photo film unit according to claim 16, wherein the light reducing panel at the second position is located below an edge of the flash emitter extended in the longitudinal direction inside the lens-fitted photo film unit.

* * * * *